(12) United States Patent
Ravid

(10) Patent No.: US 8,527,523 B1
(45) Date of Patent: Sep. 3, 2013

(54) SYSTEM FOR ENHANCING EXPERT-BASED COMPUTERIZED ANALYSIS OF A SET OF DIGITAL DOCUMENTS AND METHODS USEFUL IN CONJUNCTION THEREWITH

(75) Inventor: Yiftach Ravid, Rosh Haayin (IL)

(73) Assignee: Equivio Ltd., Haayin (IL)

( * ) Notice: Subject to any disclaimer, the term of this patent is extended or adjusted under 35 U.S.C. 154(b) by 849 days.

(21) Appl. No.: 12/559,173

(22) Filed: Sep. 14, 2009

Related U.S. Application Data

(63) Continuation-in-part of application No. 12/428,100, filed on Apr. 22, 2009.

(60) Provisional application No. 61/231,339, filed on Aug. 5, 2009, provisional application No. 61/231,456, filed on Aug. 5, 2009.

(51) Int. Cl.
*G06F 17/30* (2006.01)

(52) U.S. Cl.
CPC .............................. *G06F 17/30648* (2013.01)
USPC .............................. 707/749; 707/728; 706/54

(58) Field of Classification Search
CPC .............................................. G06F 17/30648
USPC .................. 707/749, 728; 358/448; 706/15, 706/54
See application file for complete search history.

(56) References Cited

U.S. PATENT DOCUMENTS

| | | | |
|---|---|---|---|
| 4,839,853 A | 6/1989 | Deerwester et al. | |
| 6,687,696 B2 | 2/2004 | Hofmann et al. | |
| 6,738,760 B1 | 5/2004 | Krachman | |
| 7,328,216 B2 | 2/2008 | Hofmann et al. | |
| 7,376,635 B1 | 5/2008 | Porcari et al. | |
| 7,558,778 B2 | 7/2009 | Carus et al. | |
| 7,657,522 B1 | 2/2010 | Puzicha et al. | |
| 7,933,859 B1 | 4/2011 | Puzicha et al. | |
| 2002/0007283 A1 | 1/2002 | Anelli | |
| 2003/0120653 A1 | 6/2003 | Brady et al. | |
| 2004/0064335 A1 | 4/2004 | Yang | |
| 2005/0027664 A1 | 2/2005 | Johnson et al. | |

(Continued)

FOREIGN PATENT DOCUMENTS

WO  WO 2006/008733 A2  1/2006

OTHER PUBLICATIONS

Rennie, Jason D.M., "Derivation of the F-Measure", MIT, Feb. 19, 2004.

(Continued)

*Primary Examiner* — Shahid Alam
(74) *Attorney, Agent, or Firm* — Oliff & Berridge, PLC

(57) ABSTRACT

An electronic document analysis method receiving N electronic documents pertaining to a case encompassing a set of issues including at least one issue and establishing relevance of at least the N documents to at least one individual issue in the set of issues, the method comprising, for at least one individual issue from among the set of issues, receiving an output of a categorization process applied to each document in training and control subsets of the at least N documents, the output including, for each document in the subsets, one of a relevant-to-the-individual issue indication and a non-relevant-to-the-individual issue indication; building a text classifier simulating the categorization process using the output for all documents in the training subset of documents; and running the text classifier on the at least N documents thereby to obtain a ranking of the extent of relevance of each of the at least N documents to the individual issue. The method may also comprise evaluating the text classifier's quality using the output for all documents in the control subset.

68 Claims, 37 Drawing Sheets

(56) References Cited

U.S. PATENT DOCUMENTS

| | | | |
|---|---|---|---|
| 2005/0134935 | A1 | 6/2005 | Schmidtler et al. |
| 2006/0242190 | A1 | 10/2006 | Wnek |
| 2006/0294101 | A1 | 12/2006 | Wnek |
| 2007/0156615 | A1 | 7/2007 | Davar et al. |
| 2008/0077570 | A1 | 3/2008 | Tang et al. |
| 2008/0086433 | A1 | 4/2008 | Schmidtler et al. |
| 2008/0104060 | A1 | 5/2008 | Abhyankar et al. |
| 2009/0083200 | A1 | 3/2009 | Pollara et al. |
| 2009/0119240 | A1 | 5/2009 | Fleming et al. |
| 2009/0119343 | A1 | 5/2009 | Jiao et al. |
| 2009/0164416 | A1 | 6/2009 | Guha |
| 2010/0250474 | A1 | 9/2010 | Richards et al. |

OTHER PUBLICATIONS

Bassan, B. et al., "Parameter Estimation in Differential Equations, using Random Time Transformations," *Journal of the Italian Statistical Society*, Oct. 13, 2009, pp. 177-199.

"Supervised learning," *Wikipedia*, retrieved Aug. 19, 2009, http://en.wikipedia.org/wiki/Supervised_learning.

Draper, N. R. et al., *Applied Regression Analysis*, Third Edition, Wiley, Apr. 23, 1998, pp. 236 and 238.

Mendenhall, W. et al., *A Second Course in Regression Analysis*, Seventh Edition, 2012, Prentice-Hall.

*The Sedona Conference Journal*, vol. 8, Fall 2007, pp. 189-223.

"Electronic Discovery Software," *ImageMAKER Discovery Assistant*, retrieved Aug. 9, 2009, http://www.discoveryassistant.com/Nav_Top/Product_DescriptiOn.asp.

"Multilingual E-Discovery," *BASIS Technology*, retrieved Aug. 9, 2009, http://www.basistech.com/ediscovery/?gclid=CNDZr5v7IZwCFd0B4wodSznYew.

"Electronic Discovery Software," *Bitpipe*, retrieved Aug. 9, 2009, http://www.bitpipe.com/rlist/term/Electronic-Discovery-Software.html.

"Electronic Discovery Product: The Clearwell E-Discovery Platform," *Clearwell*, retrieved Aug. 19, 2009, http://www.clearwellsystems.com/products/index.php.

Peterson, M., "Electronic Discovery Software," retrieved Aug. 9, 2009, http://ezinearticles.com/?Electronic-Discovery-Software&id=222396.

"Autonomy's Products," retrieved Apr. 9, 2009, http://www.autonomy.com/.

Joachims, T., "Transductive Inference for Text Classification Using support Vector Machines," *Proceedings of the 16th International Conference on Machine Learning*, 1999.

Deerwester, S. et al., "Indexing by Latent Semantic Analysis," *Journal of the American Society for Information Science* (1986-1998), Sep. 1990, p. 391, vol. 41, No. 6.

Joachims, T., *Learning to Classify Text Using Support Vector Machines: Methods, Theory and Algorithms*, Feb. 2001, Kluwer Academic Publishers.

"Learning to rank," *Wikipedia*, retrieved Apr. 9, 2012, http://en.wikipedia.org/wiki/Learning_to_rank.

"Costly Review Effort in the Context of Documentation Retention Policy Becomes Streamlined, Automated Review System," *H5 Technologies*, Feb. 2005, retrieved Apr. 9, 2012, http://wayback.archive.org/web/jsp/Interstitial.jsp?seconds=5&date=1108350529000&url=http%3A%2F%2Fwww.h5technologies.com%2Fwhatwedo%2Fexample3.html&target=http%3A%2F%2Fweb.archive.org%2Fweb%2F20050214030849%2Fhttp%3A%2F%2Fwww.h5technologies.com%2Fwhatwedo%2Fexample3.html.

"Rosette for E-Discovery," *Basis Technology*, retrieved Apr. 9, 2012, http://www.basistech.com/e-discovery/?gclid=CNDZr5v71ZwCFd0B4wodSznYew.

"Industry Leading E-Discovery Product: Clearwell E-Discovery Platform," *Clearwell*, retrieved Apr. 9, 2012, http://www.clearwellsystems.com/electronics-discovery-products/.

Trice, A. et al., "Consensus Knowledge Acquisition," *AI Meme* No. 1183, Dec. 1989, pp. 1-24.

Kittler, J. et al, "Fusion of Multiple Experts in Multimodal Biometric Personal Identity Verification Systems," *IEEE*, 2002, pp. 3-12.

Liao, S., "Expert system methodologies and applications—a decade review from 1995 to 2004," *Expert Systems with Applications*, 2008, No. 28, pp. 93-103.

Li, B. et al, "Confidence-based Dynamic Ensemble for Image Annotation and Semantics Discovery," *ACM MM*, Nov. 2003, pp. 195-206.

Goncalves, T. et al., "Is linguistic information relevant for the classification of legal texts?", *ACM ICAIL*, Jun. 2005, pp. 168-176.

Apr. 12, 2012 Office Action issued in U.S. Appl. No. 12/428,100.

Jan. 9, 2012 Office Action issued in U.S. Appl. No. 13/161,087.

equivio

- Sample 1
- Sample 2
- Sample 3

| Row Id | Document Identifier | Date | Size | Ranking |
|---|---|---|---|---|
| 9 | 4526499-tkt59c00.txt | 3/30/2009 | 7 | Not Relevant |
| 10 | 4437129-tdd87e00.txt | 3/30/2009 | 1 | None |
| 11 | 397409-but2400.txt | 3/30/2009 | 2 | None |
| 12 | 1075729-ewn92a00.txt | 3/30/2009 | 77 | Relevant |
| 13 | 6039459-zal13100.txt | 3/30/2009 | 2 | Not Relevant |
| 14 | 806619-dvq58e00.txt | 3/30/2009 | 0 | Not Relevant |

[ Not Relevant ] [ Relevant ]   [ Skip ]

PHIVP MI0FtM COMPANIES INC. I
INTER-OFFICE CORRESPONDENCE
120 PARK AVENUE, NEW YORK, N.Y. 10017
To: Distribution  DATE: October 23, 1989
FROM: Murray Hi Bring
SUa/ECr Product Liability Litigation As you may know, Victor Schwartz is an attorney in Washington and a former Professor of tort law who is widely regarded as one of the country's leading experts on product liability. Financial analysts and reports frequently solicit his views on current developments relating to product liability generally, and to our litigation in particular. On the whole, his comments have been quite supportive of our position regarding smoking and health litigation. Mr. Schwartz recently gave an interview to a Washington firm which publishes an investor information newsletter. I understand that this newsletter is distributed to most tobacco analysts. I am attaching hereto a copy of the newsletter containing a summary of that interview. As you will note,

[ Get More Documents ]   [ Calculate Sample Results ]

Sample Status
All
Total: 118/120
Not Relevant: 101
Relevant: 17
Skip: 0

Current
Total: 38/40
Not Relevant: 33
Relevant: 7
Skip: 0

Setup → Interactive Ranking ⇄ Sampling Results → Batch Ranking → Final Results

Connect to Case: er_demo, Issues : Issue1

Fig. 14B equivio

Equivio>Relevance

Setup | Interactive Ranking | Sampling Results | Batch Ranking | Final Results | Utilities

- Results
  - Keywords
- Discrepancy Set
  - Discrepancy Analy

| Row Id | Document Identifier | Date | Size | Ranking |
|---|---|---|---|---|
| 1. | auc45a00.TXT | 3/30/2009 | 2 | Relevant |
| 2. | blm03a00.TXT | 3/30/2009 | 5 | Not Relevant |
| 3. | btq90e00.TXT | 3/30/2009 | 1 | Not Relevant |
| 4. | cad73d00.TXT | 3/30/2009 | 11 | Relevant |
| 5. | cfp26e00.TXT | 3/30/2009 | 7 | Relevant |
| 6. | cha84e00.TXT | 3/30/2009 | 16 | Not Relevant |
| 7. | cus66a00.TXT | 3/30/2009 | 5 | Relevant |
| 8. | dja15d00.TXT | 3/30/2009 | 7 | Relevant |
| 9. | eug23a00.TXT | 3/30/2009 | 4 | Not Relevant |
| 10. | fcd62d00.TXT | 3/30/2009 | 27 | Not Relevant |

[Not Relevant] [Relevant] [Skip]

SALES GENERATION DISTRIBUTION
MR. R.B.SPELL
MR. P.J. MCCANN
Mr.L. GORDON

FROM: K.A. Sparrow
SUBJECT: Special Promotions -1996 PPayment Schedule
Attached for your guidance and reference is the 1996 Special Promotion Payment Schedule.

[Create Discrepancy Set]　[Analyze Discrepancies]

Setup → Interactive Ranking ⇄ Sampling Results → Batch Ranking → Final Results

Sample Status
All
Total: 1400/1400
Not Relevant: 954
Relevant: 446
Skip: 0

Current
Total: 40/40
Not Relevant: 28
Relevant: 12
Skip: 0

Connect to Case: er_demo, Issues : Issue1

Fig. 14H

Equivio>Relevance

Setup | Interactive Ranking | Sampling Results | Batch Ranking | Final Results | Utilities equivio

- Utilities
  - Log
  - License
  - Automatic Mode
  - Transparency Repo
  - Consistency Check
  - Database Services
  - Extract Transparency Report Document Identifier  1097429-ezb24f00.txt Reset    Generate Report 1097429-ezb24f00.txt ADVERTISER:
PRODUCT:
TRADING AREA:
Philip Morris, Inc.
Tobacco
85 POOL
5D0
Leo Burnett Company, Inc., hereinafter referred to as Agency, hereby contracts for the Posting and Maintenance of Outdoor Advertising Posters on Outdoor Advertising Poster Panels owned or controlled by Company in the Market/s listed below for advertising of advertiser's products or services named herein, upon all the terms and conditions set forth on the front and back hereof and any addendum pages attached hereto.
SIZE NUMBER OF PANELS NO.
OF POSTING
MARKET SHOWING REG. ILLUM. TOTAL.
MONTHS INFORMATION
LITTLE ROCK, ARK 50 7 9 J6 12 25TH of Previous Month.
YEAR 1983
'82
Document Score: 69.1

Save To File

Setup → Interactive Ranking → Sampling Results → Batch Ranking → Final Results

Sample Status
All
Total:       1400/1400
Not
Relevant:    44
Relevant:    0
Skip:

Current
Total:       40/40
Not
Relevant:    28
Relevant:    2
Skip:        0

Connect to Case: er_demo, Issues: Issue1

Fig. 14J equivio

Equivio>Relevance

Setup | Interactive Ranking | Sampling Results | Batch Ranking | Final Results | Utilities

- Results
  - Keywords
  - Ranking Statistics

Include:

| Keyword | Weight |
|---|---|
| brand | 0.20 |
| value | 0.18 |
| display | 0.17 |
| accounts | 0.16 |
| field | 0.14 |
| stores | 0.14 |
| program | 0.14 |
| spanish speaking | 0.14 |
| product | 0.14 |
| off | 0.14 |
| carton | 0.13 |
| item | 0.12 |
| retail | 0.12 |
| price | 0.12 |
| $105 | 0.12 |
| ship | 0.12 |

Exclude:

| Keyword | Weight |
|---|---|
| tobacco | -0.13 |
| day | -0.09 |
| received | -0.07 |
| were | -0.07 |
| ph | -0.07 |
| vantage ultra | -0.07 |
| tbe | -0.06 |
| protocol | -0.06 |
| such | -0.06 |
| our | -0.06 |
| laboratory | -0.06 |
| part | -0.06 |
| major | -0.06 |
| bow | -0.06 |
| preventing | -0.06 |
| kids | -0.06 |

☑ View Processed Keywords

If you are satisfied with the results, click "Perform Batch Ranking" to move to the next step.
Otherwise click "Continue Interactive Ranking" to continue sampling.

[Continue Interactive Ranking]   [Save To File]   [Perform Batch Ranking]

Sample Status
All
Total: 1400/1400
Not Relevant:
Relevant:
Skip: 0

Current
Total: 40/40
Not Relevant:
Relevant:
Skip: 0

Setup → Interactive Ranking ⇄ Sampling Results → Batch Ranking → Final Results

Connect to Case: er_demo, Issues : Issue1

Fig. 14K

|  |  | Expert1 | | |
|---|---|---|---|---|
|  |  | Relevant (X) | Non-Relevant (Y) | Total |
| Expert2 | Relevant (A) | 130000 | 20000 | 150000 |
|  | Non-Relevant (B) | 45000 | 775000 | 820000 |
|  | Total | 175000 | 795000 | 970000 |

FIG. 18A

|  | Verification | |
|---|---|---|
|  | Sample Size | Actual Relevant |
| Expert2 Relevant, Expert1 Non-Relevant (AY) | 300 | 100 |
| Expert2 Non-Relevant / Expert1 Relevant (BX) | 300 | 180 |

FIG. 18B

|  | Precision | Recall | f-measure |
|---|---|---|---|
| Expert1 | 89.54% | 95.11% | 92.24% |
| Expert2 | 90.90% | 82.77% | 86.65% |

FIG. 18C

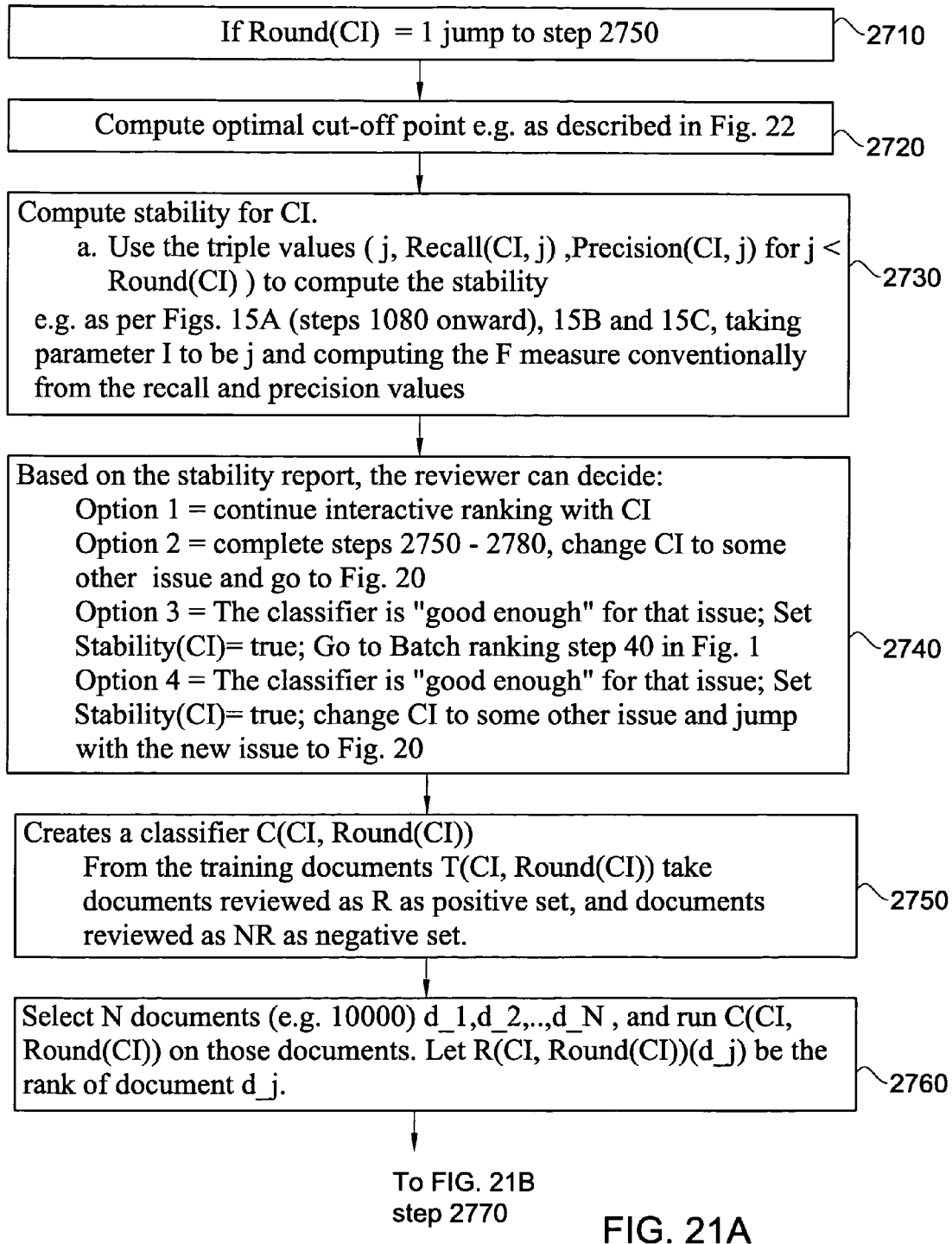

From FIG. 23A
step 3070

Using said cut-off point, compute and store at least one quality criterion e.g. F measure characterizing said binarizing of said rankings of said documents in said control subset, thereby to define a quality of performance indication of a current iteration I; ~3080

Display a comparison of the quality of performance indication of the current iteration I to quality of performance indications of previous iterations e.g. by generating at least one graph of at least one quality criterion vs. iteration serial number. ~3090

Seek an input (e.g. a user input received from a human user and/or a computerized input including a computerized indication of flatness of said graph of at least one quality criterion vs. iteration serial number) as to whether or not to return to said receiving step thereby to initiate a new iteration I + 1 which comprises said receiving, building, running, partitioning, ordering, selecting, and computing/storing steps and initiate said new iteration I + 1 if and only if so indicated by said input, wherein said iteration I + 1 may use a control subset larger than the control subset of iteration I and may include the control subset of iteration I merged with an additional group of documents of pre-determined size randomly selected from said collection of documents ~3100

Run the text classifier most recently built on at least said collection of documents thereby to generate a final output and generating a computer display of said final output e.g. a histogram of ranks for each issue and/or a function of an indication of a quality measure (e.g. f-measure; precision; recall), such as a graph of said quality measure as a function of cut-off point, for each of a plurality of cut-off points and optionally a culling percentage including an integral of said graph. ~3110

FIG. 23B

SYSTEM FOR ENHANCING EXPERT-BASED COMPUTERIZED ANALYSIS OF A SET OF DIGITAL DOCUMENTS AND METHODS USEFUL IN CONJUNCTION THEREWITH

REFERENCE TO CO-PENDING APPLICATIONS

Priority is claimed from:

U.S. patent application Ser. No. 12/428,100 entitled "A computerized system for enhancing expert-based processes and methods useful in conjunction therewith" and filed 22 Apr. 2009;

U.S. Patent Application No. 61/231,339, entitled "Apparatus and methods for computerized learning including use of novel diminishing returns criterion" and filed 5 Aug. 2009; and U.S. Patent Application No. 61/231,456, entitled "System for Electronic Document Processing and Methods Useful in Conjunction Therewith" and also filed 5 Aug. 2009.

FIELD OF THE INVENTION

The present invention relates generally to systems and methods for computerized analysis of digital documents.

BACKGROUND OF THE INVENTION

Descriptions of state of the art systems for computerized analysis of digital documents are available on the World Wide Web at the following http locations:

a. discoveryassistant.com/Nav_Top/Product_Description.asp;
b. basistech.com/ediscovery/?gclid=CNDZr5v7lZ-wCFd0B4wodSznYew;
c. bitpipe.com/rlist/term/Electronic-Discovery-Software.html-archive pro-actively;
d. clearwellsystems.com/products/index.php;
e. ezinearticles.com/?Electronic-Discovery-Software&id=222396; and
f. autonomy.com.

"Derivation of the F-measure" by Jason D. M. Rennie whose email address is given in the paper to be jrennie at csail.mit.edu, is available on Internet.

A support vector machine or SVM is a set of related supervised learning methods used for classification and regression, in machine learning. For example, Matlab has a Matlab/C SVM toolbox. The term "supervised learning" or "supervised machine learning" refers to a machine learning technique for learning a function from training data, in contrast to "unsupervised" learning.

Generally, computerized systems for analyzing electronic documents are known. The disclosures of all publications and patent documents mentioned in the specification, and of the publications and patent documents cited therein directly or indirectly, are hereby incorporated by reference.

Data classification methods using machine learning techniques are described, for example, in published United States Patent Application 20080086433.

The following terms may be construed either in accordance with any definition thereof appearing in the prior art literature or in accordance with the specification, or as follows:

Richness: the proportion of relevant documents in the population of data elements which is to be classified. Here and elsewhere, the word "document" is used merely by way of example and the invention is equally applicable to any other type of item undergoing classification.

Precision: the number of relevant documents retrieved divided by the total number of documents retrieved. Precision is computed as follows:

$$\text{Precision} = \frac{|\{\text{relevant documents}\} \cap \{\text{documents retrieved}\}|}{|\{\text{documents retrieved}\}|}$$

Recall: the number of relevant documents retrieved divided by the total number of existing relevant documents (which should ideally have been retrieved). Recall is computed as follows:

$$\text{Recall} = \frac{|\{\text{relevant documents}\} \cap \{\text{documents retrieved}\}|}{|\{\text{relevant documents}\}|}$$

F-measure: the harmonic mean of precision and recall. The F-measure is an aggregated performance score for the individual precision and recall scores. The F-measure is computed as follows:

$$F = 2 \cdot (\text{precision} \cdot \text{recall})/(\text{precision} + \text{recall}).$$

Document key: a unique key assigned to a document. Using the unique key the system can retrieve the content of the document. (For example a file path can be a unique key).

A feature space: is an abstract space where each document is represented as a point in n-dimensional space. A point may for example comprise frequency of certain n-grams or existing meta-data.

Classifier or "equiranker": a function from a feature space to the interval [0, 1].

SUMMARY OF THE INVENTION

Using current technology, culling and review remain highly dependent on the knowledge, intuition and creativity of the individuals involved. As a result, e-discovery processes are highly vulnerable to uncontrolled variance in errors, risks and costs. Conventionally, the culling phase uses a list of manual keywords, compiled by the lead end users working on the case. Research has highlighted the problems associated with this approach—manual keywords tend to yield only a fraction of the relevant documents, while flooding the review set with an excess of documents that are irrelevant (Sedona Conference Journal, Volume 8, Fall 2007). Moreover, the keywords process is not only manual, but also binary. Under the standard keywords method, document scoring is binary—the document is either In or Out. The absence of a graduated scale renders the culling process clumsy and rigid; for example, when trying to align the target review set with changes in budgets, issues, or the size of the ingest collection.

Conventionally, the detailed review phase involves the granular review of each document in the culled collection. Currently, review decisions are completely dependent on the individual end user's understanding of the issues and document content. In the absence of graduated relevance scores, it is not possible to manage and organize document review based on the priority of the documents. In addition, the review process often involves large teams, creating challenges for ensuring the quality and consistency of the review deliverable.

Certain embodiments of the present invention seek to provide automated prioritization of documents and keywords including an expert-guided system performing some or all of the following steps, suitably ordered e.g. as follows:

a. An expert reviews a sample of documents, ranking them as relevant or not.
b. Based on the results, the system "learns" how to score documents for relevance.
c. In an iterative, self-correcting process, the system feeds additional samples to the expert. These statistically generated samples allow the system to progressively improve the accuracy of its relevance scoring.
d. Once a threshold level of accuracy is achieved, the system ranks the entire collection, computing a graduated relevance score for each document.

The priority rankings generated by certain embodiments of the present invention can be contrasted with conventional binary scoring of documents using manual keywords. The graduated rankings shown and described herein provide much more flexibility and control in the culling and review processes.

Some or all of the following functionalities may also be provided:

a. Concurrent multi-issue processing—the system can build classifiers for each of several issues in parallel.
b. Discrepancy analysis—supports quality analysis of the relevance results generated by the method shown and described herein, by generating a comparison with relevance results on the same collection of documents, previously obtained using a trusted human team or other trusted tool.
c. Transparency report generation—generation of a color-coded report that explains why a given document got its relevancy score including displaying selected documents and in each, color-coding the contribution of each word or string of words in the document, to the total relevance of the document.
d. Consistency validation—alerting in real-time that documents identified as near duplicates have received different tags (relevant and not-relevant) by an expert.
e. Keyword generation—creating a list of keywords (includers and excluders) that can be used to cull the case.

In summary, according to certain embodiments, an unstructured data collection, including documents, is provided. An expert reviews sample documents in the collection for relevance. A computer-implemented process computes relevance scores for all documents in the data collection, effectively generating a histogram of the documents in which low relevance documents are grouped together and high relevance documents are grouped together. Benefits may include various advantages pertaining to early case assessment (document priorities facilitate targeted, early review; automatically generated keywords provide bird's eye view of the collection; and/or estimates of collection richness which enable more efficient budgeting of the review effort); and various advantages pertaining to smarter culling (document priorities enable alignment of culling target with budget constraints and changes, and evolution of case issues and ingest collection size, statistical tools manage tradeoff between over-inclusion (precision) and under-inclusion (recall); prioritization of documents supports multiple cut-off techniques, such as budget or precision/recall targets; and/or automatically generated keywords which can be used to enrich manual keywords lists.

In selecting the review set, precision and recall rates as provided herein enable review of fewer documents, lowering review cost; and/or review of more relevant documents, reducing the risk of missing key data. Within the review set, relevance rankings enable review by priority, focusing on the most relevant documents early in the review process; assignment by priority e.g. assign priority documents to senior or expert reviewers; and/or matching of manual review decisions against generated relevance scores enabling supervision of review quality and consistency.

There is thus provided, in accordance with certain embodiments of the present invention, an electronic document analysis method receiving N electronic documents pertaining to a case encompassing a set of issues including at least one issue and establishing relevance of at least the N documents to at least one individual issue in the set of issues, the method comprising, for at least one individual issue from among the set of issues, receiving an output of a categorization process applied to each document in training and control subsets of the at least N documents, the output including, for each document in the subsets, one of a relevant-to-the-individual issue indication and a non-relevant-to-the-individual issue indication; building a text classifier simulating the categorization process using the output for all documents in the training subset of documents; and running the text classifier on the at least N documents thereby to obtain a ranking of the extent of relevance of each of the at least N documents to the individual issue.

Further in accordance with certain embodiments of the present invention, the method also comprises one, some or all of the following steps: partitioning the at least N documents into uniformly ranked subsets of documents, the uniformly ranked subsets differing in ranking of their member documents by the text classifier and adding more documents from each of the uniformly ranked subsets to the training subset; optionally ordering the documents in the control subset in an order determined by the rankings obtained by running the text classifier; selecting a cut-off point for binarizing the rankings of the documents in the control subset; using the cut-off point, computing and storing at least one quality criterion characterizing the binarizing of the rankings of the documents in the control subset, thereby to define a quality of performance indication of a current iteration I; displaying a comparison of the quality of performance indication of the current iteration I to quality of performance indications of previous iterations; seeking an input as to whether or not to return to the receiving step thereby to initiate a new iteration I+1 which comprises the receiving, building, running, partitioning, ordering, selecting, and computing/storing steps and initiating the new iteration I+1 if and only if so indicated by the input; and running the text classifier most recently built on at least the N documents thereby to generate a final output and generating a computer display of the final output.

Further in accordance with certain embodiments of the present invention, the receiving comprises receiving an output of a categorization process performed by a human operator.

Still further in accordance with certain embodiments of the present invention, the method also comprises evaluating the text classifier's quality using the output for all documents in the control subset.

Further in accordance with certain embodiments of the present invention, the cut-off point is selected from all document ranks in the control subset so as to maximize a quality criterion.

Additionally in accordance with certain embodiments of the present invention, the displaying a comparison comprises generating at least one graph of at least one quality criterion vs. iteration serial number.

Further in accordance with certain embodiments of the present invention, the input comprises a user input received from a human user.

Still further in accordance with certain embodiments of the present invention, the input comprises a computerized input including a computerized indication of flatness of the graph of at least one quality criterion vs. iteration serial number.

Additionally in accordance with certain embodiments of the present invention, the iteration I+1 uses a control subset larger than the control subset of iteration I, the control subset including the control subset of iteration I merged with an additional group of documents of pre-determined size randomly selected from the at least N documents.

Also provided, in accordance with certain embodiments of the present invention, is an electronic document analysis system receiving N electronic documents pertaining to a case encompassing a set of issues including at least one issue and establishing relevance of at least the N documents to at least one individual issue in the set of issues, the system comprising iterative apparatus for performing a plurality of machine learning iterations on the N electronic documents wherein the iterations teach the iterative apparatus to determine relevance of documents to at least one issue in the set of issues; and apparatus for determining at least one relevance determination quality criterion characterizing the iterative apparatus's current performance.

Further in accordance with certain embodiments of the present invention, the system also comprises iteration cost effectiveness analysis apparatus for estimating the cost effectiveness of continued use of the iterative apparatus on the at least N documents vs. termination of use of the iterative apparatus.

Still further in accordance with certain embodiments of the present invention, the cost effectiveness analysis apparatus includes apparatus for estimating at least one relevance determination quality criterion of the iterative apparatus's future performance assuming continued use of the iterative apparatus.

Additionally in accordance with certain embodiments of the present invention, the cost effectiveness analysis apparatus includes apparatus for computing a budget required to enable continued use of the iterative apparatus.

Further in accordance with certain embodiments of the present invention, the budget is computed by computing a culling percentage.

Additionally in accordance with certain embodiments of the present invention, the culling percentage is computed by generating a graph of a relevance determination quality criterion characterizing the iterative apparatus's performance during an iteration as a function of a serial number of the iteration; and computing an integral thereof.

Also provided, in accordance with certain embodiments of the present invention, is an electronic document analysis system receiving N electronic documents pertaining to a case encompassing a set of issues including at least one issue and establishing relevance of at least the N documents to at least one individual issue in the set of issues, the system comprising binary relevance determining apparatus for generating binary relevance data characterizing relevance of the documents to at least one issue in the set of issues, the binary relevance data being generated by applying a cut-off point to multi-value relevance data; and cut-off point selection cost effectiveness analysis apparatus for estimating the relative cost effectiveness of a multiplicity of possible cut-off points.

Further in accordance with certain embodiments of the present invention, the cut-off point selection cost effectiveness analysis apparatus comprises apparatus for generating a computer display of a continuum of possible cut-off points, each position along the continuum corresponding to a possible cut-off point, and apparatus for accepting a user's indication of positions along the continuum and for computing and displaying, for each user-indicated position, cost effectiveness information characterizing the cut-off point corresponding to the user-indicated position.

Still further in accordance with certain embodiments of the present invention, the apparatus for accepting is operative to accept readings from a user input device sliding along the continuum and to display the cost effectiveness information for each individual user-indicated position along the continuum as the user input device slides onto the individual user-indicated position.

Also provided, in accordance with certain embodiments of the present invention, is an electronic document analysis system, also termed herein an "active learning" system, receiving N electronic documents pertaining to a case encompassing a set of issues including at least one issue and establishing relevance of at least the N documents to at least one individual issue in the set of issues, the system comprising iterative binary relevance determining apparatus for iteratively generating binary relevance data characterizing relevance of the documents to at least one issue in the set of issues by performing machine learning on an iteration-specific training set of documents, the binary relevance data being generated by iteratively computing a cut-off point, wherein for at least one individual iteration, the iteration-specific training set is well distributed about the cut-off point as computed in the individual iteration.

Further in accordance with certain embodiments of the present invention, for each individual iteration, the iteration-specific training set is well distributed about the cut-off point as computed in the individual iteration.

The training set is well distributed about the cut-off point typically by having a first subset of its documents within a vicinity of a predetermined size defined about the cut-off point, a second subset of its documents above the vicinity and a third subset of its documents below the vicinity. Typically, the three subsets are equal in size (each comprising a third of the total number of documents) or almost equal in size, e.g. the differences between the numbers of documents in the 3 subsets may be only 5% or 15% or 25%.

Still further in accordance with certain embodiments of the present invention, the computer display of the final output comprises a histogram of ranks for each issue, Additionally in accordance with certain embodiments of the present invention, the computer display of the final output comprises a function of an indication of a quality measure for each of a plurality of cut-off points.

Further in accordance with certain embodiments of the present invention, the quality measure is selected from the following group: un-weighted F-measure; weighted F-measure; precision; recall; and accuracy.

Still further in accordance with certain embodiments of the present invention, the function of the indication of a quality measure for each of a plurality of cut-off points comprises a graph of the quality measure as a function of cut-off point.

Additionally in accordance with certain embodiments of the present invention, the function of the indication comprises a culling percentage including an integral of the graph.

Further in accordance with certain embodiments of the present invention, the set of issues comprises a plurality of issues and the computer display includes an indication of documents relevant to a logical combination of a plurality of issues.

Also provided, in accordance with certain embodiments of the present invention, is an electronic document analysis system receiving N electronic documents pertaining to a case encompassing a set of issues including at least one issue and establishing relevance of at least the N documents to at least one individual issue in the set of issues, the system comprising iterative binary relevance determining apparatus for iteratively generating binary relevance data characterizing relevance of the documents to at least one issue in the set of issues by performing machine learning on an iteration-specific training set of documents; and stability computation apparatus operative to monitor stability of the iterative binary relevance determining apparatus by using a first control group in order to estimate quality of relevance determination performed by the iterative binary relevance determining apparatus if iterations are continued vs. if iterations are terminated.

Further in accordance with certain embodiments of the present invention, the method also comprises using the text classifier most recently built to generate, for at least one individual issue in the set of issues, a set of keywords differentiating documents relevant to the individual issue to documents irrelevant to the individual issue.

Still further in accordance with certain embodiments of the present invention, the set of issues comprises a plurality of issues and also comprising a multi-issue manager operative to monitor the system's analysis of relevance of the at least N documents to each of the plurality of issues and to prompt at least one of the user and the system if relevance has not been analyzed for some of the plurality of issues.

Also provided, in accordance with certain embodiments of the present invention, is an electronic document analysis system comprising an electronic analyzer operative to generate a predetermined output characterizing a set of electronic documents; and an electronic analyzer evaluation system operative to receive an additional output regarding the set of electronic documents which additional output was generated by an external electronic document analysis system and to compare the predetermined output and the additional output in order to validate the electronic analyzer vis a vis the external electronic document analysis system.

Further in accordance with certain embodiments of the present invention, the electronic analyzer evaluation system is operative to compare the predetermined output and the additional output on a document by document basis, thereby to determine difference values for at least some of the set of electronic documents, and to merge the difference values.

Also provided, in accordance with certain embodiments of the present invention, is a method for electronic document analysis comprising using a text classifier to classify each document in a set of documents as relevant or irrelevant to an issue; and
generating a computer display of at least one user-selected document within the set of documents, wherein at least some words in the user-selected document are differentially presented depending on their contribution to the classification of the document as relevant or irrelevant by the text classifier.

Further in accordance with certain embodiments of the present invention, the words differentially presented are differentially colored and intensity of color is used to represent strength of the contribution for each word.

Still further in accordance with certain embodiments of the present invention, the method also comprises sequentially removing certain sets of words from each individual document in the set of documents and using the text classifier to classify the document's relevance assuming the words are removed, thereby to obtain a relevance output for each set of words, and comparing the relevance output to an output obtained by using the text classifier to classify the individual document without removing any words, thereby to obtain an indication of the contribution of each set of words to the relevance of the document.

Also provided, in accordance with certain embodiments of the present invention, is an expert-based document analysis method comprising electronically finding near-duplicate documents from among a set of documents; accepting an expert's input regarding at least some of the set of documents; and alerting the expert each time the expert's input regarding any individual document differs from his verdict regarding at least one additional document which has been found by the electronically finding step to be a near duplicate of the individual document.

Further in accordance with certain embodiments of the present invention, the quality criterion comprises an F-measure.

Still further in accordance with certain embodiments of the present invention, the at least one quality criterion characterizing the binarizing of the rankings of the documents in the control subset comprises at least one of the following criteria: an F-measure; a precision parameter, and a recall parameter.

Additionally in accordance with certain embodiments of the present invention, the set of issues comprises a plurality of issues and also comprising a multi-issue manager operative to monitor the system's analysis of relevance of the at least N documents to each of the plurality of issues and to prompt at least one of the user and the system if relevance has not been analyzed for some of the plurality of issues.

Further in accordance with certain embodiments of the present invention, the set of issues comprises a plurality of issues and also comprising a multi-issue manager operative to monitor the system's analysis of relevance of the at least N documents to each of the plurality of issues and to prompt at least one of the user and the system if relevance has not been analyzed for some of the plurality of issues.

Still further in accordance with certain embodiments of the present invention, the set of issues comprises a plurality of issues and also comprising a multi-issue manager operative to monitor the system's analysis of relevance of the at least N documents to each of the plurality of issues and to prompt at least one of the user and the system if relevance has not been analyzed for some of the plurality of issues.

Further in accordance with certain embodiments of the present invention, the binary relevance data is generated by using a second control set of documents to select a cut-off point from among a plurality of possible cut-off points.

Further in accordance with certain embodiments of the present invention, the first control set is identical to the second control set.

Still further in accordance with certain embodiments of the present invention, the method also comprises seeking an input as to whether or not to return to the receiving step thereby to initiate a new iteration I+1 including the receiving, building and running and initiating the new iteration I+1 if and only if so indicated by the input.

Further in accordance with certain embodiments of the present invention, the input is a function of at least one of a precision value, recall value and F-measure currently characterizing the classifier.

Still further in accordance with certain embodiments of the present invention, the binary relevance determining apparatus comprises iterative apparatus and wherein cost effectiveness information includes information regarding a budget required to enable continued use of the iterative apparatus.

Additionally in accordance with certain embodiments of the present invention, the information regarding a budget comprises a culling percentage computed by generating a graph of a relevance determination quality criterion characterizing the iterative apparatus's performance during an iteration as a function of a serial number of the iteration; and computing an integral thereof.

Further in accordance with certain embodiments of the present invention, the method also comprises classifying each document from among the N documents as relevant or irrelevant to an issue; and generating a computer display of at least one user-selected document within the N documents, wherein at least some words in the user-selected document are differentially presented depending on their contribution to the classifying of the document as relevant or irrelevant.

Still further in accordance with certain embodiments of the present invention, the words differentially presented are differentially colored and wherein intensity of color is used to represent strength of the contribution for each word.

Further in accordance with certain embodiments of the present invention, the method also comprises sequentially removing certain sets of words from each individual document classified and using the text classifier to classify the document's relevance assuming the words are removed, thereby to obtain a relevance output for each set of words, and comparing the relevance output to an output obtained by using the text classifier to classify the individual document without removing any words, thereby to obtain an indication of the contribution of each set of words to the relevance of the document.

It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof.

Certain embodiments of the present invention seek to provide improved apparatus and methods for computerized learning.

Precision, recall and "F-measure" are measures for evaluating performance of an information retrieval system, given a collection of documents and a query. Each document is known to be either relevant or non-relevant to a particular query, unless the query is ill-posed in which case there may be gradations of relevancy of each document thereto. The "F-measure" may be regarded as a measure of quality of an expert's relevant/not relevant document marking process.

According to certain embodiments of the present invention, learning progresses wherein a suitable measure of the progress of the learning is used to decide when to stop, such as the empirical F-measure. The machine learns in rounds, each round working on a control group of documents other than the documents it was trained on. The machine then computes the F-measure for that round. The F-measure which is expected after an additional N (say, 10) rounds is estimated, along with a standard deviation characterizing the estimation. If this information implies that additional rounds will result in significant additional learning, additional rounds are performed. However if the above information implies that diminishing returns are to be expected in that additional rounds will not result in significant additional learning or in significantly better performance, learning is terminated and no additional rounds are performed.

There is thus provided, in accordance with at least one embodiment of the present invention, a learning method comprising executing a plurality of learning iterations each characterized by precision and recall, only until a diminishing returns criterion is true, including executing at least one learning iteration, computing the diminishing returns criterion; and subsequently, executing at least one additional learning iteration only if the diminishing returns criterion is not true, wherein the diminishing returns criterion returns a true value if and only if a non-decreasing function of one of the precision and the recall is approaching a steady state.

Further in accordance with at least one embodiment of the present invention, the non-decreasing function comprises an F measure.

Still further in accordance with at least one embodiment of the present invention, the criteria returns a true value if and only if a standard deviation of the F measure is below a threshold value.

Additionally in accordance with at least one embodiment of the present invention, the F measure comprises a most recent F measure.

Still further in accordance with at least one embodiment of the present invention, the criterion is computed by using linear regression to compute a linear function estimating a F measure obtained in previous iterations as a function of a log of a corresponding iteration number; generating a prediction of at least one F measure at at least one future iteration by finding value along the linear function corresponding to a log of the future iteration, comparing the prediction to a currently known F measure and returning true if the prediction is close to the currently known F measure to a predetermined degree.

Additionally in accordance with at least one embodiment of the present invention, the learning comprises learning to perform a classification task.

Further in accordance with at least one embodiment of the present invention, the learning comprises learning to use a Support Vector Machine in the classification task.

Yet further in accordance with at least one embodiment of the present invention, the non-decreasing function is a non-decreasing function of the precision and of the recall.

Additionally in accordance with at least one embodiment of the present invention, the linear regression is weighted so as to assign more importance to later iterations, relative to earlier iterations.

Further in accordance with at least one embodiment of the present invention, the method also comprises employing a Support Vector Machine to perform the classification task.

Still further in accordance with at least one embodiment of the present invention, the executing comprises computing a linear function estimating a logarithmic transformation of an F measure; and setting the criterion to true if the linear function is approaching a steady state.

Additionally in accordance with at least one embodiment of the present invention, the setting comprises computing first and second values of the linear function at, respectively, a first point corresponding to a number of iterations already performed and a second point corresponding to a number of iterations more than all of which were already performed, and setting the criterion to true if the difference between the first and second values is pre-determinedly small.

Further in accordance with at least one embodiment of the present invention, the setting comprises setting the criterion to true if at least one estimated future value of the linear function has a standard deviation which falls below a threshold.

Additionally in accordance with at least one embodiment of the present invention, the F measure comprises an unweighted F measure in which precision and recall are equally weighted.

Further in accordance with at least one embodiment of the present invention, the F measure comprises a weighted F measure in which precision and recall are unequally weighted.

Certain embodiments of the present invention seek to provide an improved system for performing item inspection having binary output.

There is thus provided, in accordance with at least one embodiment of the present invention, a method for enhancing expert-based processes when receiving input from a plurality of experts operating a corresponding plurality of computerized expert-based processes on a body of data, the data including an agreement set including at least one point of agreement regarding which all of the plurality of experts agree, the method comprising determining a discrepancy set including at least one point of discrepancy regarding which less than all of the plurality of experts agree, the determining including performing a computerized comparison of input received from the plurality of experts thereby to identify points of discrepancy, providing at least a portion of the discrepancy set to an oracle and receiving oracle input from the oracle resolving at least the point of discrepancy; and selecting a subset of better computerized expert-based processes, from among the plurality of computerized expert-based processes, based on the oracle input.

Further in accordance with at least one embodiment of the present invention, the input comprises a quality assurance indication regarding a multiplicity of manufactured items.

Still further in accordance with at least one embodiment of the present invention, the input comprises a determination of relevancy of a multiplicity of disclosed documents to a legal proceeding.

Additionally in accordance with at least one embodiment of the present invention, the input comprises a determination of relevancy of a multiplicity of disclosed documents to a search term entered into a search engine.

Further in accordance with at least one embodiment of the present invention, only the discrepancy set, and not the agreement set, is provided to the oracle.

Also in accordance with at least one embodiment of the present invention, the oracle comprises a computerized process which is more costly than the plurality of experts.

Further in accordance with at least one embodiment of the present invention, the selecting comprises using the oracle input and the input from the plurality of experts to estimate recall of an individual one of the plurality of experts.

Still further in accordance with at least one embodiment of the present invention, the selecting comprises using the oracle input and the input from the plurality of experts to estimate precision of an individual one of the plurality of experts.

Also in accordance with at least one embodiment of the present invention, each of the expert-based processes has a binary output defining a first desired output value and second undesired output values and also comprising using the oracle input and the input from the plurality of experts to estimate richness of the body of data including the proportion of the body of data having the first output value.

Additionally in accordance with at least one embodiment of the present invention, the oracle input resolves less than all of a total number of points of discrepancy in the discrepancy set by randomly sampling a subset of the total number of points of discrepancy.

Also in accordance with at least one embodiment of the present invention, each of the expert-based processes has a binary output defining first and second output values and wherein the discrepancy set includes a first set of points of discrepancy in which first and second experts from among the plurality of experts output the first and second output values respectively and a second set of points of discrepancy in which first and second experts from among the plurality of experts output the second and first output values respectively.

Additionally in accordance with at least one embodiment of the present invention, the portion of the discrepancy set comprises a random sample of each of the first and second sets.

Further in accordance with at least one embodiment of the present invention, the method also comprises receiving input from a plurality of experts operating a corresponding plurality of computerized expert-based processes on a body of data.

Still further in accordance with at least one embodiment of the present invention, the body of data comprises a population of items each associated with a unique computer-readable ID.

Additionally in accordance with at least one embodiment of the present invention, each of the plurality of computerized expert-based processes comprises analyzing an individual item from among the population of items including determining a binary output representing the analyzing; and generating a computerized representation of the binary output and associating the representation with the ID.

Further in accordance with at least one embodiment of the present invention, the method also comprises actuating the subset of better computerized expert-based processes for purposes of receiving input regarding a body of data.

Also provided, in accordance with at least one embodiment of the present invention, is a computer program product, comprising a computer usable medium having a computer readable program code embodied therein, the computer readable program code adapted to be executed to implement a method for enhancing expert-based processes, the method comprising receiving input from a plurality of experts by operating a corresponding plurality of expert-based processes on a body of data, the input including a discrepancy set including at least one point of discrepancy regarding which less than all of the plurality of experts agree and an agreement set including at least one point of agreement regarding which all of the plurality of experts agree, receiving oracle input from an oracle resolving at least the point of discrepancy and not resolving any point of agreement in the agreement set; and selecting, and subsequently actuating for purposes of receiving input regarding the body of data, a subset of better experts from among the plurality of experts based on the oracle input.

Further provided, in accordance with at least one embodiment of the present invention, is a computerized system for enhancing expert-based processes, the system comprising a computerized expert based data analyzer receiving input from a plurality of experts by operating a corresponding plurality of expert-based processes on a body of data, the input including a discrepancy set including at least one point of discrepancy regarding which less than all of the plurality of experts agree and an agreement set including at least one point of agreement regarding which all of the plurality of experts agree, an oracle from which oracle input is received resolving at least the point of discrepancy and not resolving any point of agreement in the agreement set; and wherein the computerized analyzer is operative to select and to subsequently actuate for purposes of receiving input regarding the body of data, a subset of better experts from among the plurality of experts based on the oracle input.

Also provided, in accordance with at least one embodiment of the present invention, is a computer program product, comprising a computer usable medium having a computer readable program code embodied therein, the computer readable program code adapted to be executed to implement a learning method comprising executing a plurality of learning iterations each characterized by precision and recall, only until a diminishing returns criterion is true, including executing at least one learning iteration, computing the diminishing returns criterion; and subsequently, executing at least one additional learning iteration only if the diminishing returns criterion is not true, wherein the diminishing returns criterion returns a true value if and only if a non-decreasing function of one of the precision and the recall is approaching a steady state.

Also provided, in accordance with at least one embodiment of the present invention, is a computerized learning system comprising an iterated learning subsystem executing a plurality of learning iterations each characterized by precision and recall, only until a diminishing returns criterion is true, including iterating apparatus for executing at least one learning iteration and a criterion computer operative to compute the diminishing returns criterion, wherein the iterating apparatus executes at least one additional learning iteration only if the diminishing returns criterion is not true, and wherein the diminishing returns criterion returns a true value if and only if a non-decreasing function of one of the precision and the recall is approaching a steady state.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product,

BRIEF DESCRIPTION OF THE DRAWINGS

Certain embodiments of the present invention are illustrated in the following drawings:

FIGS. 14A-14K are simplified pictorial illustrations of example screen displays generated during an example work-session in which the system of FIG. 2 performed the method of FIG. 1, including setup step 10 (FIG. 14A), interactive ranking step 20 (FIGS. 14B-14C), result sampling step 30 (FIGS. 14D-14F), and final result generation step 50 (FIGS. 14G-14K).

FIGS. 18A-18C are tables presenting an example use of a computerized system embodying the method of FIG. 1.

FIGS. 21A & 21B taken together form a simplified flowchart illustration of a computerized method for performing the result sampling step of FIG. 1, the method being operative in accordance with certain embodiments of the present invention.

FIGS. 23A-23B, taken together, form a simplified flowchart illustration of an electronic document analysis method receiving N electronic documents pertaining to a case encompassing a set of issues including at least one issue and establishing relevance of at least the N documents to at least one individual issue in the set of issues, the method comprising, for at least one individual issue from among the set of issues, the method being operative in accordance with certain embodiments of the present invention.

DETAILED DESCRIPTION OF CERTAIN EMBODIMENTS

Figure 1:
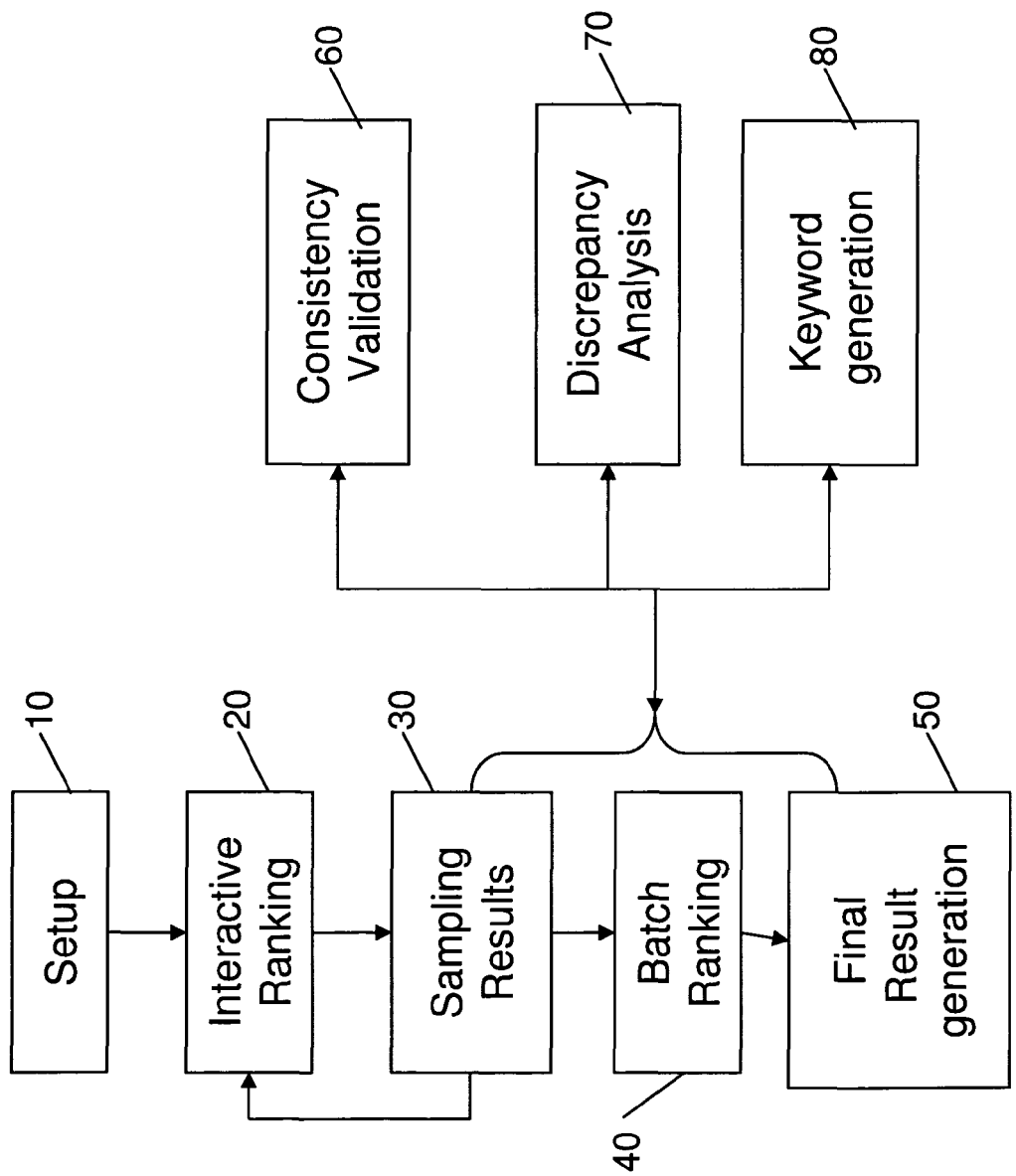
FIG. 1 is a simplified flowchart illustration of an electronic document analysis method operative in accordance with certain embodiments of the present invention.

FIG. 1 is a simplified flowchart illustration of an electronic document analysis method operative in accordance with certain embodiments of the present invention.

Figure 2:
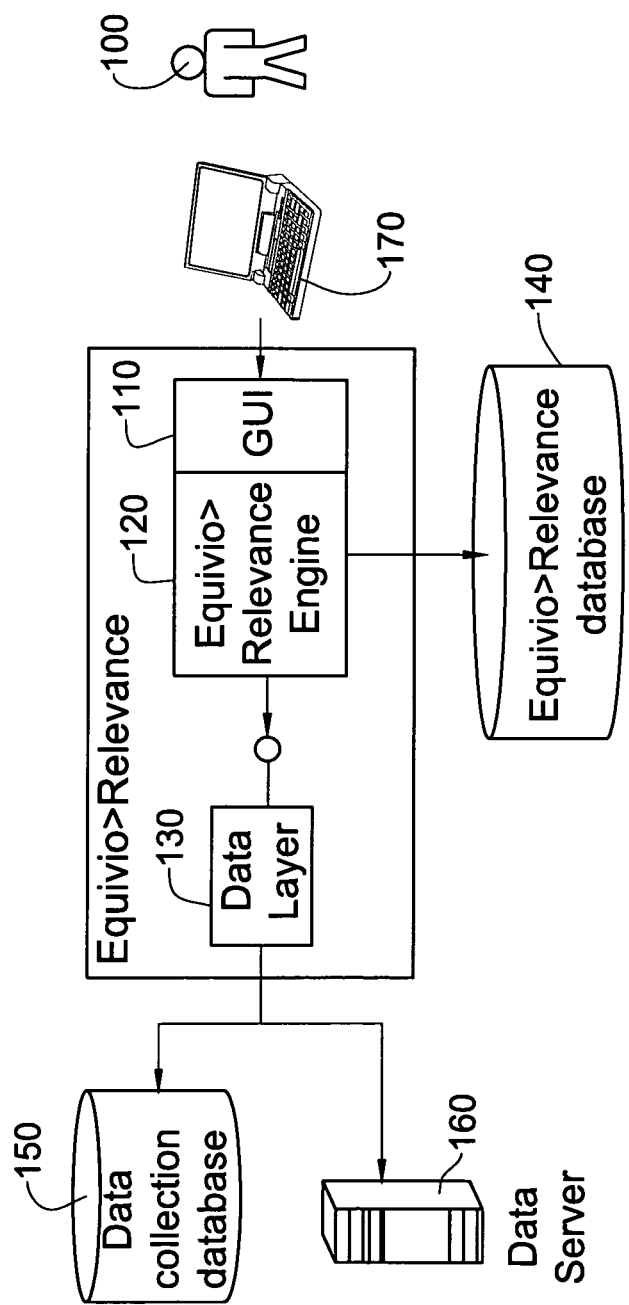
FIG. 2 is a simplified functional block diagram of a system for enhancing expert-based analysis of a set of digital documents, constructed and operative in accordance with certain embodiments of the present invention and useful for performing the method of FIG. 1.

The method of FIG. 1 is a suitable workflow for the application of FIG. 2 as shown in FIG. 1. The method of FIG. 1 typically includes some or all of the following steps, suitably ordered e.g. as shown: Step 10: Setup of admin settings and a series of settings that are defined by the SME 100. The Admin settings define the technical properties of the case, such as case name, link to Data Layer 130, output database, a list of reviewers (SMEs) etc. The SME settings define the initial settings for the culling process, such as an initial set of keywords and custodian rankings. These elements can enhance the iterative process. The Admin settings are mandatory. With the exception of the list of reviewers, the setup settings cannot be modified once sampling has begun. Step 20 (Interactive Ranking) is an iterative process in which the subject matter expert 100 ranks samples of documents for relevance. The subject matter expert 100 is presented with a set of documents, selected by the application; a typical sample size is 20-50 documents. The subject matter expert 100 reviews these documents, deciding on the relevance level of each document. The meaning of "relevance" may change from case to case. As long as consistent criteria are used in a given case, the semantic meaning of relevance is transparent to the application. When all documents in the sampled set are ranked, the subject matter expert 100 can move on to view the Sample Results (step 30).

Step 30: Using the subject matter expert 100's relevance decisions on the sample documents, the method of FIG. 1 analyzes the accuracy of the existing Classifier/s. With each additional sample, the accuracy of the Classifier/s is progressively enhanced, eventually reaching a maximum point. The progress of the Classifier/s is indicated to the subject matter expert 100 by a Classifier/s stability evaluating functionality as described in detail herein. The SME 100 reviews these results and decides whether to perform another iteration of Interactive Ranking, to improve the Classifier/s. For example, the subject matter expert 100 may see that the Classifier/s have remained "stable" for the last 5 samples. This indicates that the Classifier/s have reached their maximum level of accuracy. If the subject matter expert 100 is satisfied with the results, he can move on to the next step, Batch Ranking. If not, the subject matter expert 100 would continue with the next sample for Interactive Ranking.

A classifier as used herein typically includes a text classifier utilizing as input, relevant/non-relevant tags generated by a manual process e.g. by a human expert and optionally on metadata. The output of the classifier typically comprises a "rank" between 0 and 1 which represents the certainty that a particular input is relevant or non-relevant, depending on how close the input is to 0 or 1.

Steps 20 and 30 may be repeated 30-40 times until an appropriate stopping criterion is reached e.g. as described e.g. as described hereinbelow.

Step 40: Once the Classifier/s have stabilized, e.g. as described herein in FIGS. 15A-16B, the subject matter expert 100 activates batch ranking step 40. Batch ranking is an automatic process which computes a relevance score for all the documents in the population. The results are stored in a relevance database 140 (FIG. 2).

Step 50: The system of FIG. 2 presents the subject matter expert 100 with the final results of the entire document population. The main report presents the distribution of documents by relevance score. The subject matter expert 100 can launch the extract utility shown and described hereinbelow to create a load file (or database table), to facilitate loading of the results into the data collection database 150.

FIG. 2 is a simplified functional block diagram of a system for enhancing expert-based analysis of a set of digital documents and the system's interaction with external components and with a typically human subject matter expert (SME) 100. The system of FIG. 2 typically comprises: (a) a GUI 110: a subject matter expert 100 activates the application of FIG. 2 using either a Web GUI, or a local Windows application; (b) an Engine 120 performing some or all of the processing shown and described herein including computation of relevance scores; and (c) a Data layer 130 used to integrate the system of FIG. 2 with external systems in a standard manner. The Data layer 130 comprises an interface which enables access to the collection data, including both the document content and metadata. The data itself would typically reside in a data collection database 150 or a data server 160 that manages the data. The Data layer 130 creates a buffer between the system of FIG. 2 and the data, eliminating the need for the system of FIG. 2 to access the data directly, other than certain possible exceptions to this rule as described herein.

The system of FIG. 2 uses a Relevance Database 140 to store interim and final processing results. For example, the system of FIG. 2 may support MS SQL Server and MySQL. The system of FIG. 2 may operate in conjunction with a software development kit that allows activation of the application without the default GUI. A web connection 170 provides interaction between the system and the subject matter expert 100.

The inputs to the system and method of FIGS. 1-2 typically include at least the following and optionally only the following:

(a) a list of the documents in a collection of documents whose relevance (e.g. to a given case regarding which an electronic document discovery process is to be performed) is to be determined; and (b) the actual content of the documents themselves. Both inputs are now described in detail.

(a) List of documents: The system of FIG. 2 typically receives a complete list of all documents in the collection, with their metadata. For each document, the data can include some or all of the following metadata items: Document ID, Custodian, Date, Size, Path, Content of document (if available), and Family ID. The Document ID may be used to retrieve the actual documents.

(b) Document content: The system of FIG. 2 obtains the content of each document in the collection. The content is typically provided in simple text format. This can be achieved in various ways such as but not limited to:

(i) From the metadata itself, if the metadata includes the actual content of the document (see above)

(ii) If the metadata of the documents includes the file path, the system of FIG. 2 can directly retrieve the document (iii) Via a document retrieval service, using suitable Services from a Host Environment as described in detail below. Given a set of document IDs, this service returns the matching set of documents.

The metadata and document content input is supplied to the system of FIG. 2 by the Data Layer 130. Using a suitable pre-defined interface the Data Layer 130 typically extracts the required metadata and content from the data collection database 150 or data server 160, using suitable host environment services as described in detail below.

More specifically, the list of documents (a) typically comprises a pre-defined table with the metadata of all documents in the collection. The table schema is demonstrated by the following SQL statement, in which only the DocID column is mandatory and the Content column contains the document itself, if available.

| CREATE TABLE documents | |
|---|---|
| ( | |
| DocId | Integer, |
| Custodian | VarChar, |
| Date | DateTime, |
| Size | Integer, |
| Path | VarChar, |
| Content | Blob, |
| FamilyId | Integer |
| ) | |

If the document is available at a given location, the supported path formats are HTTP and ENC.

The Data Layer 130 provides host environment services operative to retrieve and deliver the input data for the system of FIG. 2 which may be implemented as WebServices. These services may include some or all of the following:

(i) Documents retrieval service: Given a set of document IDs, this service retrieves the documents. The service can return either the document path, or the actual content of the document and may be represented as:
GetDocuments(
in DocIds,
out Documents,
out Errors);

The Document object may include metadata (e.g. if this data is not available in the list of documents view). It also includes a status indicator, with values such as but not limited to success and unavailable. The document content must be in simple text format.

This service may implement one of the three approaches for obtaining document content described above. If the metadata of a document is not provided together with the list of documents, it can also be provided to the system of FIG. 2 together with the document content. Due to performance considerations, this service is designed to handle sets of documents, rather than individual documents.

(ii) Search engine service: Given a set of documents IDs (or, optionally, all documents), this service retrieves the documents that meet the query filter criterion (e.g. a set of separate keywords, an expression). The search engine service may be represented as:
GetFilteredDocuments(
in DocIds,
in Filter,
out Documents);

The format of the filter parameter depends on the functionality of the search engine. The Document object is the same as in the Get Documents service.

If the subject matter expert 100 decides to initialize the process by entering a preliminary list of keywords, the system of FIG. 2 uses the search engine to retrieve the matching documents for the initial subject matter expert 100 sample. The search engine is typically supported by the Data Layer 130. Given a set of keywords, the service invokes a search engine to return the relevant list of documents. The format and expressiveness of the query depends on the functionality of the search engine.

(iii) Document view service: Given a path to a document (or document ID), this service presents the document in its original format. This can be performed using a command line, The system of FIG. 2 typically receives the documents in simple text format. By default, the documents are presented to the subject matter expert 100 for review in this format. In order for the subject matter expert 100 to review the document in its original or native format (e.g. as a Word or PDF document and not as simple text), the system of FIG. 2 may utilize a service provided by data layer 130 that, given a document, presents it as required.

(iv) Document list generation: The Data Layer 130 typically provides a service that lists all the documents in the collection, together with relevant metadata, and, in some cases, document content, as described above.

The outputs from the system and method of FIGS. 1-2 typically include at least the following: (a) a relevance score computed for each document in the collection and (b) a set of keywords. The output data is exported by the Extract Utility into database tables or a CSV file, depending on user preference. The output data can then be loaded into the data collection database 150.

The SME 100 can set a cut-off policy to split the collection into two groups: documents with the highest relevance scores are flagged for survival; the others are flagged for culling. The cut-off rate can be determined in several ways, for example by the number of documents to be reviewed (according to resources assigned to the case) and/or by the distribution of relevance scores. The user has the option of fine-tuning the culling criteria by applying different cut-off policies to different parts of the population. For example, in a given case, the user might prefer to set a lower relevance threshold for CEO documents than for other documents. This can be implemented using SQL queries, by directly accessing the Relevance database 140 or extract tables. Alternatively, the subject matter expert 100 can use the list of keywords computed by the system of FIG. 2 to differentiate between relevant and non-relevant documents using, for example, a standard search engine.

The output data for each document typically includes some or all of the following: Document ID; Metadata from input; Final decision: Cull or Survive (if a cut-off rate was set); Relevance score; the main keywords relevant to the document; and Status: for errors, if occurred (e.g. file was corrupted)

The output document data comprises a predefined table format containing data on all processed documents. The table schema is demonstrated by the following SQL statement:

---
CREATE TABLE extract_documents
---
(
DocId                Integer,
RelevanceScore       Integer,
IsCulled             Boolean,
Keywords             VarChar,
Status               VarChar,
//metadata
Custodian            VarChar,
Date                 DateTime,
Size                 Integer,
Path                 VarChar
)
---

The system of FIG. 2 also generates a log file including a log of application-generated messages. These messages record the application flow and user selections, such as SME rankings, allowing full reconstruction of application behavior. The table schema for the Relevance log is demonstrated by the following SQL statement:

---
CREATE TABLE extract_log
---
(
Id       Integer,
Date     DateTime,
Type     Integer,
DocId    Integer,
Message  VarChar
)
---

Figure 20:
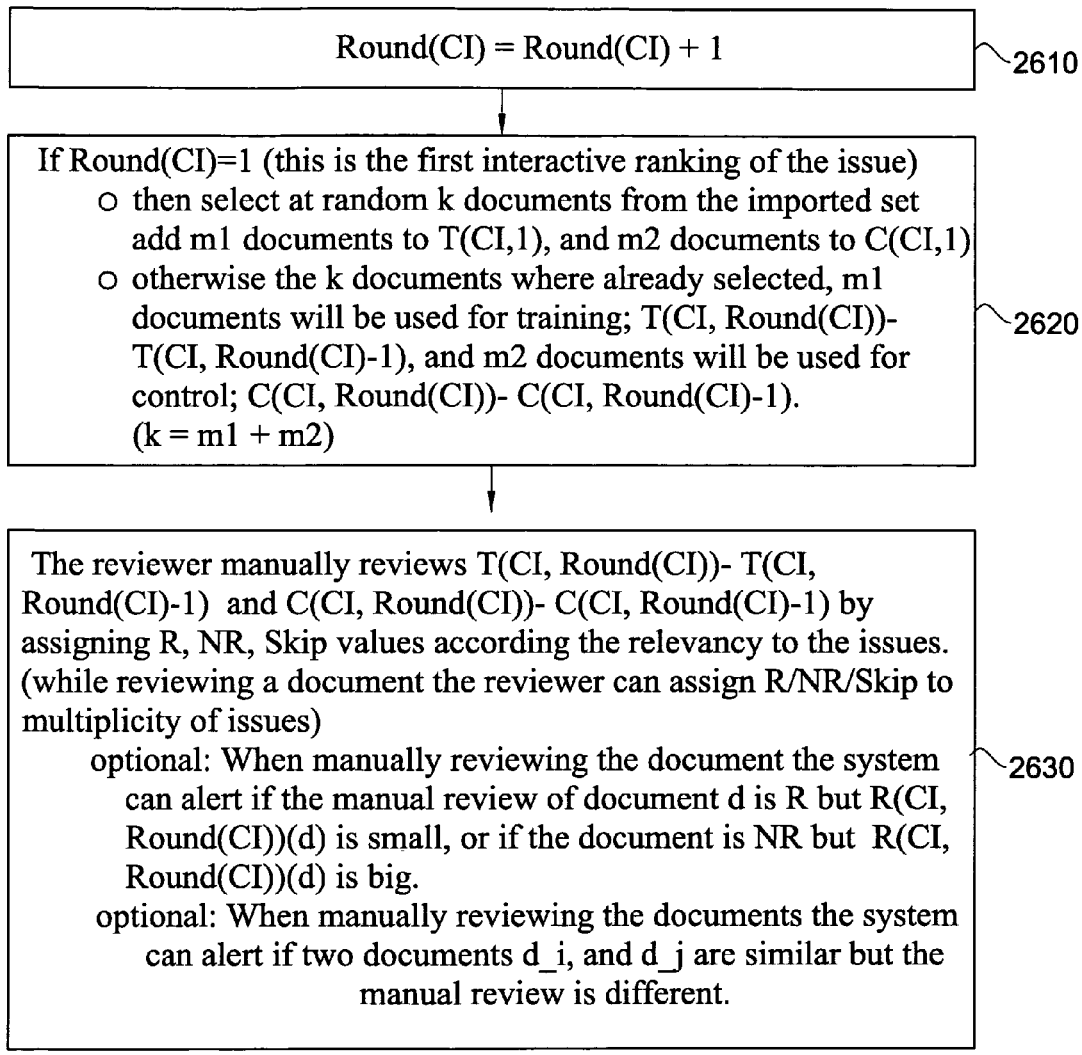
FIG. 20 is a simplified flowchart illustration of a computerized method for performing the interactive ranking step of FIG. 1, the method being operative in accordance with certain embodiments of the present invention.
Figure 21B:
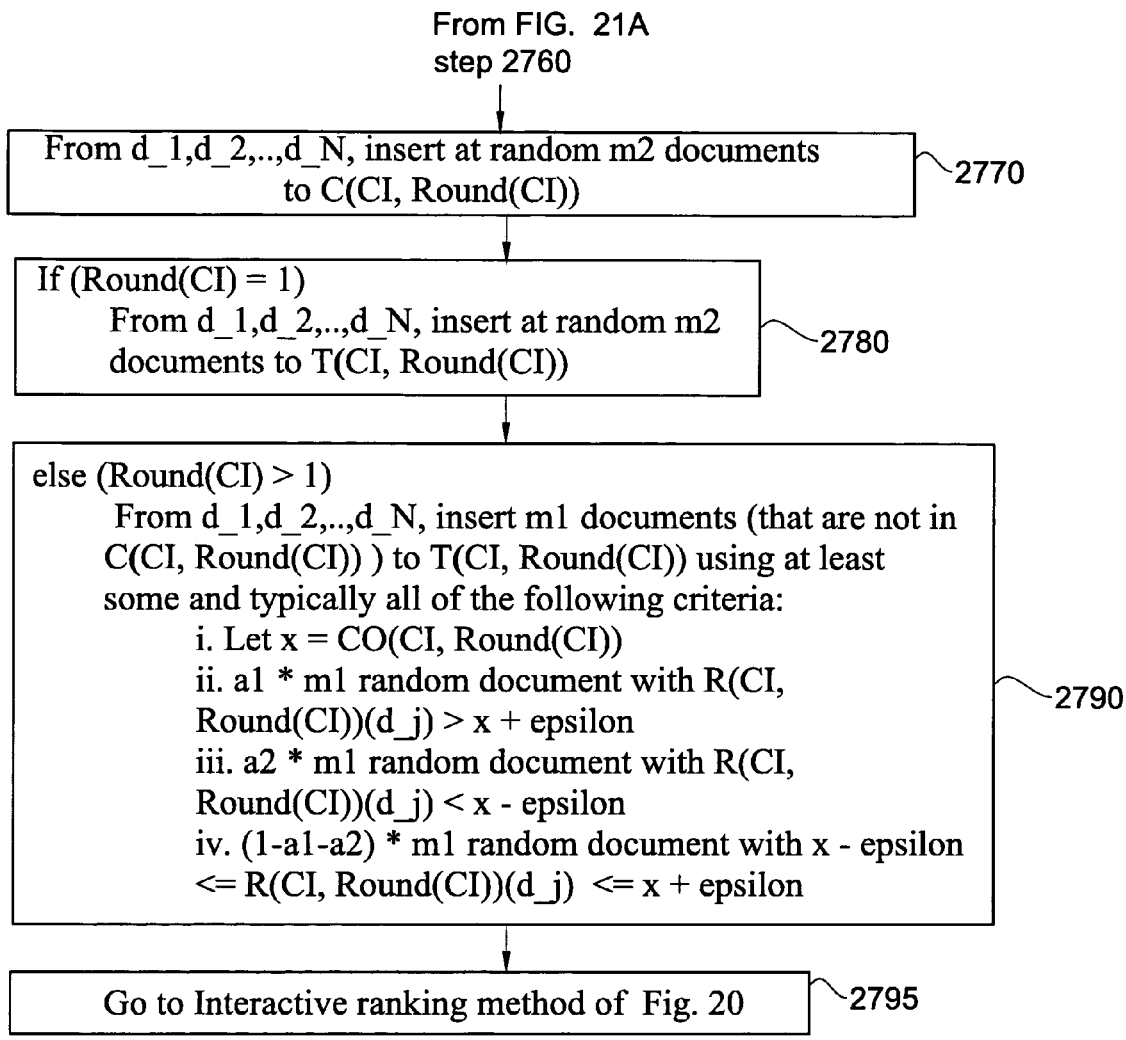

The following notation is now employed:
Round(issue): The last interactive round of an issue
C(issue,round): The classifier generated for issue at round
R(issue,round)(doc): The classifiers C(issue,round) rank for doc
T(issue,round): The set of all training document for issue until round.
C(issue,round): The set of all control document for issue until round.
Recall(issue,round): The optimal recall for issue at round.
Precision(issue,round): The optimal precision for issue at round.
F(issue,round): The optimal F measure for issue at round
CO(issue,round): The optimal cut-off point for issue at round
CI: The current issue One method for performing the set-up step 10 of FIG. 1 is described below with reference to FIG. 19. One method for performing the interactive ranking step 20 of FIG. 1 is described below with reference to FIG. 20. One method for performing the result sampling step 30 of FIG. 1 is described below with reference to FIG. 21 and one method for performing the optimal cut-off point computation step in FIG. 21 is described below with reference to FIG. 22.

The Batch ranking step 40 in FIG. 1 may include the following: For each issue ss that Stability(CI)=true, Use C(ss, Round(ss)) to compute ranks on all documents in the issue.

The Final result generation step 50 in FIG. 1 may include some or all of the following:

For each issue ss that passed Batch ranking, take the ranks computed in Batch ranking and draw an histogram of the ranks; and/or For each issue ss that passed Batch ranking; draw a graph, where x value a cut-off point and y value as F measure. The computation of the F measure (harmonic average of recall and precision) may be as follows: Set x as cut-off points, for all control documents C(ss, Round(ss)) sort their ranks.

Consistency check 60 may for example comprise the following steps:

a. Apply a suitable near-duplicate identifying functionality to the document collection. A suitable near-duplicate identifying functionality is described in Published PCT Patent Application No. PCT/IL2005/000726, entitled "A method for determining near duplicate data objects" and published as WO 2006/008733 A2, b. While manual ranking by an expert is ongoing, alert expert when document d_i is determined in step (a) to be similar to document d_j yet they assigned differently, either (d_i as R and d_j as NR) or (d_j as R and d_i as NR).

Figure 17:
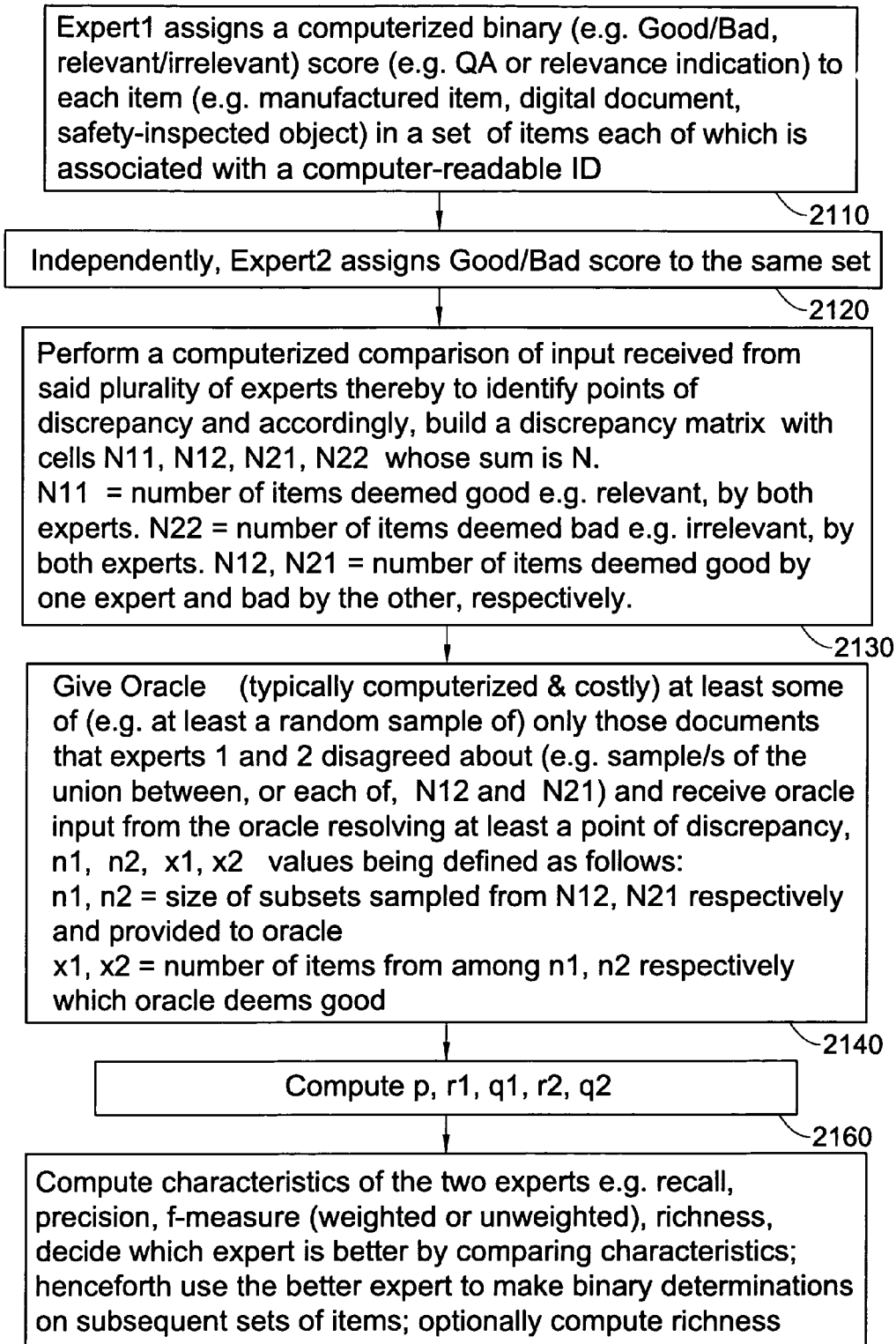
FIG. 17 is a simplified flowchart illustration of a computerized method for comparing experts constructed and operative in accordance with certain embodiments of the present invention.

The Discrepancy analysis step 70, for an individual issue ss, may comprise the method of FIG. 17 where Expert1 comprises the output of the most recently generated classifier for the current issue ss, binarized using the most recent cut-off point for the current issue ss.

Any suitable conventional method for keyword generation may be employed, e.g. as follows: In a support vector machine, the system is trained with R (relevant) and NR (not relevant) examples. Each document is treated as a vector $v=v\_1, v\_2, v\_3, \ldots v\_n$; where $v\_i$ is the frequency of the feature I and a "feature" may comprise an m-gram or any other feature of the document as for example meta-data. It is appreciated that $v\_i$ may be replaced by a binary indication of the presence or absence of an m-gram (string of m words) in a document. The support vector machine output (the classifier) is an hyper-plane $p=p\_1, p\_2, , p\_n$; classification of a document is the inner product of the document vector and the hyper-plane p. The keywords are X features with the largest p values, and the Y features with the smallest p values.

A feature may also for example comprise an n-gram of the subject, in e-mail applications. For example, consider an email in which the subject is a b c and the body of the email (content) is a b c d a b. If w 1-grams and 2-grams are being used as features, the features are then S(a), S(b), S(c), S(ab), S(bc), C(a), C(b), C(c), C(d), C(ab), C(bc), C(cd), C(da). In the vector space the values for the features is their frequency:

S(a)=1/3, S(b))=1/3, S(c))=1/3, S(ab)=1/2, S(bc))=1/2, C(a)=2/6, C(b)=2/6, C(c)=1/6, C(d)=1/6, C(ab)=2/5, C(be)=1/5, C(cd)=1/5, C(da)=1/5.

It is appreciated that there are many types of classifiers such as but not limited to SVM, Bayesian, C45 classifiers.

The Keyword generation step 80 may include one or both of the following operations; for an issue ss; assume that a text classifier C(ss, Round(ss)) already exists e.g. was generated by conventional methods:

a. For each feature f in the feature space (usually 20000) features; compute the rank of R(CI, Round(CI))(d) where d is the document containing only one feature f. (i.e classification of the vector v, where all entries in v are zero, and the value of that corresponding feature f is 1).

b. Take the first m highest scores as "include" keywords, and the n smallest scores as "exclude" keywords. The "include" keywords are those which are highly indicative in deciding whether to designate documents as R. The "exclude" keywords are those which are highly indicative in deciding whether to designate documents as NR.

The system of the present invention supports distributed processing for large collections and can be implemented and used for document culling in either standalone mode or, using an SDK (software development kit) e.g. as described below, can be tightly integrated into an existing customer's processing and database environment. The product supports the processing of both native and extracted files.

An example of a suitable SDK is now described. The input content is a collection of documents which may include emails. The outputs include a relevance score for each document and a list of keywords. Work with the document culling system of the present invention on any given case follows a defined work flow that is typically aligned with one of three common work scenarios: (a) Quality Assurance; (b) Evaluation; and (c) Interactive. Each of these scenarios is now described in detail below, (a) Quality Assurance Scenario: The motivation for using the Quality Assurance scenario is to validate the ranking of an entire document collection based on a subset of ranked documents. In this scenario all documents are ranked. A subset of train documents, referred to as Train Documents, is imported to the application shown and described herein which uses the existing document ranking in the subset to create a classifier. Then the rest of the document collection, referred to as Test documents, are imported, and Batch Ranking is performed on Test documents. The sample then creates a Recall and Precision report based on the input ranking of the test documents only.

(b) Evaluation Scenario: The motivation for using the Evaluation scenario is to assess the accuracy of the system shown and described herein by running it on a case that has already been fully reviewed. In this scenario the entire document collection is imported. Then the application shown and described herein chooses a sub-set from the documents and creates a classifier. Finally the application shown and described herein performs Batch Ranking on the entire collection. The sample then creates a Recall and Precision report on the system, based on the input ranking.

(c) Interactive Scenario: The motivation for using the Interactive scenario is to use the systems and methods shown and described herein to generate relevance scores and keywords for a document collection that has not previously been reviewed or ranked. The code illustrates the application flow shown and described herein for a case that has not been reviewed. The computerized system shown and described herein chooses a Manual Ranking set, an expert reviews and ranks the documents, and the rankings are then set in the system. The system creates a classifier based on this ranking. These steps are repeated iteratively until the generated Classifier produces satisfying results. The system shown and described herein then performs batch ranking on the entire collection.

An example workflow of the system of FIG. 2 in terms of an example of a suitable Relevance web-based GUI 110 of FIG. 2 is now described with reference to FIGS. 3-13.

Figure 3:
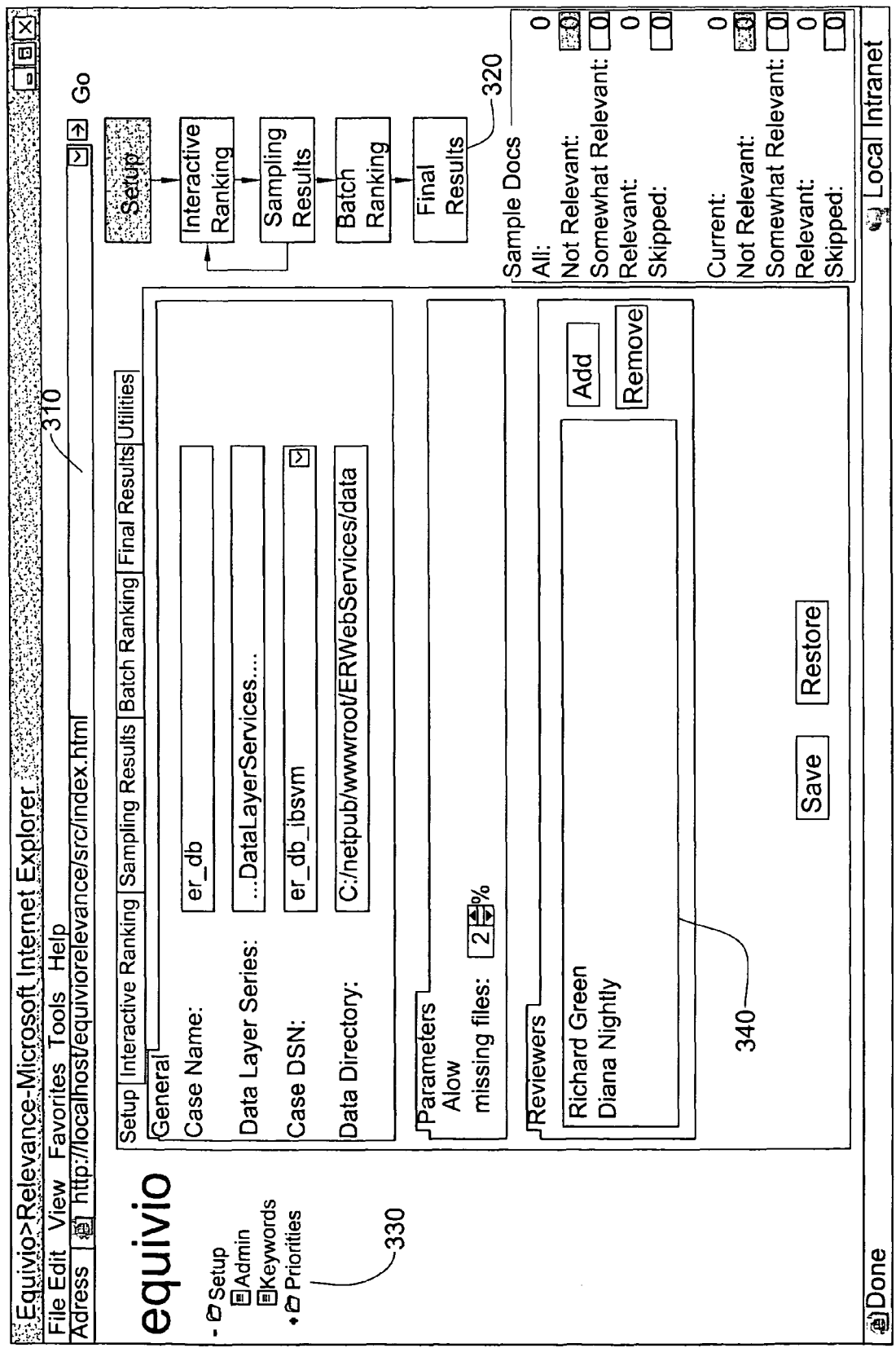
FIGS. 3-13 are simplified pictorial illustrations of screen displays generated by the GUI of FIG. 2, in accordance with certain embodiments of the present invention.

Relevance GUI Overview FIG. 3 shows the first screen of the application. The screen has a basic layout which may be common to all the application screens, including some or all of the following screen display components:

Tabs 310—there is a tab for each step of the method of FIG. 1 as well as an additional Utilities tab described in detail below; the selected tab correlates to the active step (the step or utility that is currently active).

Orientation map 320—the flow diagram of the application steps; the active step is highlighted. This map is for orientation only, and is not clickable for navigating between steps.

Navigation pane of active step 330—a tree view of the screens in the active step.

Main working frame 340—data and actions specific to the active step

Status information 350—displays the status of ranking: the number of ranked documents divided into the relevancy levels (in all iterations and in current iteration)

Referring now to FIG. 3, within Step 10 of FIG. 1, the first step performed by the subject matter expert 100 is configuring initial settings. This step is performed once for each case, assuming that each document collection being processed pertains to a single case. The settings may include Admin settings; Priorities—for Custodians, Periods and/or File sizes; and/or Keywords. The Admin Settings are technical settings that are used to start working. The Admin Setting may include indications of Case name, Data layer 130—allowing the system of FIG. 2 to connect to the Data Layer services, Case ODBC connection indicating the Relevance database 140 used for storing interim and final results, and/or Reviewers—the list of SMEs that are to perform manual ranking. The Admin Settings screen is shown in GUI overview FIG. 3.

Figure 4:
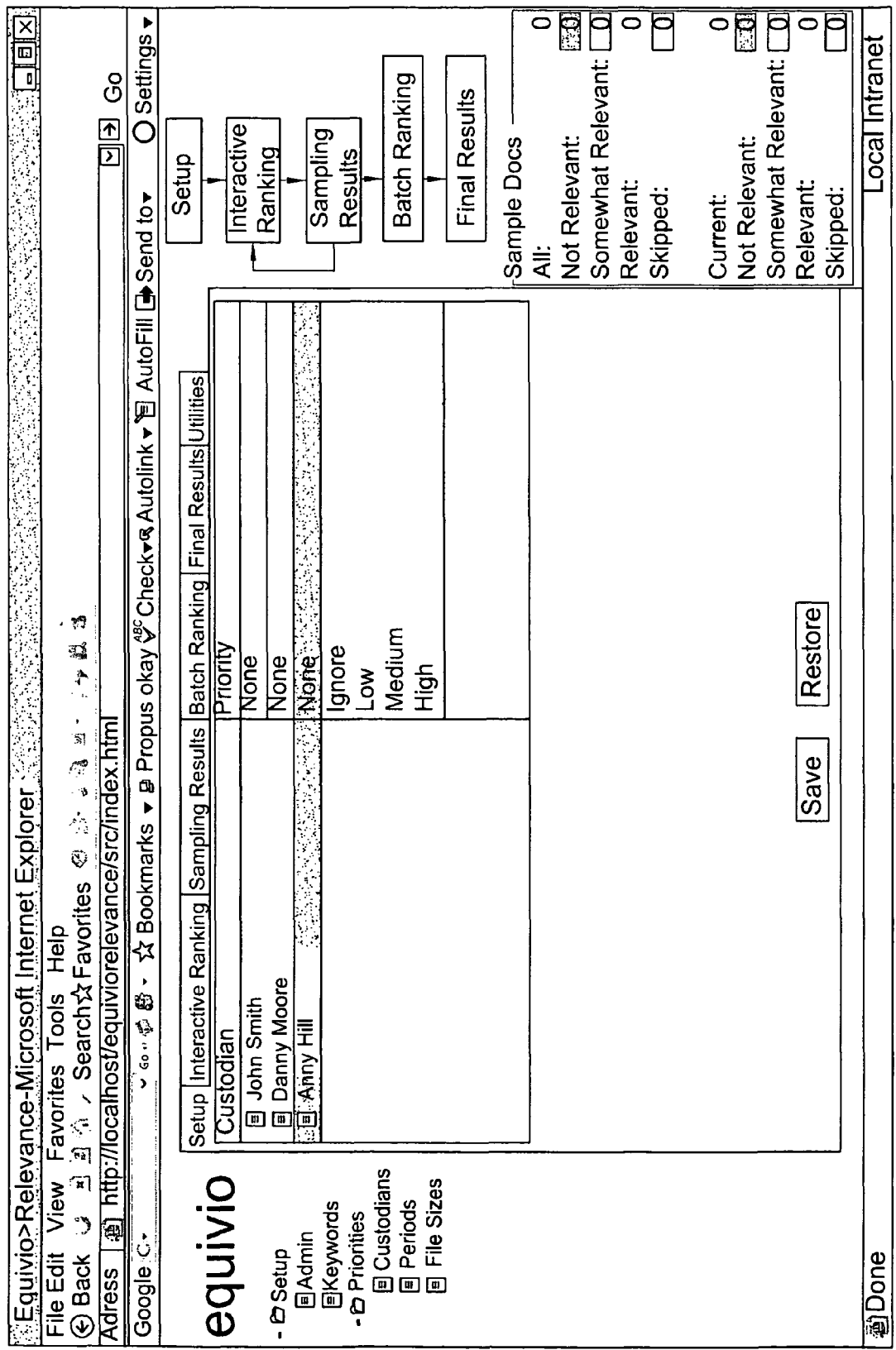

Referring now to FIG. 4, the subject matter expert 100 can prioritize the documents according to categories such as but not limited to one or more of the following: Custodian, Period and File size. The system of FIG. 2 typically takes these priorities into account when building the Classifier/s. Under each category, there are priorities such as High, Medium, Low and Ignore. For example, under the Custodian category, the subject matter expert 100 may set a High priority to the CEO's documents and a Low priority to documents whose custodian is the CEO's assistant. Documents that fit the Ignore priority will be assigned the minimum relevance score, ensuring that they will be culled. Priorities for each of the three categories are set in a separate, dedicated screen. FIG. 4 illustrates how the subject matter expert 100 sets the priorities for Custodians. Similar screens are available for setting priorities for Files Sizes and Periods. Priority setting is optional. The subject matter expert 100 may choose to skip this step, or to prioritize only some of the categories.

Figure 5:
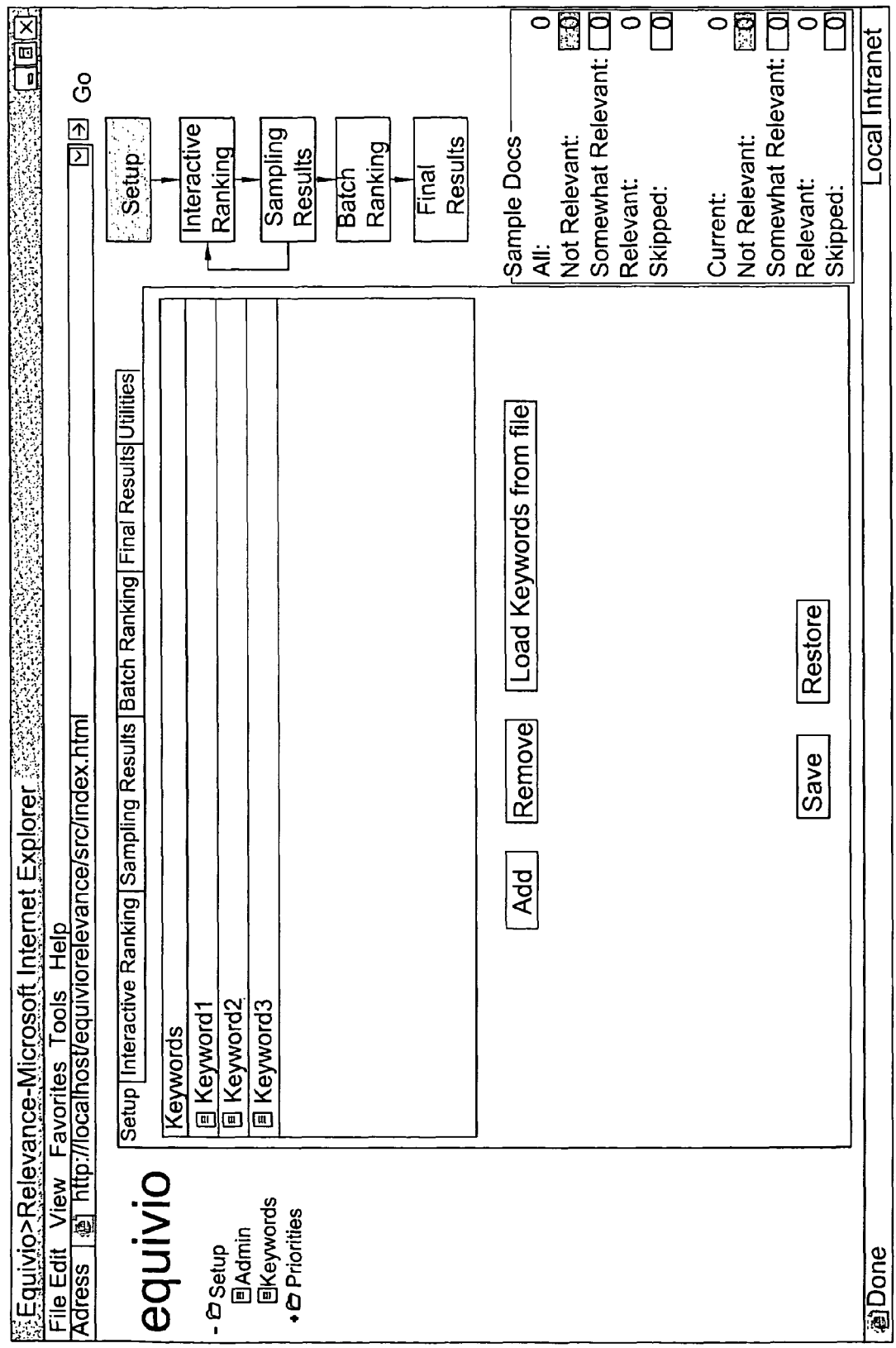

Referring now to FIG. 5, the subject matter expert 100 has the option to propose an initial set of keywords that are relevant for the case. This initial set of keywords is used to kick start the interactive process and to accelerate stabilization. The keywords initialization screen is illustrated in FIG. 5. The format of the keywords (e.g. single words or expressions) depends on the capabilities of the search engine supported by the Data layer 130.

Figure 6:
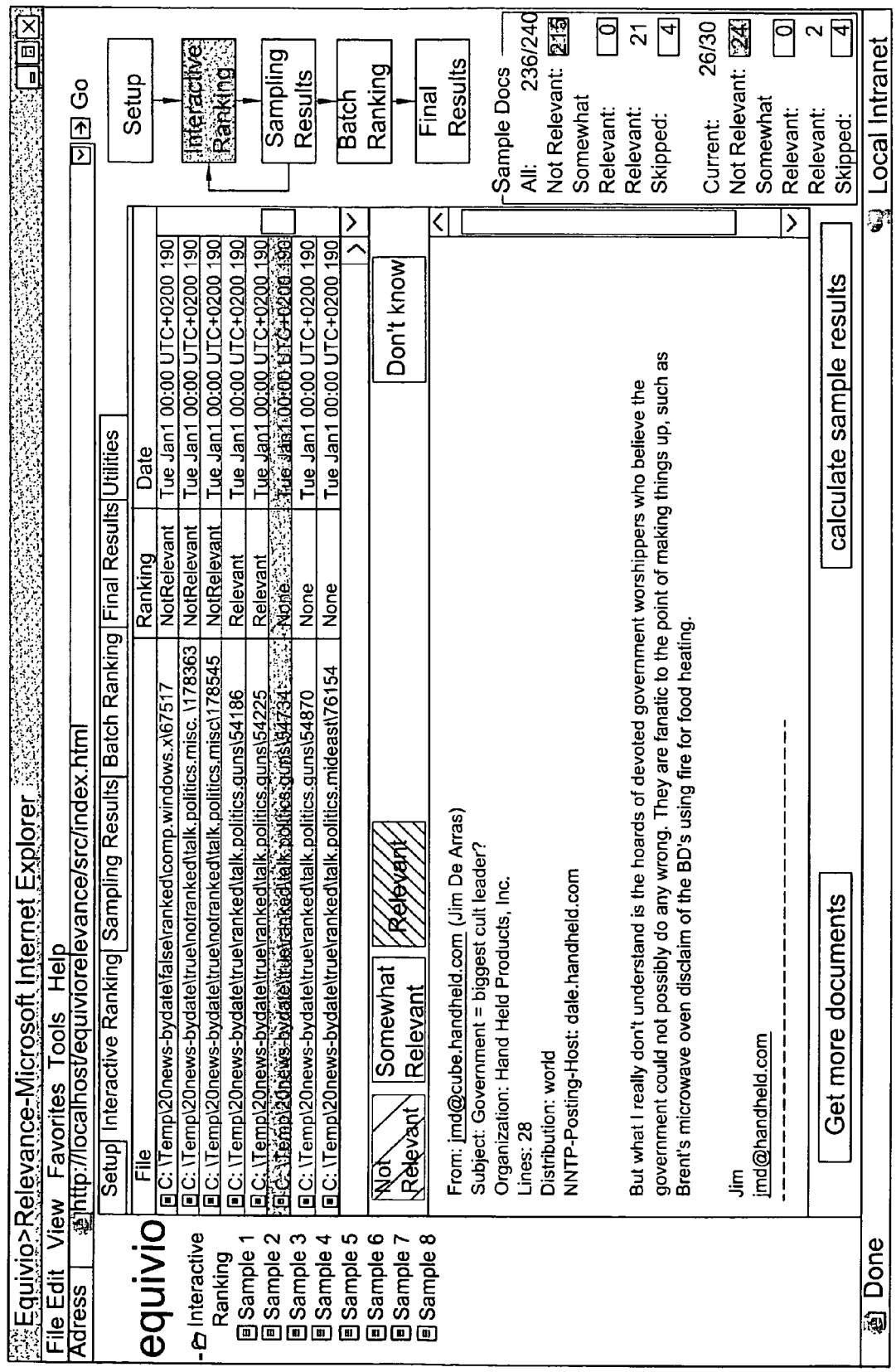

Referring now to FIG. 6, within step 20 of FIG. 1, the system of FIG. 2 chooses a set of sample documents, and presents them to the subject matter expert 100. The subject matter expert 100 reviews the documents and sets a relevance level for each document, e.g. Not relevant, Somewhat relevant, Relevant (or "definitely relevant"), and Don't know. FIG. 6 illustrates the Interactive Ranking step 20. The Navigation pane 330 shows the current sample set as well as sets of previous iterations. The Status information pane 350 shows statistics about ranked documents in the current iteration as well as in all iterations to date. In the main frame 340, the subject matter expert 100 reviews one document at a time. This frame also provides an overview of the entire sample. The documents are presented in simple text format. The subject matter expert 100 can view a document in its original format by clicking on the "original format" link. The subject matter expert 100 selects the appropriate level of relevance for each document. The system of FIG. 2 also allows the subject matter expert 100 to update rankings from documents that have already been annotated, including documents from previous samples.

Figure 7:
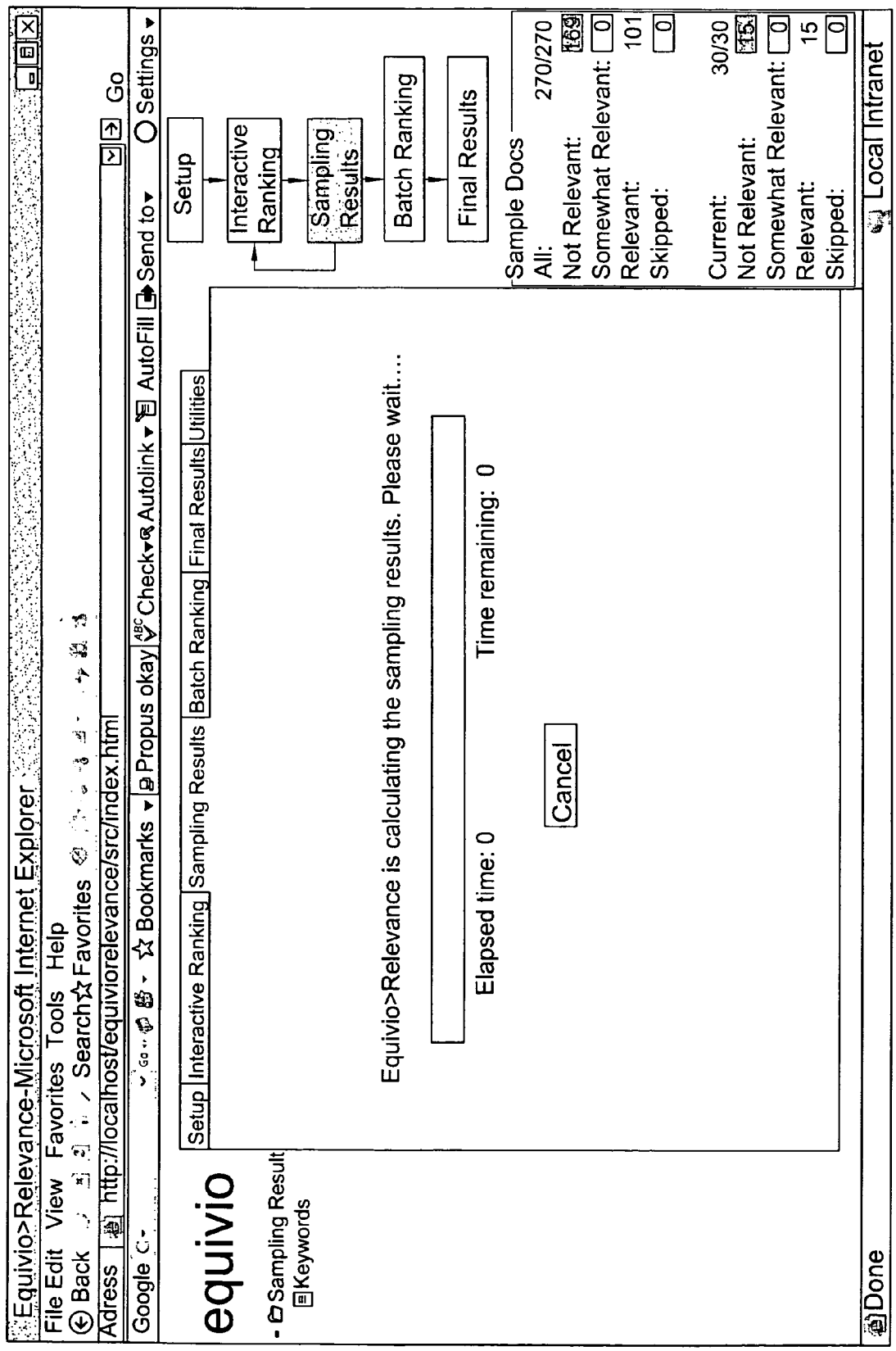

Referring now to FIG. 7, once the entire set has been ranked, the subject matter expert 100 clicks the "Computing Sampling Results" button, to proceed to the next step. FIG. 7 is displayed while the system of FIG. 2 performs its computations on the sample.

Figure 8:
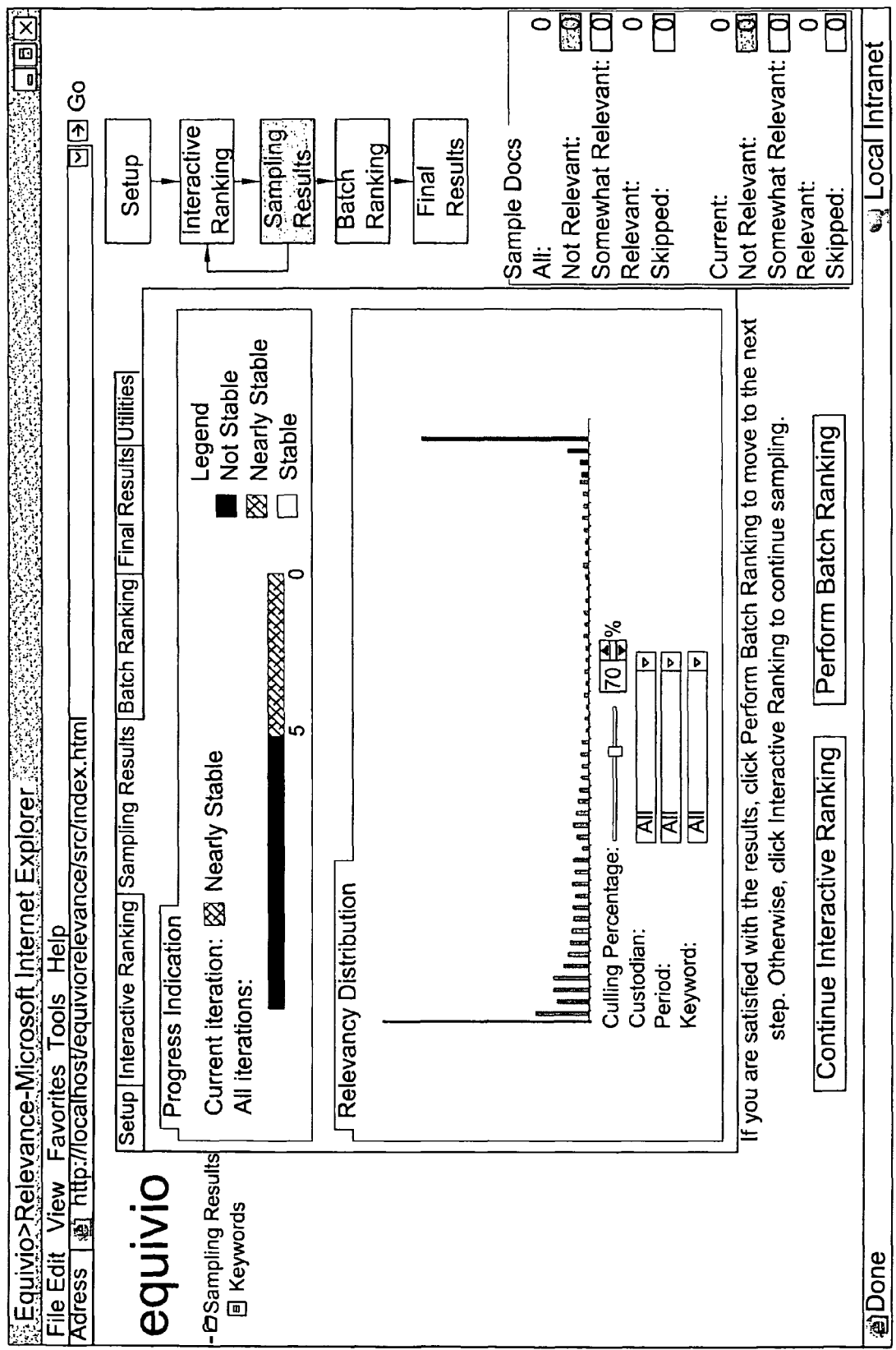

The Sampling Results screen of FIG. 8, pertaining to step 30 of FIG. 1, presents the current status of the Classifier/s. This screen includes three main parts or panes: (a) Progress Indicator, (b) Relevancy Distribution and (c) Keywords, each of which are described below.

(a) Progress Indication: ER performs a blind test on the sampled documents and generates relevance scores computed by the Classifier's. The system of FIG. 2 then compares these automatically generated scores with the relevance decisions of the subject matter expert 100. As the sampling process advances, the accuracy of the Classifier's improves. The application monitors the progress of the Classifier's, providing a visual indication with three states: Not stable, Nearly stable, Stable. When the indicator has been stable for a number of sampling iterations, it is at the optimal level of accuracy, and the subject matter expert 100 can move to the Batch Ranking phase.

(b) Relevancy Distribution: The Classifier's compute a relevance score for a test set of documents (this test set is much larger than the sample set manually ranked by the subject matter expert 100). The application also presents the distribution of relevance scores. The subject matter expert 100 has the option to present the distribution for all documents, or for specific custodians, time periods or keywords as shown in FIG. 8. Depending on the shape of the distribution, the subject matter expert 100 may decide to adjust the subjective criteria used by the subject matter expert 100 in manually ranking of sample documents.

Figure 9:
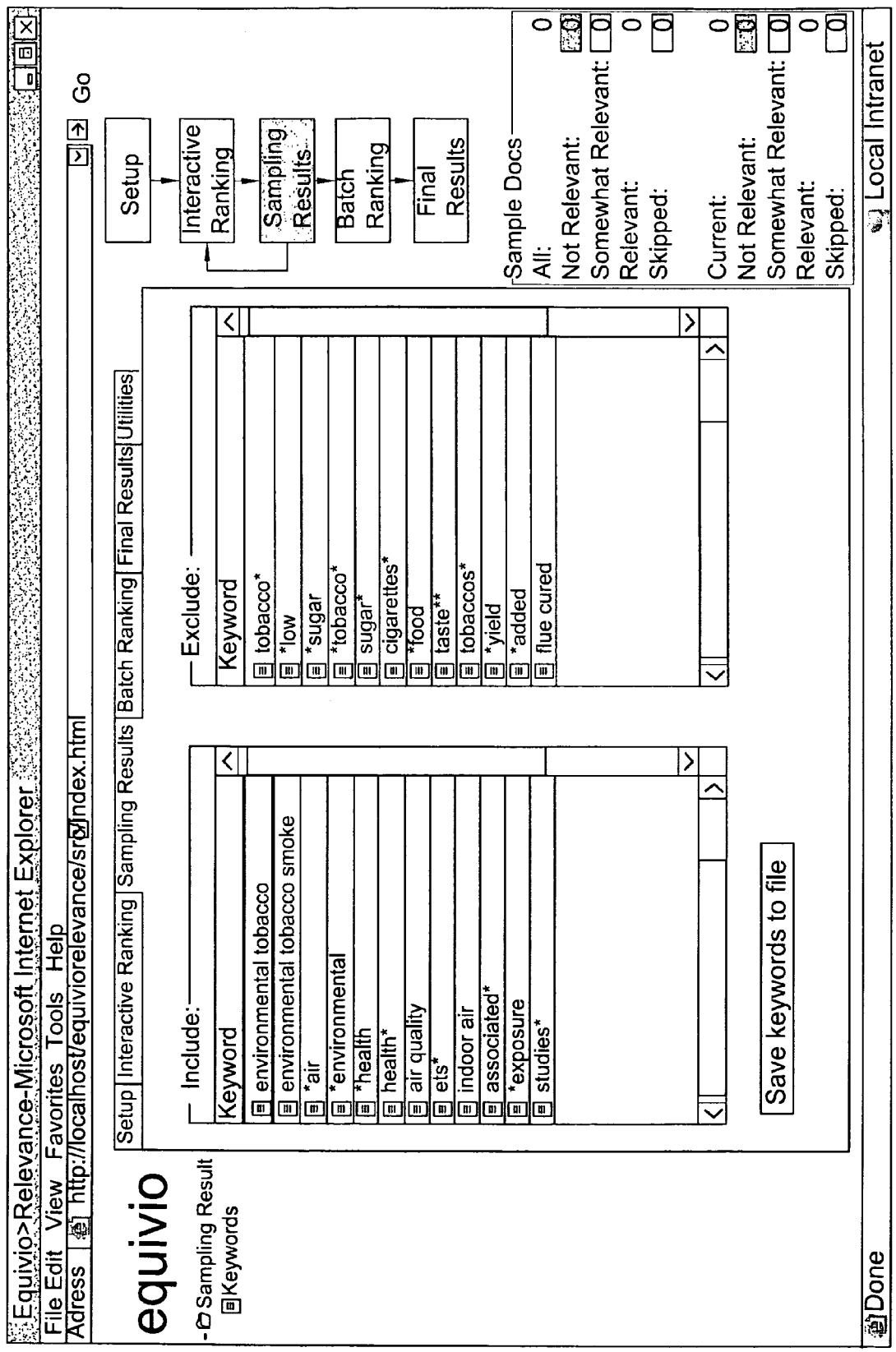

(e.) Keywords: The application also presents the keywords selected by the Classifier's as shown in FIG. 9. The application presents separate lists for Include keywords (keywords that correlate to relevant documents) and Exclude keywords (keywords that correlate to non-relevant documents). The keyword power score represents the relative weight of the keyword in relevance decisions. The keywords may be single words or phrases.

Figure 10:
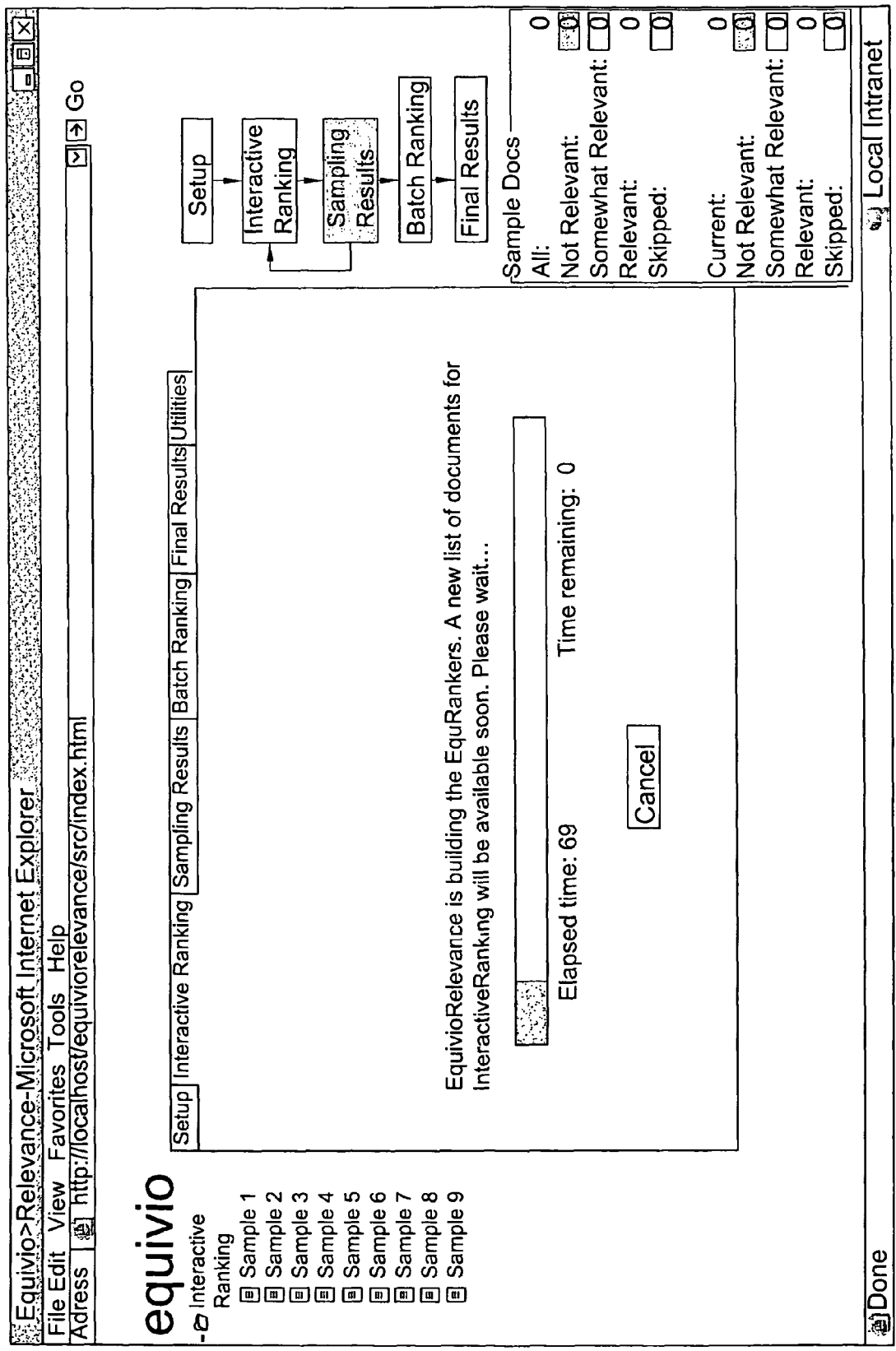
Figure 11:
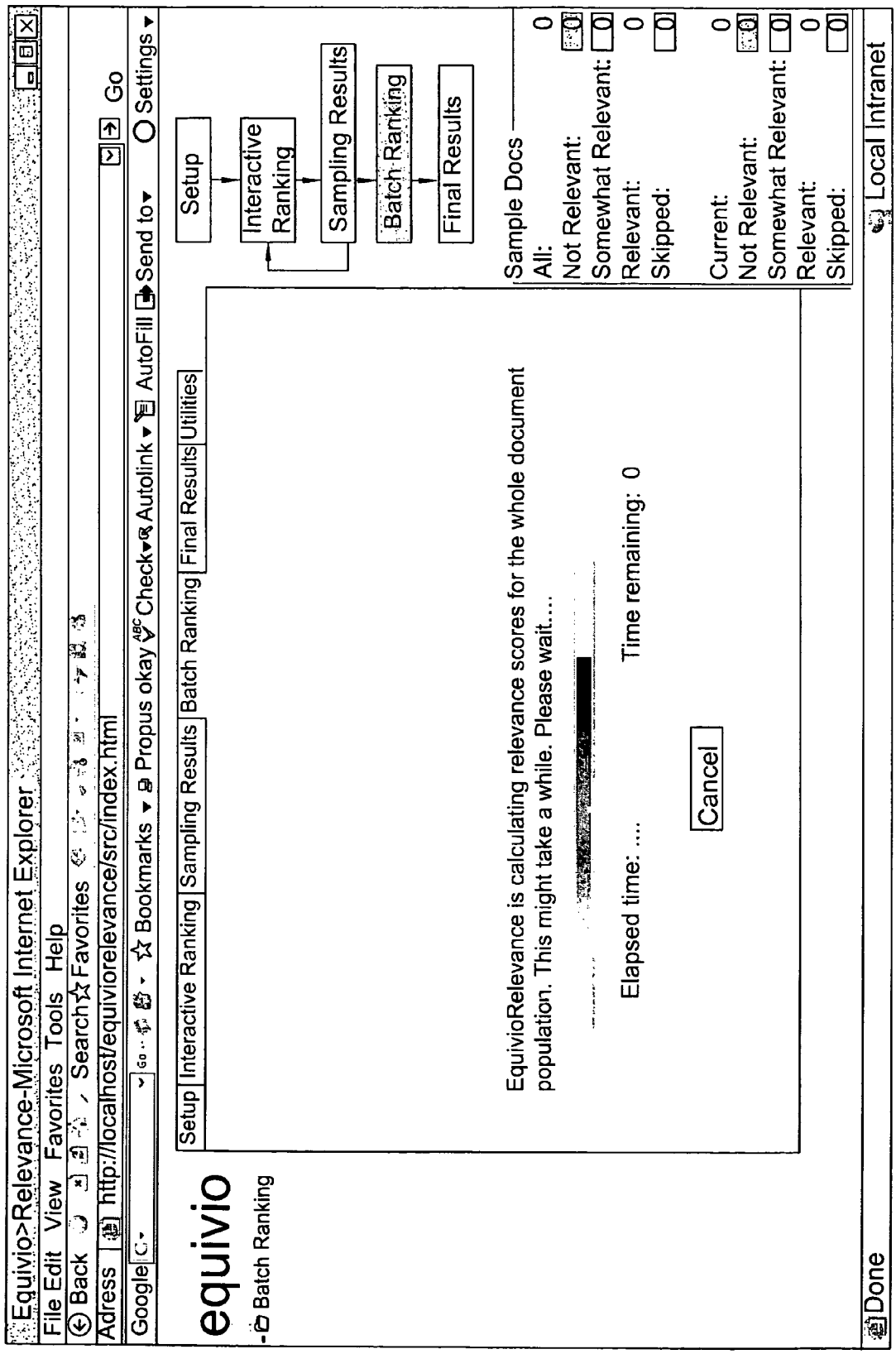
Figure 12:
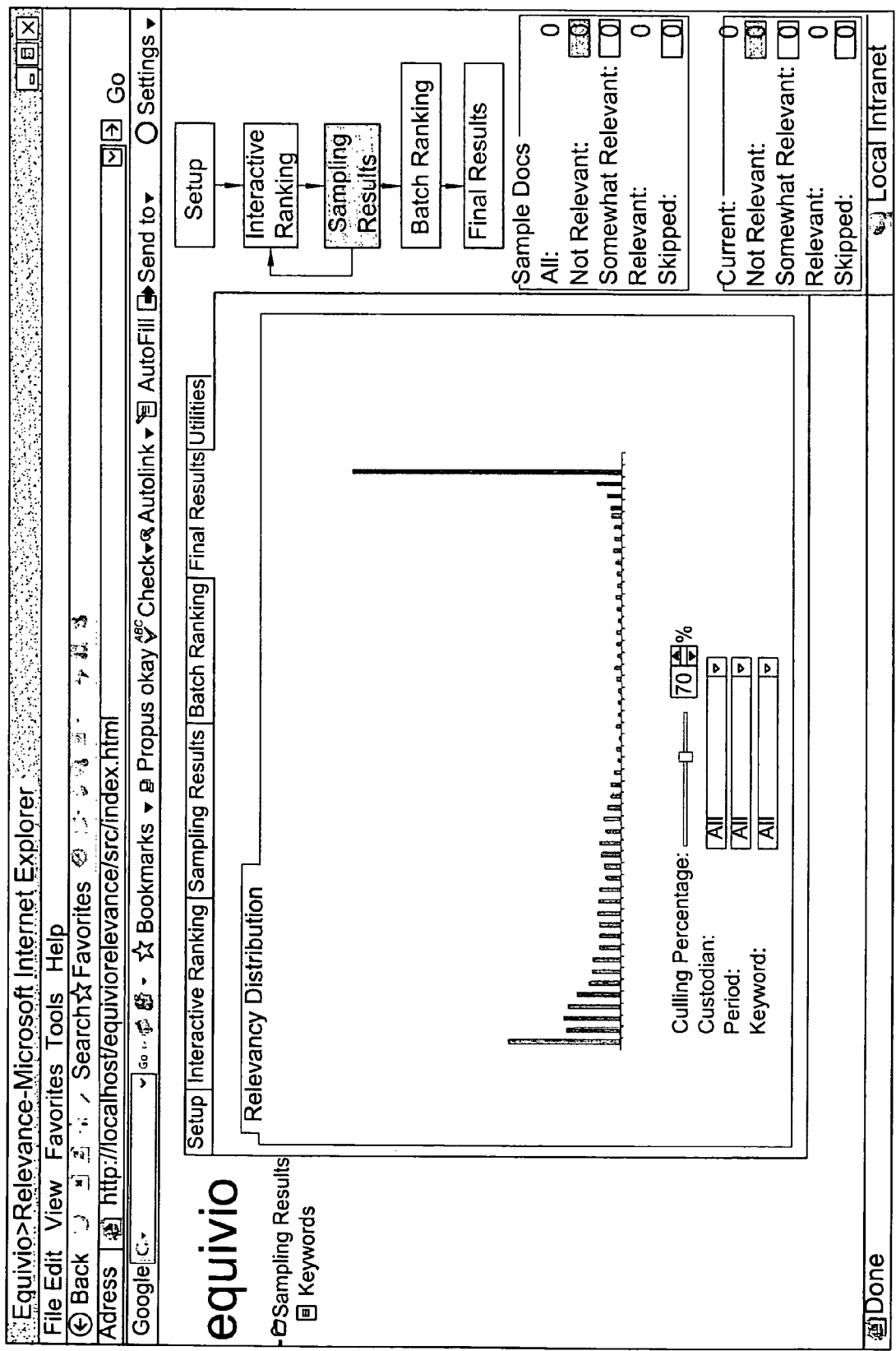

Within Result Sampling step 30 of FIG. 1, after reviewing the Sampling Results, the subject matter expert 100 decides what to do next. This decision can rely on three conditions, information regarding each of which is generated by the system and presented to the expert 100: Classifier stabilization e.g. as described herein in FIGS. 15A-16B; satisfactory distribution of relevance scores; and an acceptable list of keywords. If all three conditions are fulfilled, the subject matter expert 100 can move on to step 40. If not, the subject matter expert 100 continues with the next sample for interactive ranking. Prior to the next sample ranking, the system of FIG. 2 performs computations to improve the Classifier/s and to produce a new set of sample documents as shown in FIG. 10. Instead of Batch Ranking, the subject matter expert 100 also has the option of extracting the keywords identified by the system of FIG. 2 (by saving the list to a file). The subject matter expert 100 can then use this list of keywords to find relevant documents in the collection (e.g. by using a standard search engine).

The Batch Ranking step 40 uses the Classifier/s to compute relevance scores for all documents in the population. Depending on the size of the population, this can take some time. The subject matter expert 100 is presented with a screen as pictured in FIG. 11 pertaining to batch ranking.

In step 50 of FIG. 1, the final results are presented to the subject matter expert 100. These results include the Relevance Distribution histogram of FIG. 12 and keywords list. The keywords list is similar to the one presented after each interactive ranking sample, with additional statistical data, such as the frequency of the keywords. The final results are stored in the Relevance database 140 of FIG. 1. For each document, the database 140 stores the metadata imported from the data collection database 150, together with the relevance score computed for each document. The data for each document also includes a status indicator (this is relevant for special cases, for example, where the document was not available and could not be processed). In addition, the data for each document includes the list of keywords applicable to this document.

An extract utility is typically provided which transforms the results into a format ready for loading external systems—such as, the data collection database 150. The extract utility is accessed under the Utilities tab. The extract utility allows the subject matter expert 100 to choose the target format (database table, CSV file), and the population (data for all documents, or just documents that survived). The subject matter expert 100 can choose a cut-off policy, which will instruct the system of FIG. 2 how to split the document collection into two: the documents with low relevance scores are flagged for culling while the more relevant documents are flagged for survival. If a cut-off policy was set, the extract utility adds a field for each document indicating whether the document survives or is culled. For example, a natural cut-off point for the results of FIG. 12 can be the local minimum in the middle of graph; if this cut-off point is selected, documents with scores under this point will be flagged for culling.

Figure 13:
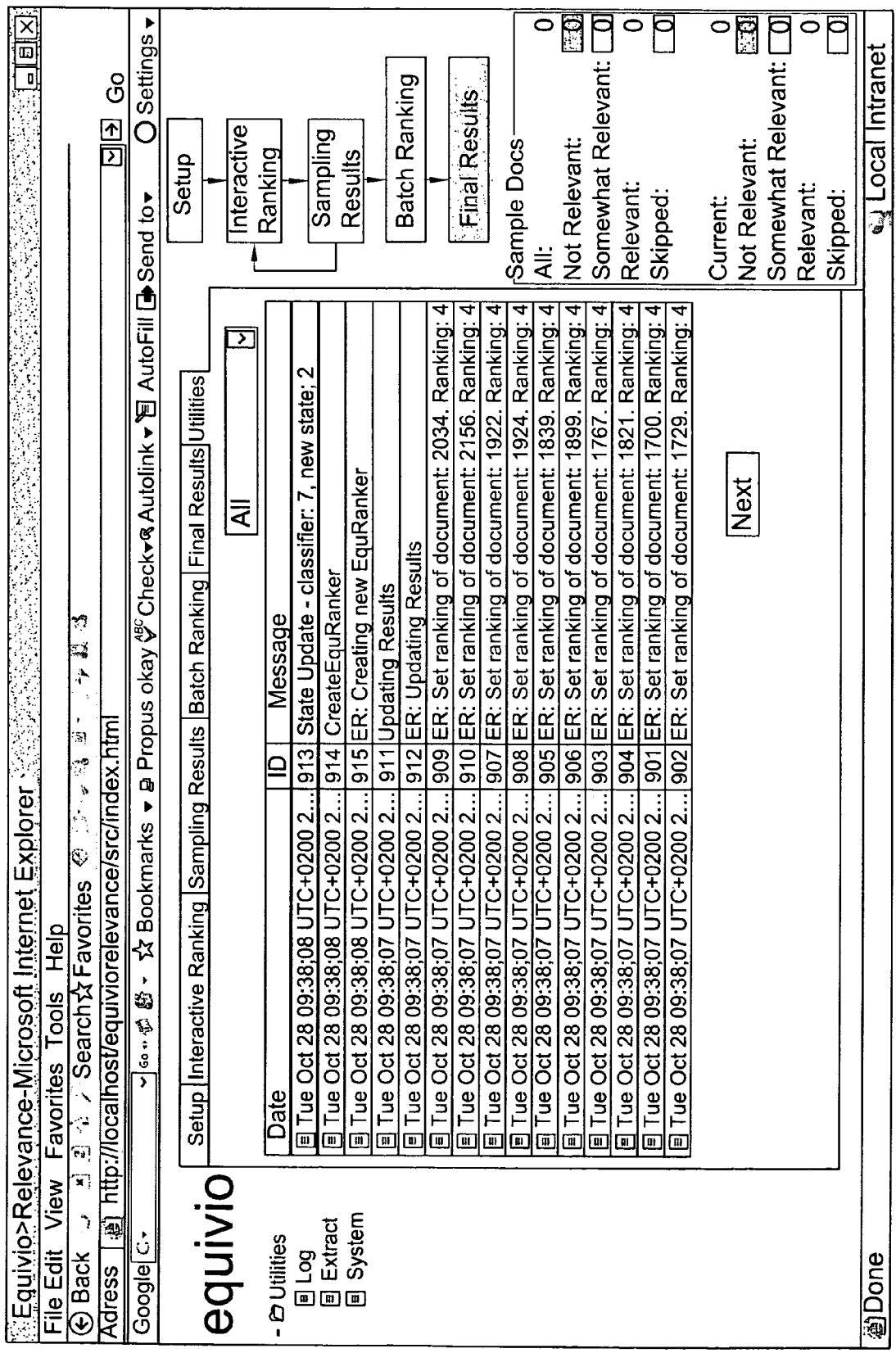

The Utilities tab also includes a log report as shown in FIG. 13. The log includes a record of application behavior and user selections, including a listing of the reviewers who worked on the case. The messages can be filtered out by type: Error, Warning and Info.

Special cases may be treated separately, such as but not limited to the following special cases:

(a) Incremental mode: When new documents are added to an existing case, the system of FIG. 2 can perform Batch Ranking using the pre-computed Classifier/s on the new documents. This is set up by choosing the existing case and database (as defined in the original run), while inputting a new set of documents (via the Data Layer 130). When starting-up, the application of FIGS. 1-2 identifies existing data in the Relevance database 140, and resumes the process using the existing data. The Setup phase is skipped. The subject matter expert 100 has a choice—enhance the existing Classifier/s using the new documents, or use the existing Classifier/s as is. If the first option is chosen (enhance Classifier/s), Interactive Ranking is invoked. In incremental processing, the Interactive Ranking phase step continues from the point where Interactive Ranking was terminated in the previous round. If the document collection includes documents from the original run, their relevance will be recomputed and overwritten.

(b) Skipping steps: The system of FIG. 2 has a well-defined flow. However, the subject matter expert 100 might choose to navigate between the steps in a non-standard manner (e.g. after generating Final Results, resume Interactive Ranking). In such cases, the application informs the user, and issues warnings of possible consequences (e.g. existing rankings will be deleted).

(c) Cases with Multiple Issues: The system of FIG. 2 supports cases with multiple issues. In such a case, the document population is common to all issues, and any other data is specific to the Issue. The system of FIG. 2 is run separately for each issue, since relevancy judgments of documents are different between issues, and possibly performed by different SMEs.

The following features may optionally be provided:

(a) Enhanced tracing options of reviewers: the system of FIG. 2 may support multiple SMEs: the manual ranking (in the Interactive Ranking step) can be performed by different SMEs/reviewers, and the name of the subject matter expert 100 is associated with each ranked document. The tracking and monitoring abilities may be enhanced; for example, the progress indication may also be available for each reviewer separately, to allow identification of reviewers that rank documents in an inconsistent manner.

(b) Integration with Semantic engines: enhanced linguistic capabilities via integration with semantics engines.

(c) Ranking Fraud Marks: In addition to ranking documents for relevance, the system may allow the subject matter expert 100 to tag documents with fraud marks. This will enable the system of FIG. 2 to automatically identify such documents.

Figure 14A:
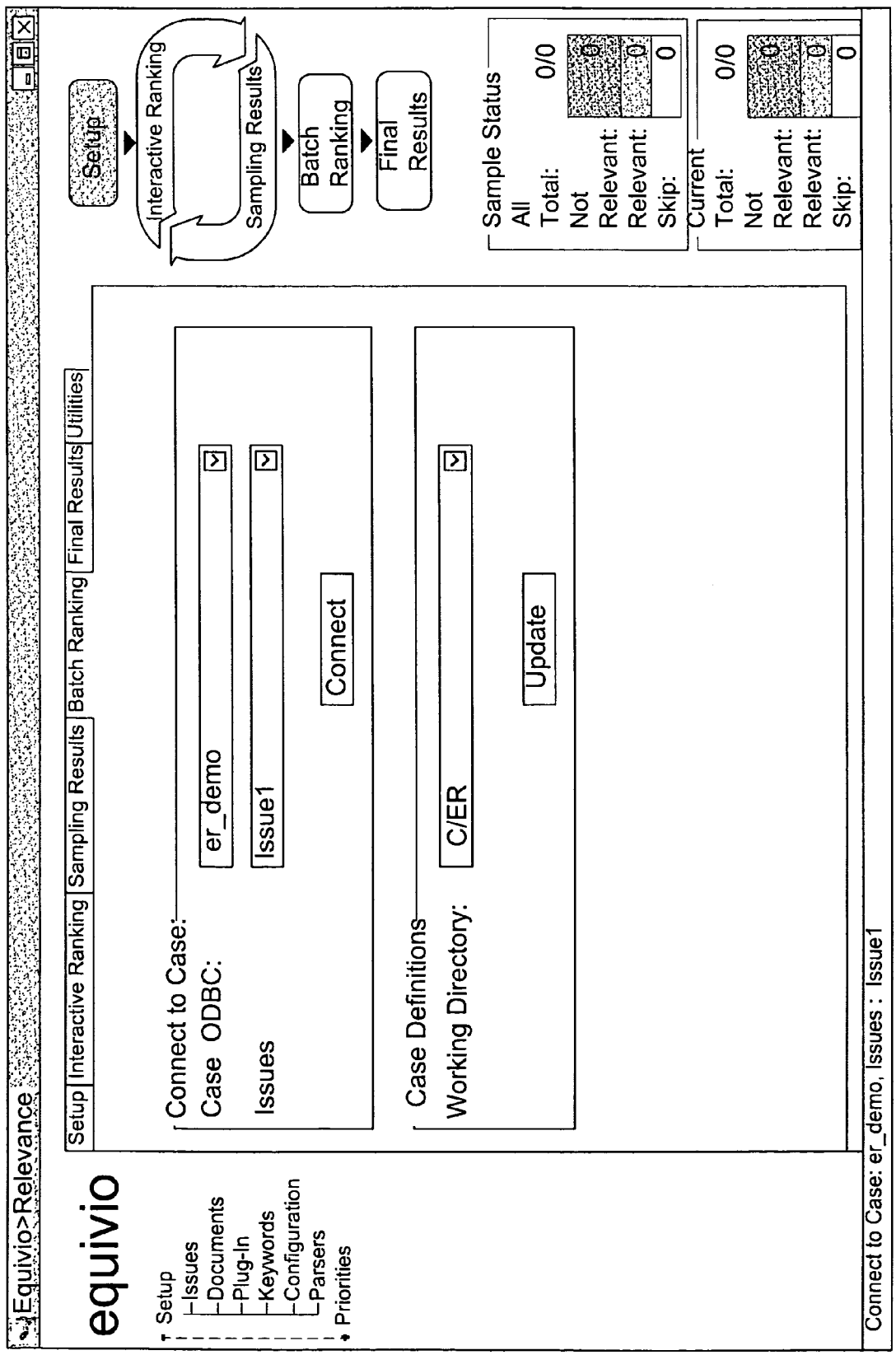

FIGS. 14A-14K are simplified pictorial illustrations of example screen displays generated during an example worksession in which the system of FIG. 2 performed the method of FIG. 1, including setup step 10 (FIG. 14A), interactive ranking step 20 (FIGS. 14B-14C), result sampling step 30 (FIGS. 14D-14F), and final result generation step 50 (FIGS. 14G-14K). Specifically:

FIG. 14A is an example Setup display screen. When a user enters the application, s/he chooses which case to connect to. To move on, the expert clicks on the "Interactive Ranking" tab, assuming the case is ready and documents have already been imported into it.

The Interactive Ranking display screen of FIG. 14B is a screenshot of a third iteration, assuming that in the illustrated example, an expert has already performed 2 iterations. There are two non-ranked documents as is evident in the illustrated table and also in the "Sample Status" shown in the bottom right corner. The expert is to review these and for each document click either "Relevant", "Non-Relevant" or "Skip".

Figure 14C:
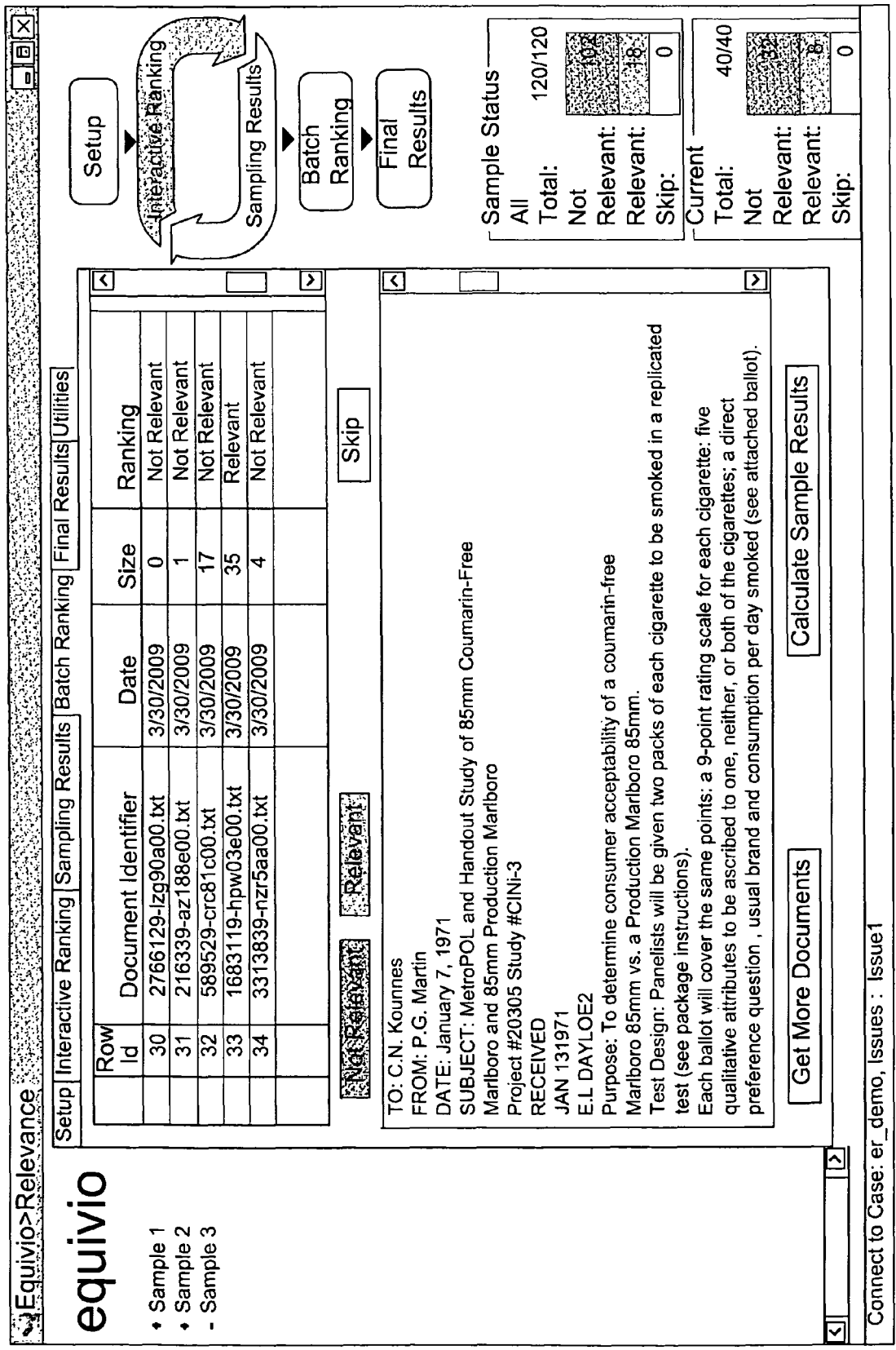

FIG. 14C is similar to FIG. 14B except that all documents in the sample have been ranked. As a result, the "Compute Sample Results" button is enabled. The expert clicks it and the "Sample results" tab is activated, causing samples' results to be computed and the Sample results pages to be filled with data.

Figure 14D:
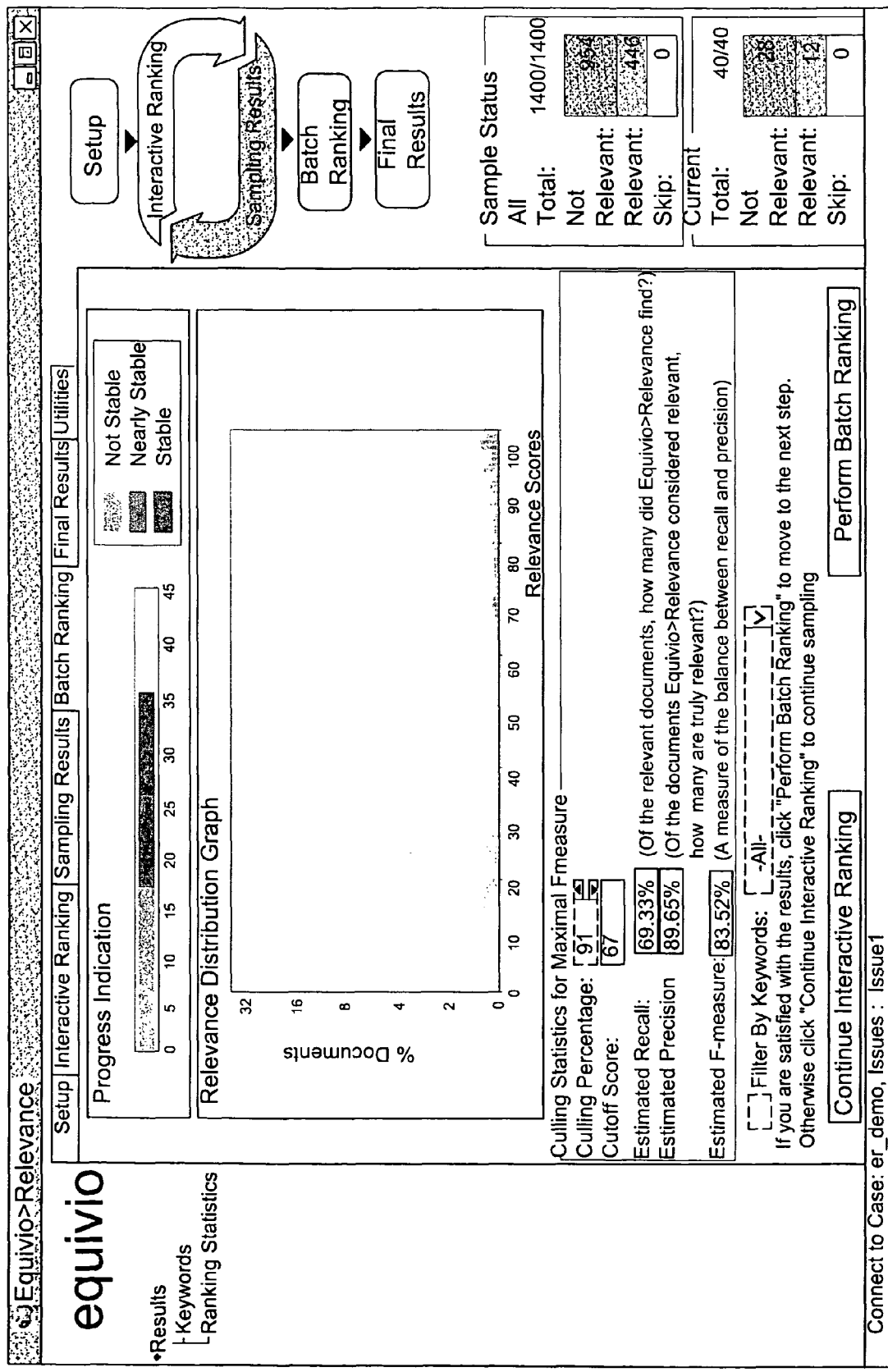

FIG. 14D is a Sample results main view/page and includes progress indication and a relevance score distribution graph.

Figure 14E:
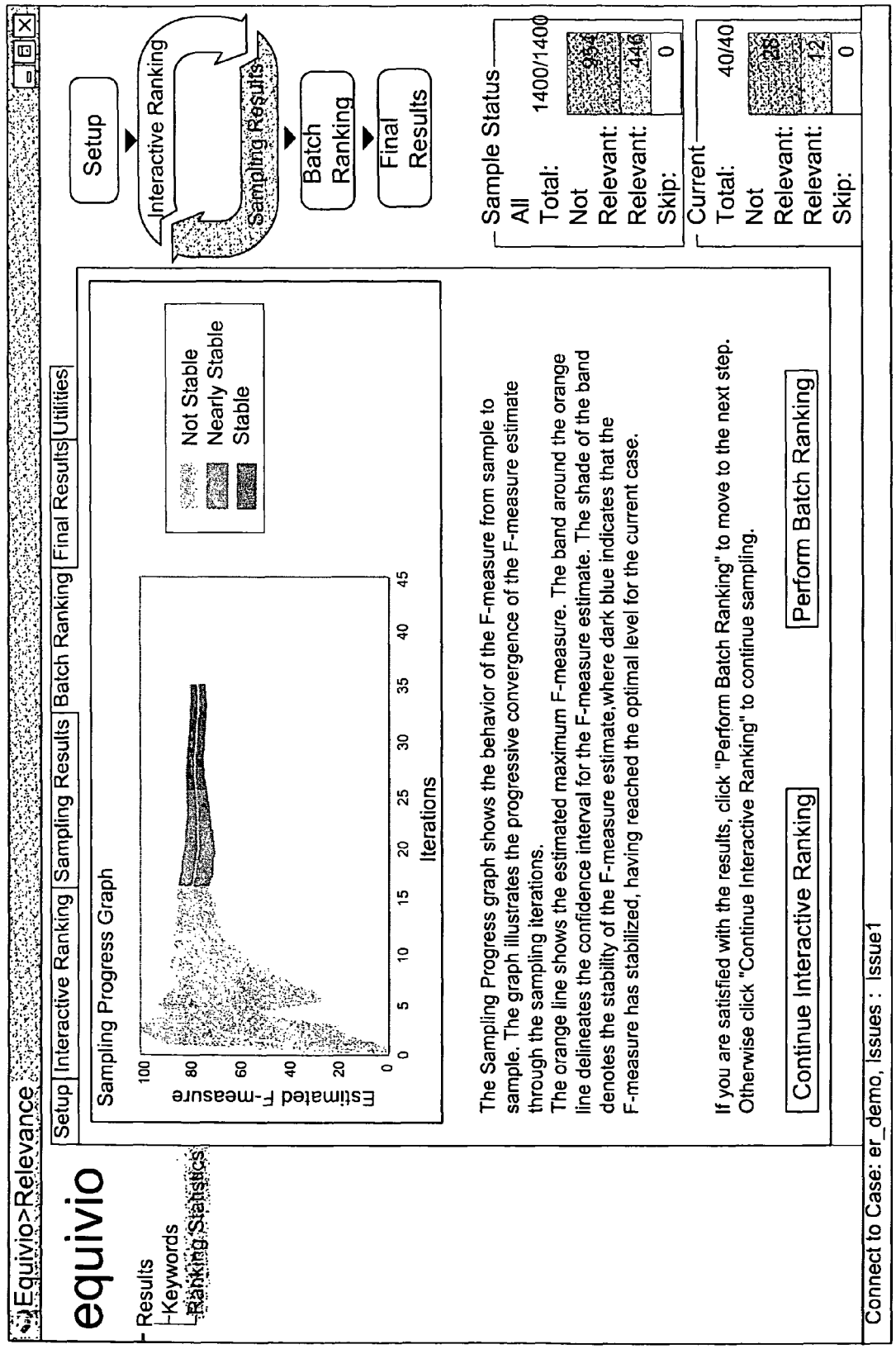
Figure 14F:
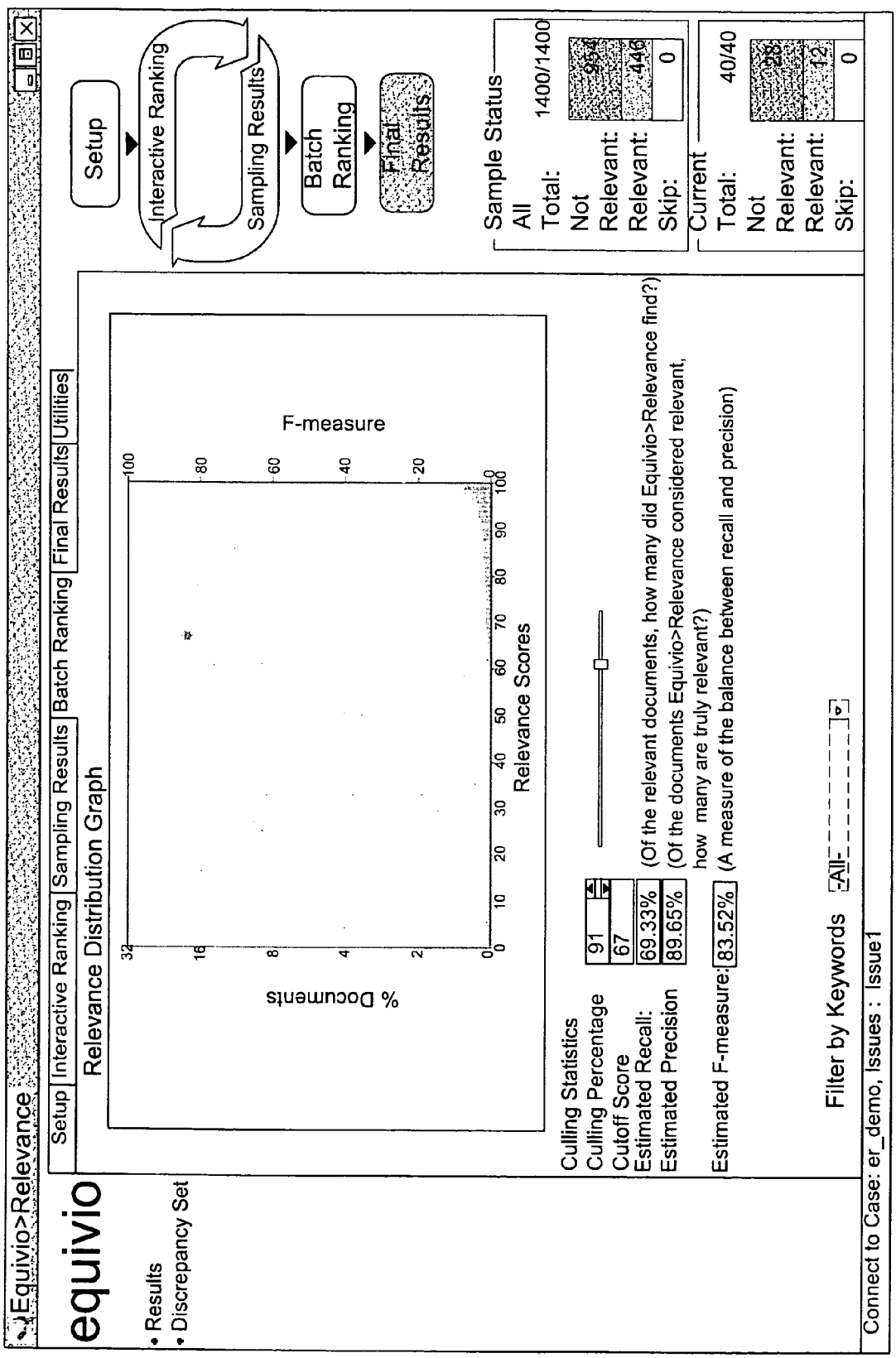

The expert can choose (on the navigation tree on the right) to also see other pages such as "Ranking Statistics" (FIG. 14E) and "Keywords" (FIG. 14F).

FIG. 14E is a Ranking Statistics display screen including a graph of FMeasure over the iterations, with confidence intervals.

FIG. 14F is a Sample Results Keywords display screen showing top keywords for Relevant and Not Relevant documents. If the expert is not satisfied from the Sample Results, s/he clicks "Continue Interactive Ranking". The "Interactive Ranking" tab then appears, with a new sample of documents which the expert then reviews and ranks. When the expert is satisfied with the Sample Results, s/he clicks "Perform Batch Ranking" which actuates a process of computing a relevance score for each document in the entire collection, during which process the expert typically sees a progress bar. When this process ends, "Final Results" appear with data.

A suitable screen display for batch ranking may comprise only a progress bar to show the progress of that task (not shown).

Figure 14G:
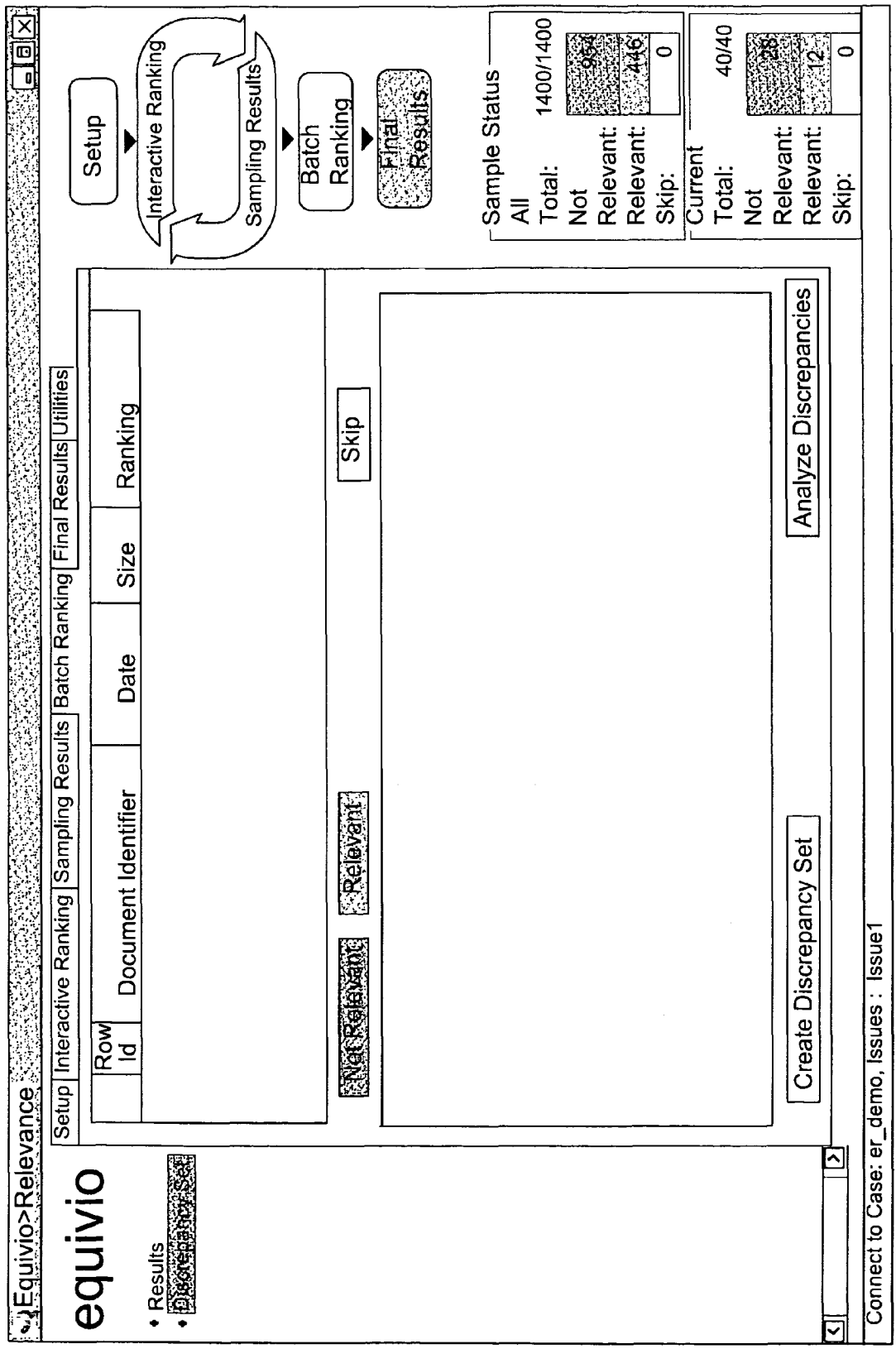

FIG. 14G is the main "Final Results" view/page including a relevance score distribution graph based on the entire collection of documents fed into the system, with the Cutoff Score, FMeasure, Recall and Precision per Culling percentage. In the illustrated embodiment, FIG. 14G is the start point for discrepancy analysis. If Get Discrepancy Set is pressed, the display screen of FIG. 14H is obtained, without the Relevant/Non Relevant marks. The reviewer then selects R or NR for each row and presses Analyze Discrepancy to obtain the screen display of FIG. 14I.

FIG. 14H is a "Discrepancy Set" main page in initial state: this is only active if additional review information has been imported in to the case, e.g. if the case was previously reviewed by a system other than that shown and described herein. The review information includes for a set of documents, how each of them were tagged in the previous review: Relevant or Not Relevant. When clicking on "Create Discrepancy Set" the table is populated with the Discrepancy Set documents.

Figure 14I:
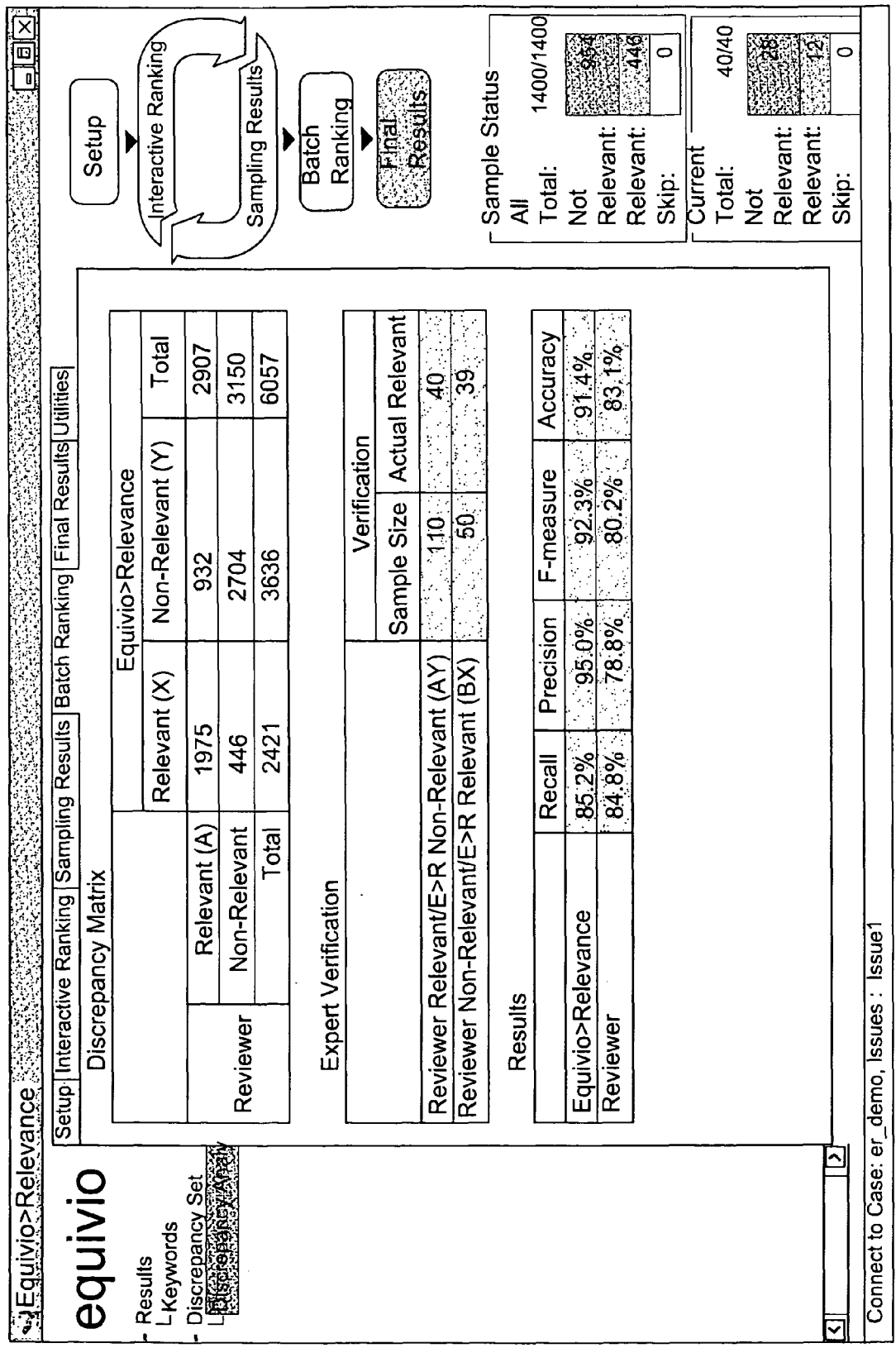

FIG. 14I is the "Discrepancy Set" main page with documents. The expert has already reviewed all documents in this set and ranked them. The "Analyze Discrepancies" button is then enabled. When the expert clicks this button, the "Discrepancy Analysis" is filled with data.

FIG. 14J shows Discrepancy Analysis: Discrepancy Set results.

FIG. 14K shows a "Transparency Report" in which a document is displayed such that words therein are colored to enable a human reviewer to easily see the contribution of each word to the classification. To get to the screen display of FIG. 14K the expert may select the "Utilities" tab and "Transparency Report" page. Then s/he enters an ID of a document for which s/he wants to see the Transparency Report, clicks "Generate Report" and the report opens.

A suitable method for generating a transparency report is the following: Run a text Classifier, which may be generated as shown and described herein, on a document d and obtain a rank x (a number between 0 and 100) representing the relevance of document d to a particular issue. For each $i <= n$ where n=number of words in document d:

a. Remove the ith word $w\_i$ from the document d to obtain a modified document d'i, b. Run the Classifier on the modified document d'i and get a rank $y\_i$ (a number between 0 and 100).

c. The contribution of $w\_i$ is $(x-y\_i)$. First colors such as red, or red and orange, are designated for positive contributions in the range of 0,1; and second colors, such as gray, or gray and black, are designated for negative contributions in the range of 0,1.

d. If (y_i>x): select a color (y_i−x)/(1−x) from the positive contributions.

e. If (y_i<x); select a color (x−y_i)/x from the negative contributions.

It is appreciated that the GUI is typically operative to allow a user to view display screens associated with a previous stage in the flow, such as Interactive Ranking, even though a subsequent stage in the flow, such as Final Results, is now current.

A suitable software environment for implementing the functionalities shown and described herein may include Windows XP, Windows Vista, or Windows Server 2003; plus access to MS-SQL-Server (2000 or 2005) or MySQL (5.0.X, and ODBC Connector 3.51) databases and permission to create and read objects in the database.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

According to certain embodiments of the present invention, a machine learning system is provided for automated prioritization of documents and/or keywords. The system typically receives input of a human expert who reviews samples of documents and ranks them as relevant or not. Based on these samples, the system of the present invention may generate a function that grades the relevance of documents. The sampling process is typically iterative, terminating when the relevance grading function stabilizes. When it terminates, a relevance score for each document in the collection is computed. The relevance scores may be used for culling to enhance the quality of the target review set, and in the review phase, to prioritize review and for quality assurance.

Figure 15A:
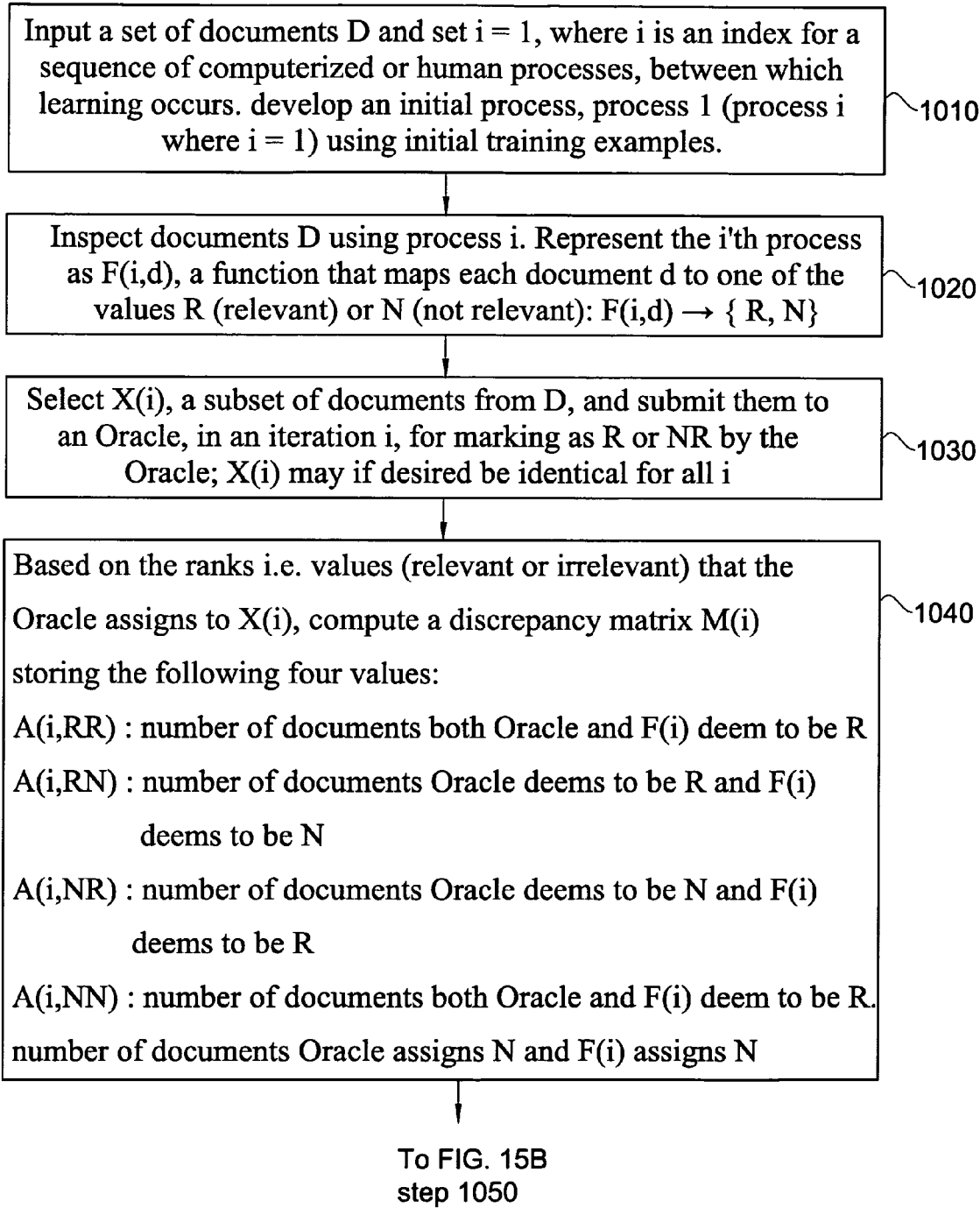
FIGS. 15A, 15B and 15C, taken together, form a simplified flowchart illustration of a learning method which is operative in accordance with certain embodiments of the present invention; the method of FIG. 15B is also termed herein the "stability flow".
Figure 15B:
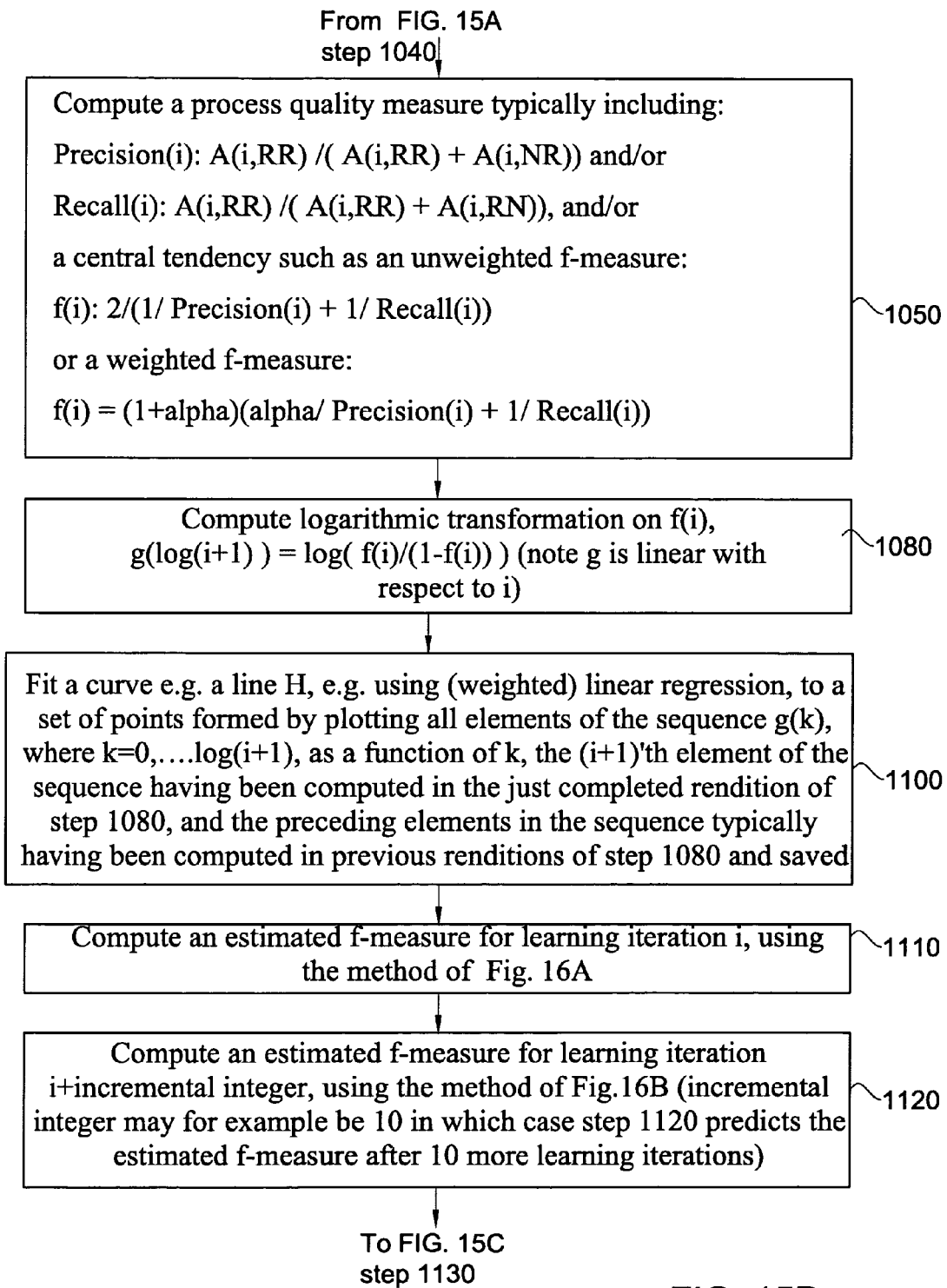
Figure 15C:
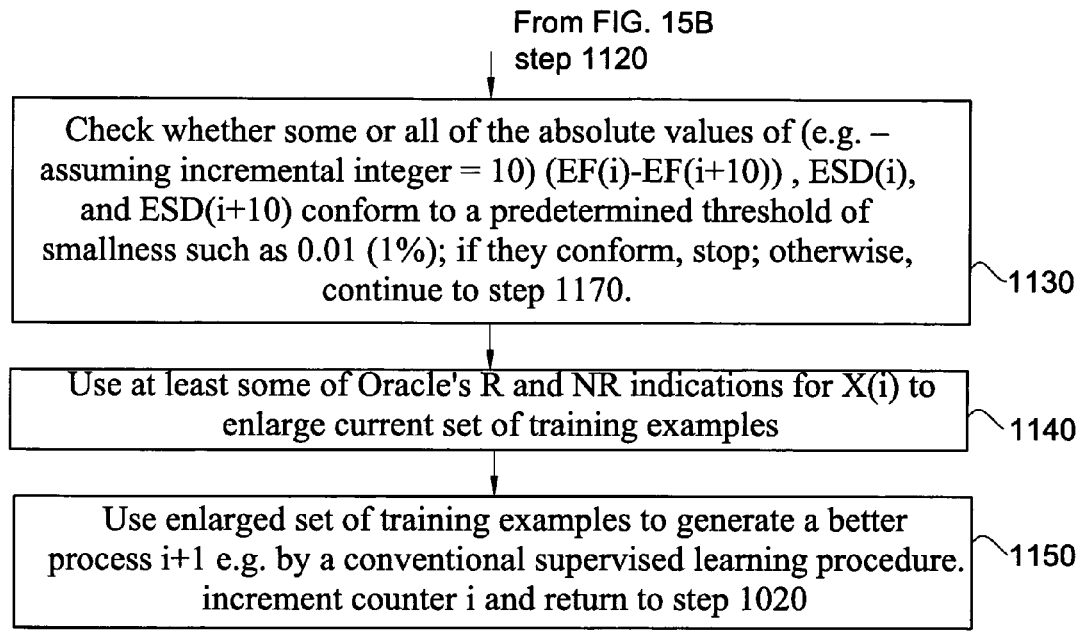

Reference is now made to FIGS. 15A, 15B and 15C which, taken together, form a simplified flowchart illustration of a learning method which is operative in accordance with certain embodiments of the present invention. The method of FIGS. 15A, 15B and 15C, taken together, typically comprises some or all of the following steps, suitably ordered e.g. as shown:

Step 1010: Input a set of documents D and set i=1, where i is an index for a sequence of computerized or human processes, between which learning occurs. Develop an initial process, process 1 (process i where i=1) using initial training examples. When Step 1010 is used to implement the method of FIG. 1, as described herein, the following may apply to step 1010: Set i=Round(CI); Set Precision(i)=Recall(CI, j); Set Recall(i)=Recall(CI,j). A central tendency may be employed such as an unweighted F measure: f(i): 2/(1/Precision(i)+1/Recall(i)), or a weighted F measure: f(i)=(1+alpha)(alpha/Precision(i)+1/Recall(i)).

Step 1020: Inspect documents D using process i. Represent the i'th process as F(i,d), a function that maps each document d to one of the values R (relevant) or N (not relevant): F(i,d)→{R, N}

Step 1030: select X(i), a subset of documents from D, and submit them to an Oracle, in an iteration i, for marking as R or NR by the Oracle; X(i) may if desired be identical for all i Step 1040: Based on the ranks i.e. values (relevant or irrelevant) that the Oracle assigns to X(i), compute a discrepancy matrix M(i) storing the following four values:

A(i,RR): number of documents both Oracle and F(i) deem to be R

A(i,RN): number of documents Oracle deems to be R and F(i) deems to be N

A(i,NR): number of documents Oracle deems to be N and F(i) deems to be R

A(i,NN): number of documents both Oracle and F(i) deem to be R.

Step 1050: Compute a process quality measure typically including:

Precision(i): A(i,RR)/(A(i,RR)+A(i,NR)) and/or
Recall(i): A(i,RR)/(A(i,RR)+A(i,RN)), and/or
a central tendency such as an unweighted F measure:
f(i): 2/(1/Precision(i)+1/Recall(i))
or a weighted F measure:
f(i) (1+alpha)(alpha/Precision(i)+1/Recall(i))

Step 1080: compute logarithmic transformation on f(i), g(log(i+1))=log(f(i)/(1−f(i))) (note g is linear with respect to i)

Figure 16A:
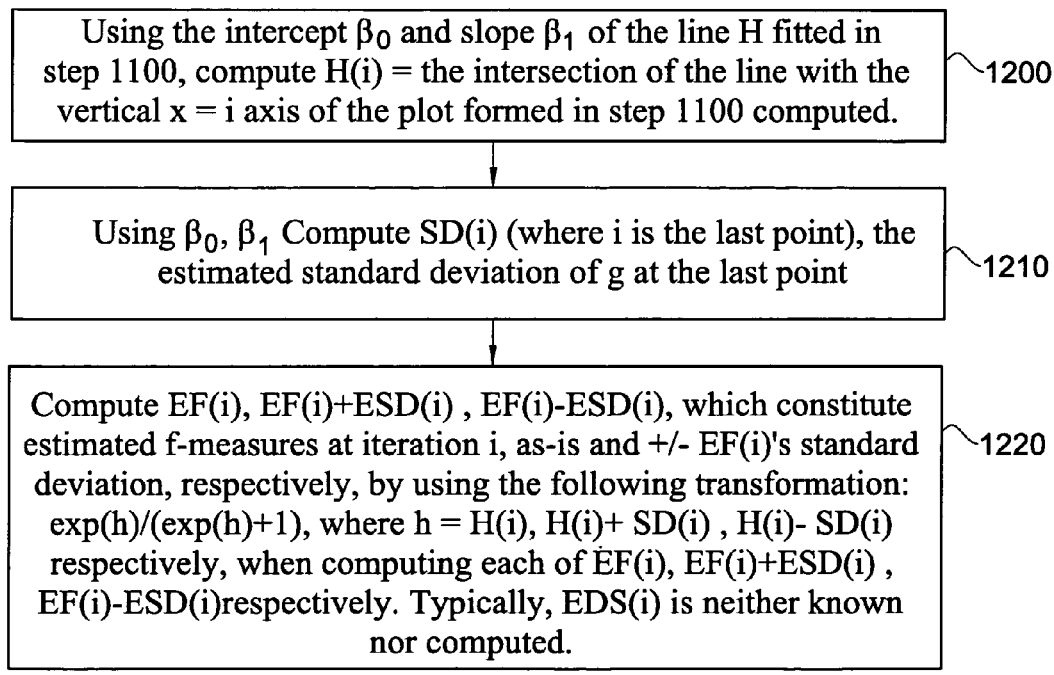
FIG. 16A is a simplified flowchart illustration of a method for performing step 1110 of FIG. 15B, which is operative in accordance with certain embodiments of the present invention.

Step 1100: fit a curve e.g. a line H, e.g. using (weighted) linear regression, to a set of points formed by plotting all elements of the sequence g(k), where k=0, . . . log(i+1), as a function of k, the (i+1)'th element of the sequence having been computed in the just completed rendition of step 1080, and the preceding elements in the sequence typically having been computed in previous renditions of step 1080 and saved Step 1110: compute an estimated F measure for learning iteration i, using the method of FIG. 16A

Figure 16B:
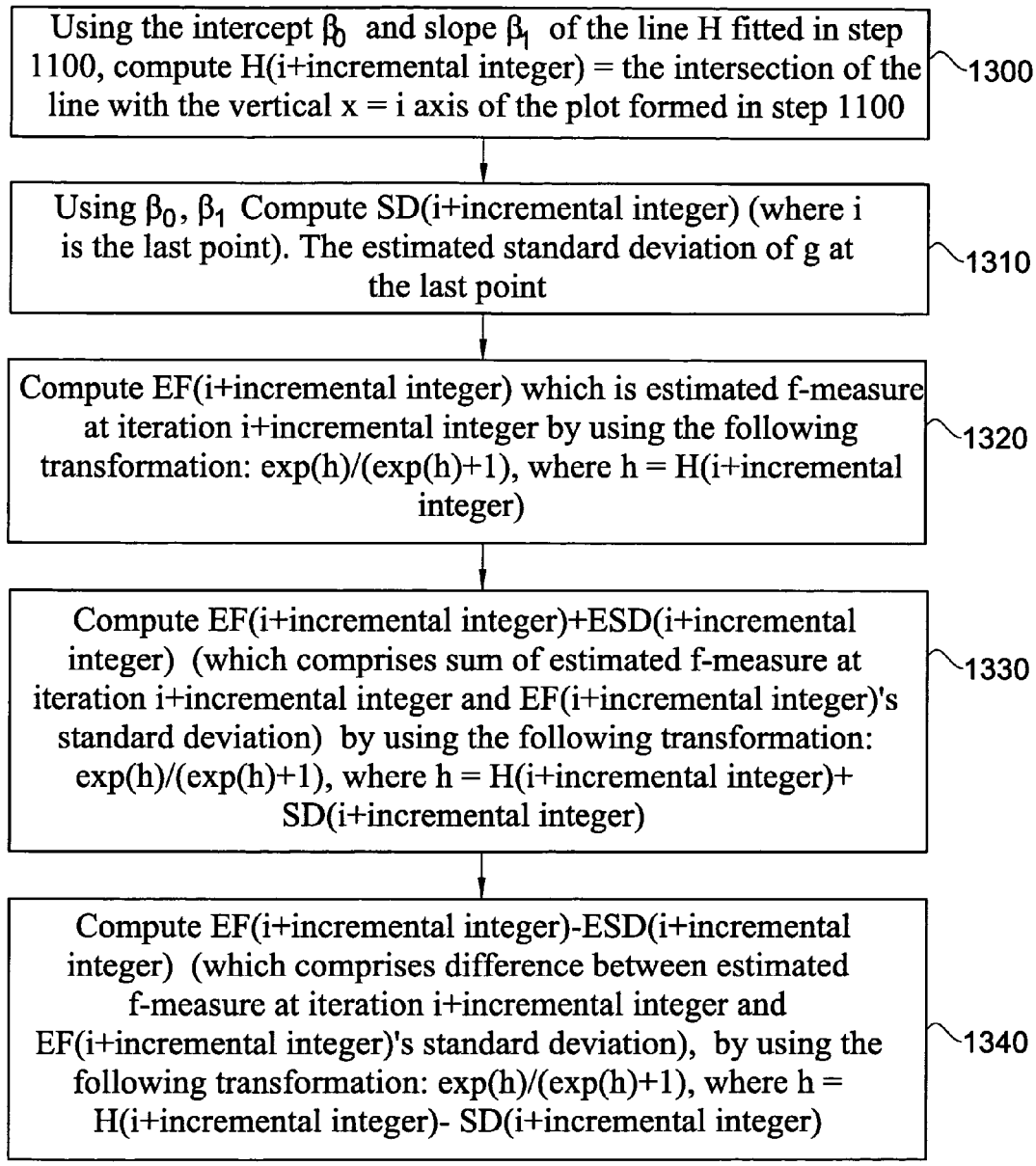
FIG. 16B is a simplified flowchart illustration of a method for performing step 1120 of FIG. 15B, which is operative in accordance with certain embodiments of the present invention.

Step 1120: compute an estimated F measure for learning iteration i+incremental integer, using the method of FIG. 16B (incremental integer may for example be 10 in which case step 1120 predicts the estimated F measure after 10 more learning iterations)

Step 1130: check whether some or all of the absolute values of (e.g.—assuming incremental integer=10) (EF(i)−EF(i+10)), ESD(i), and ESD(i+10) conform to a predetermined threshold of smallness such as 0.01 (1%); if they conform, stop; otherwise, continue to step 1170.

Step 1140: use at least some of Oracle's R and NR indications for X(i) to enlarge current set of training examples Step 1150: use enlarged set of training examples to generate a better process i+1 e.g. by a conventional supervised learning procedure. Increment counter i and return to step 1020.

FIG. 16A is a simplified flowchart illustration of a method for performing step 1110 of FIG. 15B, which is operative in accordance with certain embodiments of the present invention. The method of FIG. 16A typically comprises some or all of the following steps, suitably ordered e.g. as shown:

Step 1200: Using the intercept β0 and slope β1 of the line H fitted in step 1100, compute H(i)=the intersection of the line with the vertical x=i axis of the plot formed in step 1100.

Step 1210: Using β0, β1 Compute SD(i) (where i is the last point), the estimated standard deviation of g at the last point.

Step 1220: Compute EF(i), EF(i)+ESD(i), EF(i)−ESD(i), which constitute estimated F measures at iteration i, as-is and +/− EF(i)'s standard deviation, respectively, by using the following transformation: exp(h)/(exp(h)+1), where h=H(i), H(i)+SD(i), H(i)−SD(i) respectively, when computing each of EF(i), EF(i)+ESD(i) EF(i)−ESD(i) respectively, Typically, EDS(i) is neither known nor computed.

FIG. 16B is a simplified flowchart illustration of a method for performing step 1120 of FIG. 15B, which is operative in accordance with certain embodiments of the present invention. The method of FIG. 16B typically comprises some or all of the following steps, suitably ordered e.g. as shown:

Step 1300: Using the intercept β0 and slope β1 of the line H fitted in step 1100, compute H(i+incremental integer)=the intersection of the line with the vertical x=i axis of the plot formed in step 1100.

Step 1310: Using β0, β1 Compute SD(i+incremental integer) (where i is the last point). The estimated standard deviation of g at the last point.

Step 1320: Compute EF(i+incremental integer) which is estimated F measure at iteration i+incremental integer by using the following transformation: exp(h)/(exp(h)+1), where h=H(i+incremental integer).

Step 1330: Compute EF(i+incremental integer)+ESD(i+incremental integer)

(which comprises sum of estimated F measure at iteration i+incremental integer and EF(i+incremental integer)'s standard deviation) by using the following transformation: exp (h)/(exp(h)+1), where h=H(i+incremental integer)+SD(i+incremental integer)

Step 1340: Compute EF(i+incremental integer)−ESD(i+incremental integer)

(which comprises difference between estimated F measure at iteration i+incremental integer and EF(i+incremental integer)'s standard deviation), by using the following transformation: exp(h)/(exp(h)+1), where h=H(i+incremental integer)−SD(i+incremental integer).

It is appreciated that instead of using the F-measure which is the Harmonic average of Recall and Precision, any function K(R,P) may be used, which maps R and P to a range, typically, [0,1], and which is non-decreasing in R and in P such that K(R+epsilon,P)>=K(R,P) for any positive epsilon and for which K(R,P+epsilon)>=K(R,P). Such K may include but is not limited to: Simple average, geometric average, Harmonic average, weighted average, R itself and P itself.

Typically, data under analysis includes an empirical F measure curve f increasing through training from some f0=f(0)>0 to some f1=f(∞)<1, as a function of time t=1, 2, . . .

f0 is the F measure corresponding to no learning. In this case all documents should be considered relevant, and f0=2*richness/(1+richness).

f1 is the maximal F measure possible, achievable through infinite training.

Certain embodiments of the present invention include a tool for estimating with confidence the current value of the F measure, the current rate of increase of the F measure, and if possible how close is the F measure achieved so far to f1, and a method for developing such a tool. To develop such a tool, function f may be monotonically transformed into another that admits standard statistical modeling.

The function g(t)=f/(1−f) increases from some g0>0 to some unrestricted g1>0. The function H=log(f/(1−f))) is known as the LOGIT or LOG-ODDS transformation (e.g. as described in Draper, N. R. and Smith, H. Applied Regression Analysis, Wiley, page 238 or in Mendenhall, W. and Sincich, T. A Second Course In Regression Analysis, Prentice-Hall). H is the most commonly applied monotone transformation from the interval (0,1) to the entire line, in statistical modeling and analysis. Typically, a regression model is fitted to H.

Advantages of use of the logit transformation are now described. If a certain index of relevance is normally distributed with some standard deviation σ and mean μR if the document is relevant, μNR otherwise. Then, given the index of relevance x of a document, the probability that it is relevant is derived from Bayes' formula as $$\frac{fR(x) * \text{rich}}{(fR(x) * \text{rich} + fNR(x) * (1 - \text{rich}))} = \frac{1}{1 + \exp\{\text{linear function of } x\}}$$

Therefore, the linear function of x is the LOGIT transformation of the probability of relevance, closely akin to the F measure. The question is how does the classification parameter (μR−μNR)/σ progress through learning. The increase in f depends on the classifier tool used, the nature of its stages, but also on the data itself. For example, if instead of the normal dichotomy above there are two types of relevant documents, clear-cut and borderline relevant, and a similar split holds for irrelevant documents, the distance and proportions of these four classes may influence training progress.

However, since f stabilizes eventually at a constant, it is reasonable to assume that g increases concavely, slower than linear. The Box & Cox (see Draper & Smith, page 236) family of transformations g (t)~G(t)=A*(t+B)C is posited, where A>0 and 0<C≦1. The role of B>0 is to allow the function to be positive at t=0 and the role of C is to model rate of increase. The constant A is a normalizing constant. These functions are unbounded. Models that incorporate an asymptote g1 g1are too noisy to be of value. Emphasis will be placed on the first two goals.

To fit power transformations two options exist: Fix C=1 and apply linear regression of g on time or allow C<1 and apply linear regression of the logit transformation log(g) on log(time+B). Most examples tried show sub-linear progress (as befits eventually constant processes), which may rule out the first option. While it makes sense to fit B too so as to allow the intercept G(0)=A*BC to adjust itself to richness, in practice changes in B do not affect the fit of g by G for large t except for the addition of unnecessary noise. Besides, richness seems inherently not identifiable from initially sparse F measure data, so it is advisable not to try. Therefore, fix B=1.

Random Time Transformations are described in Bassan, B., Marcus, R., Meilijson, I., Talpaz, H., 1997, Parameter estimation in differential equations, using random time transformations, Journal of the Italian Statistical Society 6, 177-199. The random nature of the data may be incorporated into the model by viewing "time" t as randomly advancing on the average like chronological time, with a standard deviation that grows like square root of chronological time. This means that actual learning after training based on additional sample size Δn fluctuates around this Δn rather than taking it literally. Thus, effective time progresses like "random walk", with mean equal to chronological time and variance proportional to chronological time. A practical implication of this model is that the empirically observed g may be viewed, in terms of unobserved noise ϵ, as $$G(t+1+\epsilon*\sqrt{t})=A*(t+1+\epsilon*\sqrt{t})C \approx A*(t+1)C*(1+\epsilon/\sqrt{t})$$

with H(t)=log(G(t))=log(A)+C*log(t+1)+ϵ/√t, a model amenable to weighted regression analysis.

The following model of weighted linear regression β0+β1*log(t+1) of H(t)=log [f(t)/(1−f(t)] on log(t+1) may be employed:

$$H(t)=\beta 0+\beta 1 * \log(t+1)+\sigma * Z(t)/\sqrt{t}$$

Optimal weights are inversely proportional to variances. Hence, under the model above that postulates standard deviation proportional to 1/√t, the observation at time t may be given weight t. This weight pattern, statistically justified as above and called for by the empirical observation that regression residuals have indeed standard deviations decaying roughly like 1/√t, is desirable, as it places more emphasis on late t, the region of interest. Weights in regression analysis only affect standard errors of the estimates of the parameters β0 and β1, as these estimates are unbiased regardless of weights.

At any moment t, the linear model is applied to data H(1), H(2), . . . , H(t), obtaining estimates β0 and β1 that depend on t. Standard formulas of regression analysis contribute estimates (and estimates of their standard errors) of a number of objects of interest, such as the intercept β0, the slope β1, the current mean value β0+β1 log(t+1) of H(t) and the mean value β0+β1 log(t+1+T) of H(t+T), time T from now. The confidence intervals estimates and their standard errors are tools upon which stopping decisions may be based.

For example, let Y be the column vector with entries H(i), let X be the t×2 matrix with entries X(i,1)=1 and X(i,2)=log (i+1) and let D be the t×t diagonal matrix with entries D(i,i)=i. Using notations which do not differentiate between estimates and the parameters they estimate, the estimate of the column vector β=[β0 β1]' is $$\beta = inv(X'^*D^*X)^*X'^*D^*Y;$$

and the estimate of σ2 is $$\sigma 2 = (Y - X^*P)'^* inv(D)^*(Y - X^*\beta)/\sqrt{(t-2)}$$

The estimate of the covariance matrix of the estimate of β is $$COV(\beta) = \sigma 2 * inv(X'^*D^*X)$$

In particular, the standard errors of β0 and β1 are the square roots of the diagonal terms of COV(β). Furthermore, the standard error of the value β0+β1 log(t+1+T) of H(t+T) is obtained as $$SD(T) = [1 \; log(t+1+T)]^* COV(\beta)^*[1 \; log(t+1+T)]'.$$

This holds for T=0 or T>0.

Suitable confidence intervals and stopping rules are now described. The Gaussian-oriented confidence interval for a parameter θ estimated by θ with standard error σ estimated via an average of squares by σ is [θ−t*σ, θ+t*σ] where t is taken from the t distribution with the desired confidence coefficient and the appropriate number of degrees of freedom. This method is applied to build an interval estimate of the current height H(t) of H as well as the height H(t+T) at a target future time t+T. These interval estimates are translated from H-scale to fmeasure-scale f=1/(1+exp(−H)). Plainly speaking, stopping decisions may be based on knowing confidently enough (i) what is the fmeasure currently, and (ii) the increase in fmeasure value from time t to time t+T is assessed as being too small under a cost effectiveness criterion.

The above analysis was done assuming the usual regression working paradigm according to which residuals Z(t) in H(t) are independent of each other. This assumption is optimistic, yielding standard errors smaller than those derived under an assumption of positively correlated residuals. Methods for handling autoregressively correlated residuals are known and may be employed. As an example, if the correlation coefficient between residuals d apart is ρd then standard errors increase with ρ, reaching at ρ=0.6 roughly twice their value at ρ=0 (as evaluated above).

It is appreciated that the applicability of certain embodiments of the present invention is not specific to document inspection. Also, the relevance/non-relevance determination described herein may be regarded as merely exemplary of a wide variety of binary determinations to which certain embodiments of the present invention apply.

FIG. 17 is a simplified flowchart illustration of a computerized method for comparing experts constructed and operative in accordance with certain embodiments of the present invention. The illustrated embodiment pertains to pairwise comparison of experts; if more than 2 experts are used, the method of FIG. 17 can be repeated for each pair of experts or for a subset of the possible pairs of experts, thereby to enable partial or complete ranking of the relative merits of the experts.

The method of FIG. 17 typically comprises some or all of the following steps, suitably ordered e.g. as shown:

In step 2110, Expert1 assigns Good/Bad (e.g. relevant/irrelevant) scores to each item (e.g. document) in a set of items.

In step 2120, Expert2 assigns Good/Bad scores to the same set.

In step 2130, a discrepancy matrix is constructed with cells N11, N12, N21, N22 whose sum is N (total number of items). N11=number of items deemed good e.g. relevant, by both experts. N22=number of items deemed bad e.g. irrelevant, by both experts. N12, N21=number of items deemed good by one expert and bad by the other, respectively.

In step 2140, an Oracle (a third expert, typically more trusted but more costly than the first two) is given at least some of (at least a sample of) only those documents that experts 1 and 2 disagreed on (sample of the union between N12 and N21). Define n1, n2, x1, x2 values as follows:

n1, n2=size of subsets sampled from N12, N21 respectively and provided to oracle x1, x2=number of items from among n1, n2 respectively which oracle deems good In step 2160, parameters p, r1, r2, $q_1$, $q_2$ are computed, where p is the richness of the set (percentage of good items in the set of N items), r1 and r2 are the theoretical recall rates of the experts; and $q_1$ and $q_2$ are the theoretical false positive rates of the experts (rate of occurrence of events in which bad documents are erroneously designated by the expert as good documents).

Using the following definitions, the following is obtained:

$$precision1 = p^*r1/(p^*r1 + (1-p)^*q1)$$

$$precision2 = p^*r2/(p^*r2 + (1-p)^*q2)$$

For large N:

$$N11/N = p^*r1^*r2 + (1-p)^*q1^*q2 \quad (1)$$

$$N12/N = p^*r1^*(1-r2) + (1-p)^*q1^*(1-q2) \quad (2)$$

$$N21/N = p^*(1-r1)^*r2 + (1-p)^*(1-q1)^*q2 \quad (3)$$

$$N22/N = p^*(1-r1)^*(1-r2) + (1-p)^*(1-q1)^*(1-q20) \quad (4)$$

The probability that a document, sampled from N12 and N21 respectively, is good, given that it is judged as good by Expert1 and bad by Expert 2, is $$x1/n1 = p^*r1^*(1-r2)^*N/((p^*r1^*(1-r2) + (1-p)^*q1^*(1-q2))^*N) = p^*r1^*(1-r2)^*N/N12; \text{ and} \quad (5)$$

$$x2/n2 = p^*r2^*(1-r1)^*N/((p^*r2^*(1-r1) + (1-p)^*q2^*(1-q1))^*N) = p^*r2^*(1-r1)^*N/N21 \quad (6)$$

There are 6 equations (one being redundant, one being quadratic) for the five variables.

In step 2170, characteristics of the two experts e.g. recall, precision, F measure (weighted or unweighted) and richness are computed and a determination is made as to which expert is better by comparing the characteristics thereof.

A particular advantage of certain embodiments of FIG. 1 is that since experts are often in agreement much of the time, much effort is spared by focusing the oracle solely on items on which the experts disagree.

One method for performing step 2160 is now described in detail, using the following terminology:

n11=N11/N
n21=N21/N
n12=N12/N
x1=X1/N1
x2=x2/N2
m1=n21+n11
m2=n12+n11

To obtain p2, solve:

$$(A1*r2+B1)/(C1*r2+D1)=(A2*r2+B2)/(C2*r2+D2)$$

A1=−x1*m2
B1=x1*n11
C1=−(n11−m2*m1)/n12−x1
D1=(n11−m2*m1)/n12+x1*m1
A2=(n11−m1*m2)/n21+x2*m2
B2=−x2*n11
C2=x2+(n11−m2*m1)/n21
D2=−x2*m1

The above equation yields the following quadratic equation:

$$alpha*r2*r2+beta*r2+gamma=0 \text{ where:}$$

alpha=A1*C2−A2*C1
beta=A1*D2+B1*C2−A2*D1−B2*C1
gamma=B1*D2−B2*D1

Solving for r2 yields two roots; r2 is taken to be the larger of the 2:

root_1=(−beta+SQRT(beta*beta−4*alpha*gamma))/(2*alpha)
root_2=(−beta−SQRT(beta*beta−4*alpha*gamma))/(2*alpha)

r2=Max(root_1, root2) Note that root_1 is always greater then root_2, hence r2=root_1.

r1, $q_1$, $q_2$ and p are now derived from p2, as follows:
r1=x1*(n11−r2*m2)/((n11−m2*m1)/n12*(1−r2)−x1*(r2−m1))
$q_1$=(m2*r2−n11)/(r2−m1)
$q_2$=(m1*r1−n11)/(r1−m2)
p=(n11−m2*m1)/((n11−m2*m1)+(r1−m2)*(r2−m1))

One method for performing step 2170 is now described in detail.

Expert1 may be characterized as having the following precision, recall and richness:

$$\text{Precision}=1/(1+(1-p)*q2/(p*r2))$$

$$\text{Recall}=r2$$

The unweighted F measure is 2×precision×recall/(precision+recall)

Expert2 may be characterized as having the following precision, recall and richness:

$$\text{Precision}=1/(1+(1-p)*q1/(p*r1))$$

$$\text{Recall}=r1$$

The unweighted F measure is 2×precision×recall/(precision+recall)

One of the two experts is selected as being better than the other, and used henceforth, e.g. based on one, some or all of the above comparative characteristics.

It is appreciated that the method of FIG. 17 has a wide variety of applications in a wide variety of fields in which items are inspected and a binary output of the inspection process is provided, such as but not limited to medical tests, occupational tests, educational tests, all typically computerized in administration, scoring or both; computerized search engines, fabrication facility inspection processes, and safety inspection processes.

An example application is now described, including a testing strategy used to evaluate a machine learning system, termed herein Learning1, for the automated prioritization of documents and keywords. The testing strategy utilizes a statistical model which generates the efficient point and interval statistical estimates of the precision and recall achieved by Learning1 against the precision and recall achieved by an alternative review, filtering or learning method. In the context of electronic discovery, the testing strategy can be applied to evaluate the efficiency of Learning1 in both the initial filtering stage, known as culling, or to the detailed review stage. Under extant approaches, the culling process is typically conducted using a search engine against an agreed list of keywords, while detailed review is conducted by human beings who read the individual documents.

The testing strategy is based on input from two reviewers, where one of the "reviewers" (experts) is the Learning1 software, and the second "reviewer" is an alternative review method, such as keyword-based culling or standard human review. The objective is to compare the review quality achieved by the competing review methods being tested. The testing strategy is based on a model of conditional independence given a latent variable, under which the assessments of the reviewers are conditionally independent, given the relevance assessment by an "oracle". The oracle is an authority whose determination of the relevance value of a document is considered error-free. As described in more detail below, this oracle is consulted in a sample of documents in which the competing review methods generate discrepant relevance values. This is a parsimonious paradigm that admits the identification of a solution from the available data.

Both reviewers grade each document as relevant or not relevant. The decisions for each document are then matched against the decisions of the alternative review method, creating a 2×2 matrix. In the foregoing discussion, R represents Relevant, and NR represents Not Relevant. In two cells, there is unanimous agreement between the Learning1 software decision and the alternative review method (for simplicity, the example assumes that the alternative method is manual keywords). One cell contains the number of documents that both methods agree are relevant. The other cell contains the number of documents that both methods agree are not relevant.

In the two remaining cells, there is a discrepancy between the decision of the human reviewer and the decision of Learning1. For documents where such a discrepancy exists, an "oracle" is consulted to adjudicate. The oracle is an independent, computerized or human judge whose determination of relevance is considered "true". The oracle is consulted only on a sample of the discrepant documents. Using the oracle's determinations, the estimated precision and recall of the competing review methods are computed, using a suitable statistical model e.g. as follows.

Statistical model: A contingency table five-parameter model may be used in testing of Learning1 vis a vis its alternative. The model is used to compute the estimated precision and recall of the two reviewers. In addition, the model may compute the richness (proportion of relevant documents in the collection).

Relevance. Each of N documents is either R (relevant) or NR (not relevant). The fraction p of relevant documents is a parameter of the model.

Oracle. An oracle OR can decide at a high cost whether a document is R or NR. Two experts. Each of two experts $E_1$ and $E_2$ assesses each of the N documents and judges whether the document is R or NR.

First-stage data-experts. Let $N(1,1)$ be the number of documents unanimously judged as relevant by the two experts and $N(2,2)$ the number of documents unanimously judged as not relevant by the two experts. Let $N(1,2)$ be the number of documents judged as relevant by expert $E_1$ and not relevant by $E_2$, and $N(2,1)$ be the number of documents judged as relevant by expert $E_2$ and not relevant by $E_1$.

Second-stage data-oracle. A sample of size $n_1$ is randomly chosen from the $N(1,2)$ documents judged R by $E_1$ and NR by $E_2$. A sample of size $n_2$ is randomly chosen from the $N(2,1)$ documents judged R by $E_2$ and NR by $E_1$. These documents are submitted to the oracle OR for assessment. Out of the $n_1$ observations from $N(1,2)$, $x_1$ are assessed by OR as R. Out of the $n_2$ observations from $N(2,1)$, $x_2$ are assessed by OR as R.

Model assumption 1. If a document is relevant, then expert $E_1$ ($E_2$) will judge the document as relevant with probability $r_1$ ($r_2$) and if the document is not relevant, expert $E_1$ ($E_2$) will judge the document as relevant with probability $q_1$ ($q_2$). These four probabilities complete the list of five parameters of the model: $p, r_1, r_2, q_1$ and $q_2$.

Model assumption 2. Experts $E_1$ and $E_2$ judge each R or NR document independently.

Interpretation. These assumptions are stringent, essentially stating that R (and, similarly, NR) documents are one uniform pool, equally difficult to judge.

Recall. $r_1$ and $r_2$ are the theoretical recall rates of the experts; $q_1$ and $q_2$ are the theoretical false positive rates of the experts.

Precision. The theoretical global fraction of documents judged to be relevant by expert $E_1$ is $p r_1+(1-p)q_1$. The rate of relevant documents among those judged to be relevant by expert $E_1$ is the theoretical $$\text{precision } prec_1 = \frac{pr_1}{pr_1 + (1-p)q_1}$$

of expert $E_1$. The precision $$prec_2 = \frac{pr_2}{pr_2 + (1-p)q_2}$$

of expert $E_2$ follows the same lines.

Note that the parameters of the model can be described in two ways: $(p, r_1, r_2, q_1, q_2)$ or $(p, r_1, r_2, prec_1, prec_2)$. The former is used herein as it is the most convenient mathematically. The latter terminology is used for presentation of the results.

Working assumption 3. The value of N is so large that in practice, the empirical fractions $$\frac{N(1,1)}{N}; \frac{N(1,2)}{N}$$
$$\frac{N(2,1)}{N}; \frac{N(2,2)}{N}$$

are equal to their theoretical counterparts $$pr_1r_2+(1-p)q_1q_2; pr_1(1-r_2)+(1-p)q(1q_2)$$

$$p(1-r_1)r_2+(1-p)(1-q_1)q_2; p(1-r_1)(1-r_2)+(1-p)(1-q_1)(1-q_2)$$

Interpretation. Working assumption 3 provides three deterministic equations (one of the four $N(i,j)$'s is obtained by subtracting from N the sum of the other three) for the five parameters of the model. The other two equations are obtained from the second-stage sampling, as described in the next paragraph. Since the sample sizes $n_1$ and $n_2$ range in practice from high tens to low hundreds, the two additional equations provided by the correct assessment of the oracle OR are stochastic. As a result, the five parameters may be estimated rather than evaluated, and confidence intervals are typically provided for all parameters of interest.

Two additional equations—MLE. The probability that a document is R given that it is judged as R by $E_1$ and NR by $E_2$ is $$Q(1,2) = \frac{pr_1(1-r_2)}{pr_1(1-r_2) + (1-p)q_1(1-q_2)} = \frac{pr_1(1-r_2)N}{N(1,2)}$$

Accordingly, the probability that a document is R given that it is judged as R by $E_2$ and NR by $E_1$ is $$Q(2,1) = \frac{p(1-r_1)r_2}{p(1-r_1)r_2 + (1-p)(1-q_1)q_2} = \frac{p(1-r_1)r_2N}{N(2,1)}$$

the likelihood function. Thus, the probability of the observed second-stage data $(X_1, X_2)$ is defined below (omitting binomial coefficients):

$$\text{LIK} = Q(1,2)^{X_1}(1-Q(1,2))^{n_1-X_1}Q(2,1)^{X_2}(1-Q(2,1))^{n_2-X_2}$$

This probability of obtaining the observed $x_1$ and $x_2$ relevant documents, viewed as a function of the five parameters of the model, is the likelihood function. The common statistical method Maximum Likelihood Estimation (MLE) calls for estimating the parameters by maximizing this function, or, in practice, its logarithm. This is accomplished by equating to zero the corresponding derivatives, termed score function in Statistics, the gradient of the logarithm of the likelihood. In this case it is two-dimensional, the dimension left free by the three deterministic equations. These two additional equations are, plainly, equating (the theoretical) $Q(1,2)$ to (the empirical)

$$\frac{X_1}{n_1}$$

and $Q(2,1)$ to $$\frac{X_2}{n_2}.$$

$$\frac{pr_1(1-r_2)}{pr_1(1-r_2) + (1-p)q_1(1-q_2)} = \frac{pr_1(1-r_2)N}{N(1,2)} = \frac{X_1}{n_1}$$

$$\frac{p(1-r_1)r_2}{p(1-r_1)r_2 + (1-p)(1-q_1)q_2} = \frac{p(1-r_1)r_2N}{N(2,1)} = \frac{X_2}{n_2}$$

Solving for the parameters: The parameter $r_2$ is considered as a free parameter. The four parameters $r_1, q_1, q_2$ and $p$ are represented in terms of $r_2$ by the following formulas.

$$r_1 = \frac{\frac{N(1,2)}{N}\frac{X_1}{n_1}r_2}{\frac{N(1,2)}{N}\frac{X_1}{n_1}r_2 + \frac{N(2,1)}{N}\frac{X_2}{n_2}(1-r_2)}$$

$$q_1 = \frac{\frac{N(1,1)+N(1,2)}{N}r_2 - \frac{N(1,1)}{N}}{r_2 - \frac{N(1,1)+N(2,1)}{N}}$$

$$q_2 = \frac{\frac{N(1,1)+N(2,1)}{N}r_1 - \frac{N(1,1)}{N}}{r_1 - \frac{N(1,1)+N(1,2)}{N}}$$

$$p = \frac{\frac{N(1,1)}{N} - \frac{N(1,1)+N(2,1)}{N}\frac{N(1,1)+N(1,2)}{N}}{\frac{N(1,1)}{N} - \frac{N(1,1)+N(2,1)}{N}\frac{N(1,1)+N(1,2)}{N} + \left(r_1 - \frac{N(1,1)+N(1,2)}{N}\right)\left(r_2 - \frac{N(1,1)+N(2,1)}{N}\right)}$$

This leaves one equation in terms of $r_2$ only. This is a quadratic equation with two solutions, only one of which corresponds to a maximum of the likelihood function. All five parameters are now evaluated from the three $N(i,j)$-type and the two $x_i$-type data.

The simulation-based approach discussed here is known in problems in which it is impractical to derive exact analytical probability models. The simulation may be performed as follows: fix the parameter vector as estimated, fix $n_1$ and $n_2$ and simulate the corresponding two binomial or hyper geometric distributions SIM times (say, SIM=100000). For every simulation run, compute $x_1$ and $x_2$, and with them the parameter vector. Moreover, evaluate each parameter of interest, such as relevance rate, expert-wise recall and precision rates, total recall and precision rates for various decision rules (such as to decide R if and only if $E_1$ and $E_2$ concur on R). Report as 95% confidence interval the central 95% range of the corresponding SIM-size-based empirical distribution.

An approximate sampling scheme from binomial BIN(m, q) or hyper geometric distributions is as follows: Sample a Gaussian variable Z with the desired mean 0 and variance 1 (or $$1 - \frac{m-1}{M-1}\Big|$$

for population size M), solve for XX in $$\frac{\frac{XX}{m} - q}{\sqrt{\frac{XX}{m}\left(1 - \frac{XX}{m}\right)}}\sqrt{m} = Z\Bigg|$$

and let X be the integer between 0 and m that is closest to XX.

Numerical Example

FIG. 18A is a table of binary determinations made by two experts, each of which may comprise a computerized item analysis process having a binary output. FIG. 18B is a table representing sampling of only those items about which the experts of FIG. 18A disagreed i.e. only of the union of the 20,000 items deemed non-relevant by Expert1 and relevant by Expert2 and of the 45,000 items deemed relevant by Expert1 and non-relevant by Expert2.

The computations of step 2160 yield:
n11 0.13402
n21 0.04639
n12 0.02062
x1 0.33333×
x2 0.6
m1 0.18041
m2 0.15464
A1 −0.0515
B1 0.04467
C1 −5.4802
D1 5.20704
A2 2.3803
B2 −0.0804
C2 2.88751
D2 −0.1082
alpha 12.8958
beta −12.7
gamma 0.41388
r2
roots
root_1 0.95111
root_2 0.03374
r2 0.95111
r1 0.82768
q1 0.01694
q2 0.02274
p 0.16984

The precision, recall and F-measure of the two experts are as summarized in the table of FIG. 18C, and the richness of the set is approximately 0.17. Expert1 would probably be preferred to continue the analysis of the objects under inspection, because its recall considerably exceeds that of Expert2 whereas the two experts are approximately equal in their level of precision.

Figure 19:
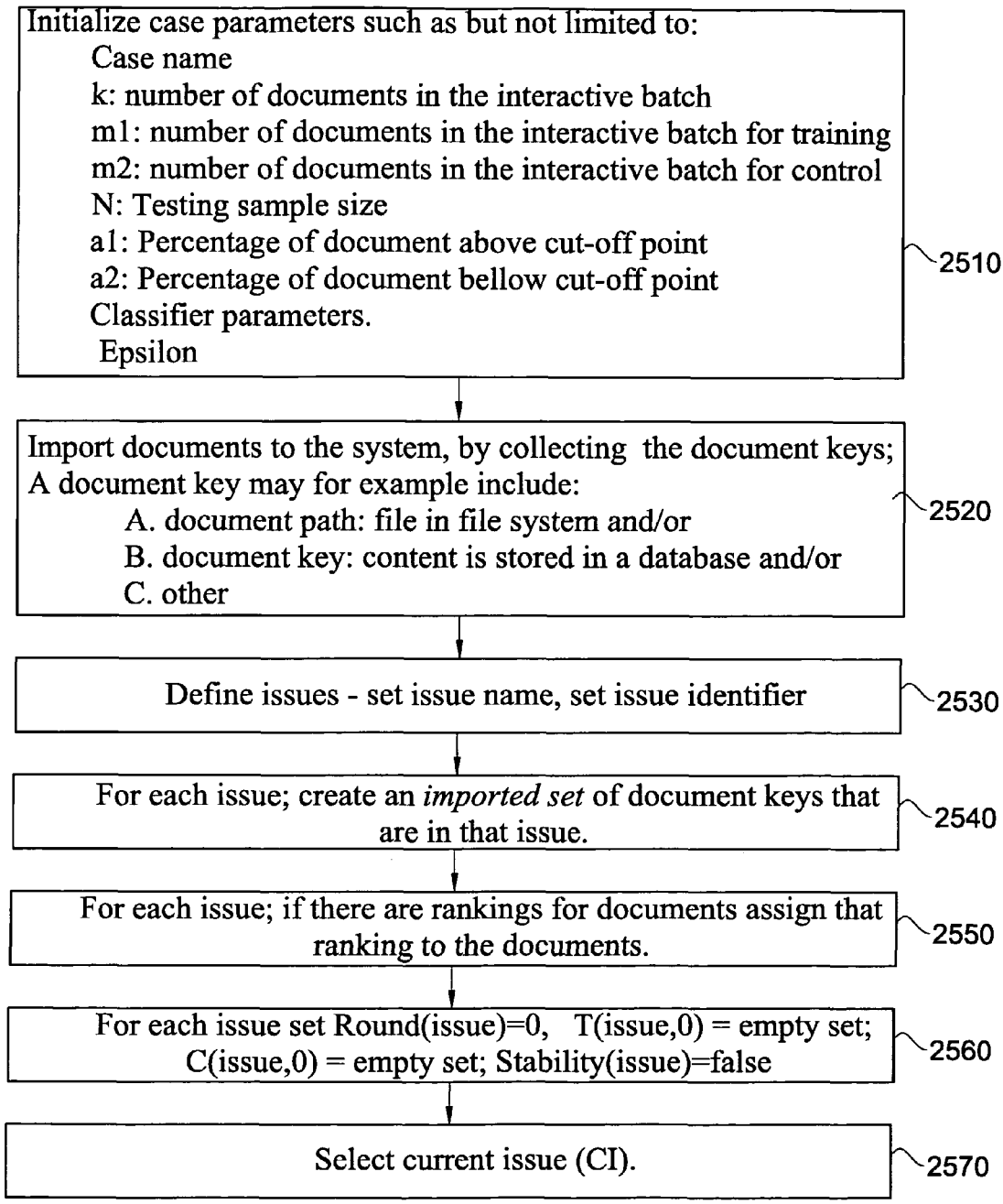
FIG. 19 is a simplified flowchart illustration of a computerized method for performing the set-up step of FIG. 1, operative in accordance with certain embodiments of the present invention.

One method for performing the set-up step 10 of FIG. 1 is now described with reference to FIG. 19. The method of FIG. 19 typically includes some or all of the following steps, suitably ordered e.g. as shown:

Step 2510: Initialize case parameters e.g. Case name; k: number of documents in the interactive batch (for example, 40 documents); m1: number of documents in the interactive batch for training (for example, 20 out of the 40 documents); m2: number of documents in the interactive batch for control (for example, those 20 out of the 40 documents which are not in the training batch); N: Testing sample size (for example, 10000 or 50000 documents); a1: Percentage of document above cut-off point (for example, 0.25); a2: Percentage of document below cut-off point (for example, 0.25); conventional classifier parameters; and epsilon (for example, 0.1).

Step 2520: Import documents to the system, by collecting the document keys; A document key may comprise one or more of a. document path: file in file system
b. document key: content is stored in a database
c. other Step 2530: Define issues—set issue name, set issue identifier.

Step 2540: For each issue; create an imported set of document keys that are in that issue.

Step 2550: For each issue; if there are rankings for documents assign that ranking to the documents.

Step 2560: For each issue set Round(issue)=0, T(issue,0)=empty set; C(issue,0)=empty set; Stability (issue)=false Step 2570: Select current issue (CI).

One method for performing the interactive ranking step 20 of FIG. 1 is now described with reference to FIG. 20. The method of FIG. 20 typically includes some or all of the following steps, suitably ordered e.g. as shown:

Step 2610: Round(CI)=Round(CI)+1.

Step 2620: If Round(CI)=1 (this is the first interactive ranking of the issue) then select at random k documents from the imported set add m1 documents to T(CI,1), and m2 documents to C(CI,1). Otherwise the k documents were already selected, m1 documents will be used for training; T(CI, Round(CI))−T(CI, Round(CI)−1), and m2 documents will be used for control; C(CI, Round(CI))−C(CI, Round(CI)−1). (k=m1+m2).

Step 2630: The reviewer manually reviews T(CI, Round (CI))−T(CI, Round(CI)−1) and C(CI, Round(CI))−C(CI, Round(CI)−1) by assigning R, NR, Skip values according the relevancy to the issues. (while reviewing a document the reviewer can assign R/NR/Skip to multiplicity of issues). Optional: When manually reviewing the document the system can alert if the manual review of document d is R but R(CI, Round(CI))(d) is small, or if the document is NR but R(CI, Round(CI))(d) is big. Optional: When manually reviewing the documents the system can alert if two documents $d\_i$, and $d\_j$ are similar but the manual review is different.

One method for performing the result sampling step 30 of FIG. 1 is now described with reference to FIG. 21. The method of FIG. 21 typically includes some or all of the following steps, suitably ordered e.g. as shown:

Step 2710: If Round(CI)=1 jump to step 2750

Step 2720: Compute optimal cut-off point e.g. as described in FIG. 22

Step 2730: Compute stability for the current issue. Use the triple values (j, Recall(CI, j), Precision(CI, j) for j<Round (CI)) to compute the stability as described below e.g. as per FIG. 15A (steps 1080 onward), 15B and 15C, taking parameter I to be j and computing the F measure conventionally from the recall and precision values;

Step 2740: Based on the stability report computed in step 2730, the reviewer is typically given an opportunity to select an option from among some or all of the following options:

Option 1=continue interactive ranking with the current issue;

Option 2=complete steps 2750-2780, change the current issue to some other issue and go to Interactive ranking 20;

Option 3=The classifier is "good enough" for current issue; Set Stability(CD=true; Go to Batch ranking 40; and Option 4=The classifier is "good enough" for current issue; Set Stability(CI)=true; change the current issue to some other issue and jump with the new issue to Interactive ranking step 20.

Step 2750: Creates a classifier C(CI, Round(CI)). From the training documents T(CI, Round(CI)) take documents reviewed as R as positive set, and documents reviewed as NR as negative set.

Step 2760: Select N documents (e.g. 10000) $d\_1, d\_2, \ldots, d\_N$, and run C(CI, Round(CI)) on those documents. Let R(CI, Round(CI))($d\_j$) be the rank of document $d\_j$.

Step 2770: From $d\_1, d\_2, \ldots, d\_N$, insert at random m2 documents to C(CI, Round(CI))

Step 2780: if (Round(CI)=1). From $d\_1, d\_2, \ldots, d\_N$, insert at random m2 documents to T(CI, Round(CI))

Step 2790: else (Round(CI)>1). From $d\_1, d\_2, \ldots, d\_N$, insert m1 documents (that are not in C(CI, Round(CI))) to T(CI, Round(CI)) using suitable criteria such as some or all of the following:

i. Let x=CO(CI, Round(CI));

ii. a1*m1 random document with R(CI, Round(CI)) ($d\_j$)>x+epsilon;

iii. a2*m1 random document with R(CI, Round(CI)) ($d\_j$)<x−epsilon; and iv. (1−a1−a2)*m1 random document with x−epsilon<=R (CI, Round(CI))($d\_j$)<=x+epsilon.

Step 2795: Go to Interactive ranking step 20 in FIG. 1.

Figure 22:
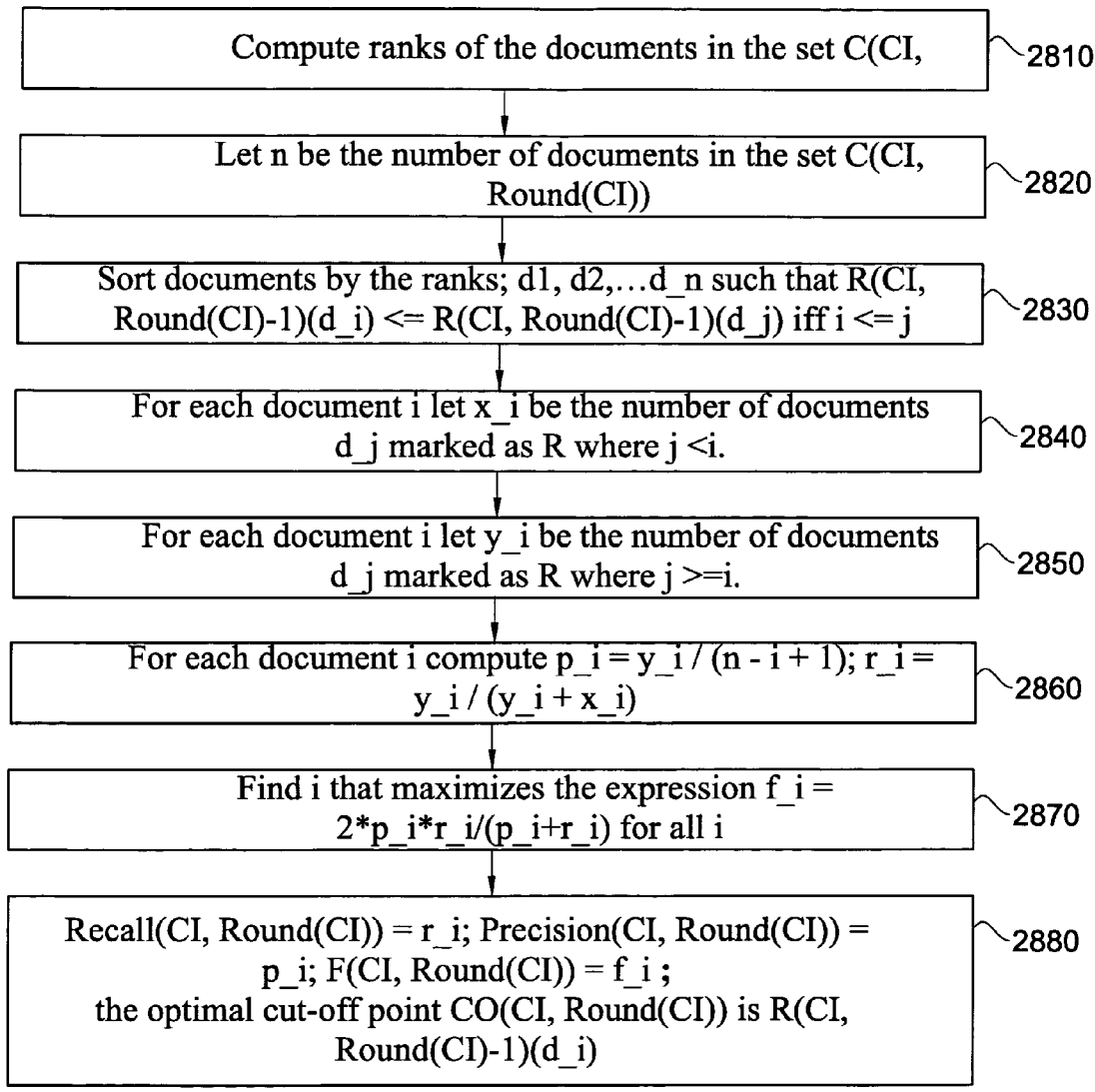
FIG. 22 is a simplified flowchart illustration of a computerized method for performing the optimal cut-off point computation step in FIG. 21, the method being operative in accordance with certain embodiments of the present invention.

One method for performing the optimal cut-off point computation step in FIG. 21 is now described with reference to FIG. 22. The method of FIG. 22 typically includes some or all of the following steps, suitably ordered e.g. as shown:

Step 2810: Compute ranks of the documents in the set C(CI, Round(CI)) using the classifier C(CI, Round(CI)−1)

Step 2820: Let n be the number of documents in the set C(CI, Round(CI))

Step 2830: Sort documents by the ranks; $d1, d2, \ldots d\_n$ such that R(CI, Round(CI)−1)($d\_i$)<=R(CI, Round(CI)−1)($d\_j$) iff i<=j Step 2840: For each document i let $x\_i$ be the number of documents $d\_j$ marked as R where j<i.

Step 2850: For each document i let $y\_i$ be the number of documents $d\_j$ marked as R where j>=i.

Step 2860: For each document i compute $p\_i = y\_i/(n−i+1)$; $r\_y = y\_i/(y\_i+x\_i)$.

Step 2870: Find i that maximized the expression $f\_i = 2*p\_i*r\_i/(p\_i+r\_j)$ for all i.

Step 2880: Recall(CI, Round(CI))=$r\_i$; Precision(CI, Round(CI))=$p\_i$; F(CI, Round(CI))=$f\_i$; the optimal cut-off point CO(CI, Round(CI)) is R(CI, Round(CI)−1)($d\_i$).

Figure 23A:
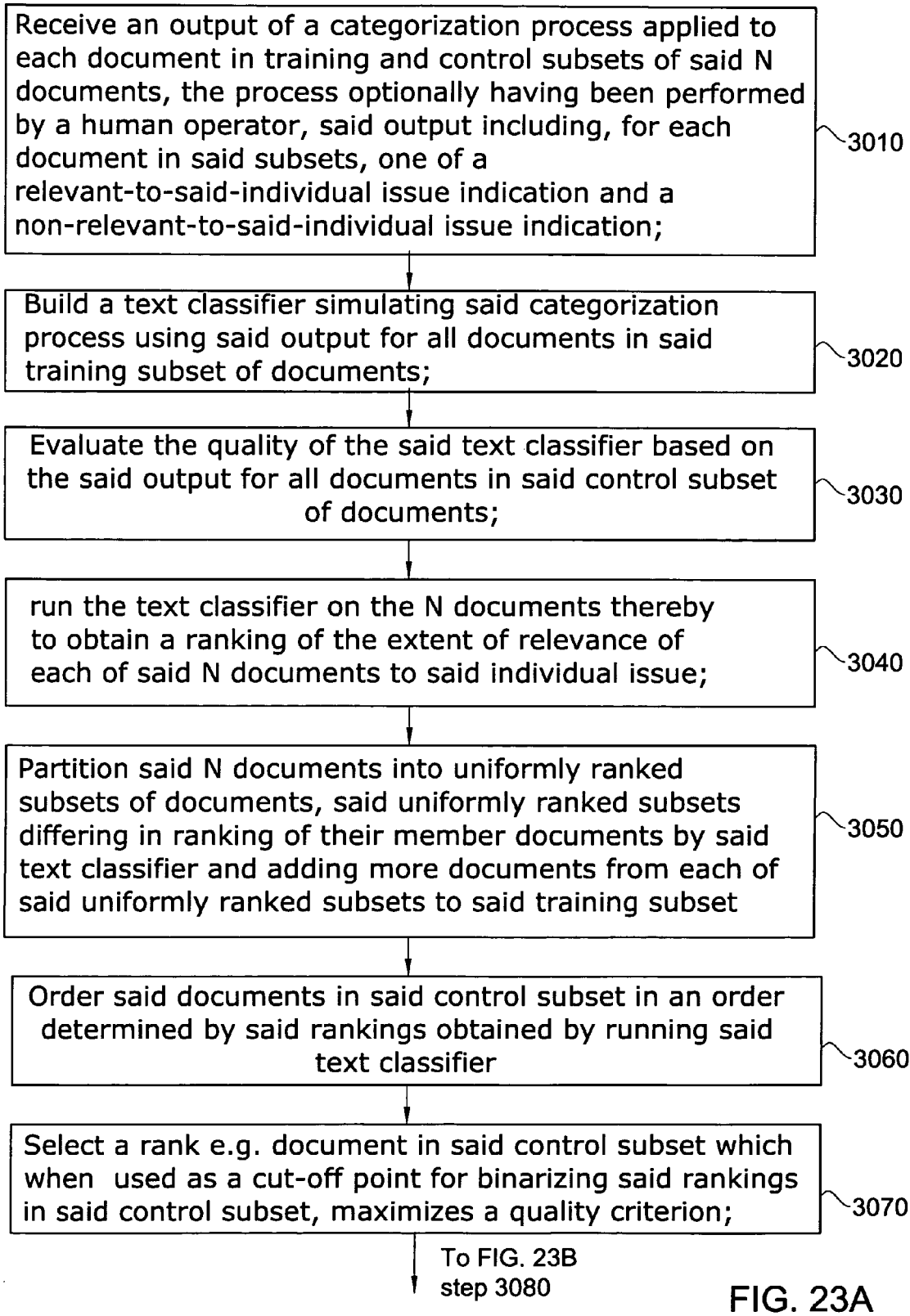

FIGS. 23A-23B, taken together, form a flowchart of an electronic document analysis method receiving N electronic documents pertaining to a case encompassing a set of issues including at least one issue and establishing relevance of at least the N documents to at least one individual issue in the set of issues, the method comprising, for at least one individual issue from among the set of issues. The method of FIGS. 23A-23B typically includes some or all of the following steps, suitably ordered e.g. as shown:

Step 3010: receive an output of a categorization process applied to each document in training and control subsets of the N documents, the process optionally having been performed by a human operator, the output including, for each document in the subsets, one of a relevant-to-the-individual issue indication and a non-relevant-to-the-individual issue indication.

Step 3020: build a text classifier simulating the categorization process using the output for all documents in the training subset of documents.

Step 3030: evaluate the quality of the text classifier based on the output for all documents in the control subset of documents.

Step 3040: run the text classifier on the N documents thereby to obtain a ranking of the extent of relevance of each of the N documents to the individual issue.

Step 3050: partition the N documents into uniformly ranked subsets of documents, the uniformly ranked subsets differing in ranking of their member documents by the text classifier and adding more documents from each of the uniformly ranked subsets to the training subset.

Step 3060: order the documents in the control subset in an order determined by the rankings obtained by running the text classifier.

Step 3070: select a rank e.g. document in the control subset which when used as a cut-off point for binarizing the rankings in the control subset, maximizes a quality criterion.

Step 3080: using the cut-off point, compute and store at least one quality criterion e.g. F measure characterizing the binarizing of the rankings of the documents in the control subset, thereby to define a quality of performance indication of a current iteration I.

Step 3090: display a comparison of the quality of performance indication of the current iteration I to quality of performance indications of previous iterations e.g. by generating at least one graph of at least one quality criterion vs. iteration serial number.

Step 3100: seek an input (e.g. a user input received from a human user and/or a computerized input including a computerized indication of flatness of the graph of at least one quality criterion vs. iteration serial number) as to whether or not to return to the receiving step thereby to initiate a new iteration I+1 which comprises the receiving, building, running, partitioning, ordering, selecting, and computing/storing steps and initiate the new iteration I+1 if and only if so indicated by the input, wherein the iteration I+1 may use a control subset larger than the control subset of iteration I and may include the control subset of iteration I merged with an additional group of documents of pre-determined size randomly selected from the collection of documents.

Step 3110: run the text classifier most recently built on at least the collection of documents thereby to generate a final output and generating a computer display of the final output e.g. a histogram of ranks for each issue and/or a function of an indication of a quality measure (e.g. F measure; precision; recall), such as a graph of the quality measure as a function of cut-off point, for each of a plurality of cut-off points and optionally a culling percentage including an integral of the graph.

A suitable data structure for implementing the methods and systems shown and described herein may be stored in a relational database and on the file system. The tables in the database may include:

a. a Document table storing for each document a "Document key", and an internal docID.

b. an Issue Table storing, for each issue, the issue name, issue ID, and Stability(issue) computed as described herein.

c. DocumentIssue table: a table with three columns: docID, issueID, and rank. Each row represents an individual docID which belongs to a certain issue, issueID, and has a particular rank as indicated by the corresponding classifier.

d. Classifier table: Each classifier has a unique ID, associated by the table with the issue the classifier was built for.

e. ClassifierDocuments table having 3 columns; classifierID, docID, docType. DocType can be either "train as positive example", "train as negative example", control.

f. Parameter table that holds all the parameters in the system.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques, Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Any computations or other forms of analysis described herein may be performed by a suitable computerized method. The invention shown and described herein may include (a) using a computerized method to identify a solution to any of the problems or for any of the objectives described herein. The solution may include at least one of a decision, an action, a product, a service or any other information that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery.

The invention claimed is:

1. An electronic document analysis method receiving N electronic documents pertaining to a case encompassing a set of issues including at least one issue and establishing relevance of at least the N electronic documents to at least one individual issue in the set of issues, the method comprising, for at least one individual issue from among said set of issues:

receiving an output of a categorization process applied to each document in training and control subsets of said at least N electronic documents, said output including, for each document in said subsets, one of a relevant-to-said-individual issue indication and a non-relevant-to-said-individual issue indication;

building a text classifier simulating said categorization process using said output for all documents in said training subset of documents;

evaluating said text classifier's quality using said output for all documents in said control subset;

running the text classifier on the at least N electronic documents thereby to obtain a ranking of the extent of relevance of each of said at least N electronic documents to said individual issue;

partitioning said at least N electronic documents into uniformly ranked subsets of documents, said uniformly ranked subsets differing in ranking of their member documents by said text classifier and adding more documents from each of said uniformly ranked subsets to said training subset;

selecting a cut-off point for binarizing said rankings of said documents in said control subset;

using said cut-off point, computing and storing at least one quality criterion characterizing said binarizing of said rankings of said documents in said control subset, thereby to define a quality of performance indication of a current iteration I;

displaying a comparison of the quality of performance indication of the current iteration I to quality of performance indications of previous iterations;

seeking an input as to whether or, not to return to said receiving step thereby to initiate a new iteration I+1 which comprises said receiving, building, running, partitioning, selecting, and computing/storing steps and initiating said new iteration I+1 if and only if so indicated by said input; and running the text classifier most recently built on at least said N electronic documents thereby to generate a final output and generating a computer display of said final output.

2. The method according to claim 1 wherein said cut-off point is selected from all ranks of documents in said control subset so as to maximize a quality criterion.

3. The method according to claim 2 wherein said quality criterion comprises an F-measure.

4. The method according to claim 2 wherein said at least one quality criterion characterizing said binarizing of said rankings of said documents in said control subset comprises at least one of the following criteria: an F-measure; a precision parameter, and a recall parameter.

5. The method according to claim 1 wherein said displaying a comparison comprises generating at least one graph of at least one quality criterion vs. iteration serial number.

6. The method according to claim 5 wherein said input comprises a computerized input including a computerized indication of flatness of said graph of at least one quality criterion vs. iteration serial number.

7. The method according to claim 1 wherein said input comprises a user input received from a human user.

8. The method according to claim 1 wherein said iteration I+1 uses a control subset larger than the control subset of iteration I, said control subset including the control subset of iteration I merged with an additional group of documents of pre-determined size randomly selected from said at least N electronic documents.

9. The method according to claim 1 wherein said computer display of said final output comprises a histogram of ranks for each issue.

10. The method according to claim 1 wherein said computer display of said final output comprises a function of an indication of a quality measure for each of a plurality of cut-off points.

11. The method according to claim 10 wherein said quality measure is selected from the following group: un-weighted F-measure; weighted F-measure; precision; recall; and accuracy.

12. The method according to claim 10 wherein said function of said indication of a quality measure for each of a plurality of cut-off points comprises a graph of said quality measure as a function of cut-off point.

13. The method according to claim 12 wherein said function of said indication comprises a culling percentage including an integral of said graph.

14. The method according to claim 12 wherein said function of said indication comprises a culling percentage including an integral of said graph.

15. The method according to claim 1 wherein said set of issues comprises a plurality of issues and said computer display includes an indication of documents relevant to a logical combination of a plurality of issues.

16. The method according to claim 1 further comprising using said text classifier most recently built to generate, for at least one individual issue in said set of issues, a set of keywords differentiating documents relevant to said individual issue to documents irrelevant to said individual issue.

17. The method according to claim 1 wherein said receiving comprises receiving an output of a categorization process performed by a human operator.

18. The method according to claim 1 wherein said input is a function of at least one of a precision value, a recall value and an F-measure currently characterizing said classifier.

19. The method according to claim 1 further comprising:
classifying each document from among said N electronic documents as relevant or irrelevant to an issue; and
generating a computer display of at least one user-selected document within said N electronic documents, wherein at least some words in said user-selected document are differentially presented depending on their contribution to said classifying of the document as relevant or irrelevant, wherein
said words differentially presented are differentially colored and intensity of color is used to represent strength of said contribution for each word.

20. The method according to claim 1, further comprising:
classifying each document from anion said N electronic documents as relevant or irrelevant to an issue;
generating a computer display of at least one user-selected document within said N electronic documents, wherein at least some words in said user-selected, document are differentially presented depending on their contribution to said classifying of the document as relevant or irrelevant;
sequentially removing certain sets of words from each individual document classified and using the text classifier to classify said document's relevance assuming said words are removed, thereby to obtain a relevance output for each set of words; and
comparing said relevance output to an output obtained by using the text classifier to classify said individual document without removing any words, thereby to obtain an indication of the contribution of each set of words to the relevance of the document.

21. The method according to claim 20 wherein said receiving comprises receiving an output of a categorization process performed by a human operator.

22. The method according to claim 20 wherein said cut-off point is selected from all ranks of documents in said control subset so as to maximize a quality criterion.

23. The method according to claim 22 wherein said quality criterion comprises an F-measure.

24. The method according to claim 22 wherein said at least one quality criterion characterizing said binarizing of said rankings of said documents in said control subset comprises at least one of the following criteria: an F-measure; a precision parameter, and a recall parameter.

25. The method according to claim 20 wherein said displaying a comparison comprises generating at least one graph of at least one quality criterion vs. iteration serial number.

26. The method according to claim 25 wherein said input comprises a computerized input including a computerized indication of flatness of said graph of at least one quality criterion vs. iteration serial number.

27. The method according to claim 20 wherein said input comprises a user input received from a human user.

28. The method according to claim 20 wherein said iteration I+1 uses a control subset larger than the control subset of iteration I, said control subset including the control subset of iteration I merged with an additional group of documents of pre-determined size randomly selected from said at least N electronic documents.

29. The method according to claim 20 wherein said computer display of said final output comprises a histogram of ranks for each issue.

30. The method according to claim 20 wherein said computer display of said final output comprises a function of an indication of a quality measure for each of a plurality of cut-off points.

31. The method according to claim 30 wherein said quality measure is selected from the following group: un-weighted F-measure; weighted F-measure; precision; recall; and accuracy.

32. The method according to claim 30 wherein said function of said indication of a quality measure for each of a plurality of cut-off points comprises a graph of said quality measure as a function of cut-off point.

33. The method according to claim 32 wherein said function of said indication comprises a culling percentage including an integral of said graph.

34. The method according to claim 20 wherein said set of issues comprises a plurality of issues and said computer display includes an indication of documents relevant to a logical combination of a plurality of issues.

35. The method according to claim 20 further comprising using said text classifier most recently built to generate, for at least one individual issue in said set of issues, a set of keywords differentiating documents relevant to said individual issue to documents irrelevant to said individual issue.

36. The method according to claim 20 further comprising:
classifying each document from among said N electronic documents as relevant or irrelevant to an issue; and
generating a computer display of at least one user-selected document within said N electronic documents, wherein at least some words in said user-selected document are differentially presented depending on their contribution to said classifying of the document as relevant or irrelevant,
wherein said words differentially presented are differentially colored and wherein intensity of color is used to represent strength of said contribution for each word.

37. The method according to claim 20 wherein said input is a function of at least one of a precision value, recall value and F-measure currently characterizing said classifier.

38. The method according to claim 20 wherein said receiving comprises receiving an output of a categorization process performed by a human operator.

39. The method according to claim 20 wherein said cut-off point is selected from all ranks of documents in said control subset so as to maximize a quality criterion.

40. The method according to claim 39 wherein said quality criterion comprises an F-measure.

41. The method according to claim 39 wherein said at least one quality criterion characterizing said binarizing of said rankings of said documents in said control subset comprises at least one of the following criteria: an F-measure; a precision parameter, and a recall parameter.

42. The method according to claim 20 wherein said displaying a comparison comprises generating at least one graph of at least one quality criterion vs. iteration serial number.

43. The method according to claim 42 wherein said input comprises a computerized input including a computerized indication of flatness of said graph of at least one quality criterion vs. iteration serial number.

44. The method according to claim 20 wherein said input comprises a user input received from a human user.

45. The method according to claim 20 wherein said iteration I+1 uses a control subset larger than the control subset of iteration I, said control subset including the control subset of iteration I merged with an additional group of documents of pre-determined size randomly selected from said at least N electronic documents.

46. The method according to claim 20 wherein said computer display of said final output comprises a histogram of ranks for each issue.

47. The method according to claim 20 wherein said computer display of said final output comprises a function of an indication of a quality measure for each of a plurality of cut-off points.

48. The method according to claim 47 wherein said quality measure is selected from the following group: un-weighted F-measure; weighted F-measure; precision; recall; and accuracy.

49. The method according to claim 47 wherein said function of said indication of a quality measure for each of a plurality of cut-off points comprises a graph of said quality measure as a function of cut-off point.

50. The method according to claim 20 wherein said set of issues comprises a plurality of issues and said computer display includes an indication of documents relevant to a logical combination of a plurality of issues.

51. The method according to claim 20 further comprising using said text classifier most recently built to generate, for at least one individual issue in said set of issues, a set of keywords differentiating documents relevant to said individual issue to documents irrelevant to said individual issue.

52. The method according to claim 20 further comprising:
classifying each document from among said N electronic documents as relevant or irrelevant to an issue; and
generating a computer display of at least one user-selected document within said N electronic documents, wherein at least some words in said user-selected document are differentially presented depending on their contribution to said classifying of the document as relevant or irrelevant,
wherein said words differentially presented are differentially colored and wherein intensity of color is used to represent strength of said contribution for each word.

53. The method according to claim 19 wherein said receiving comprises receiving an output of a categorization process performed by a human operator.

54. The method according to claim 19 wherein said cut-off point is selected from all ranks of documents in said control subset so as to maximize a quality criterion.

55. The method according to claim 54 wherein said quality criterion comprises an F-measure.

56. The method according to claim 54 wherein said at least one quality criterion characterizing said binarizing of said rankings of said documents in said control subset comprises at least one of the following criteria: an F-measure; a precision parameter, and a recall parameter.

57. The method according to claim 19 wherein said displaying a comparison comprises generating at least one graph of at least one quality criterion vs. iteration serial number.

58. The method according to claim 57 wherein said input comprises a computerized input including a computerized indication of flatness of said graph of at least one quality criterion vs. iteration serial number.

59. The method according to claim 19 wherein said input comprises a user input received from a human user.

60. The method according to claim 19 wherein said iteration I+1 uses a control subset larger than the control subset of iteration I, said control subset including the control subset of iteration I merged with an additional group of documents of pre-determined size randomly selected from said at least N electronic documents.

61. The method according to claim 19 wherein said computer display of said final output comprises a histogram of ranks for each issue.

62. The method according to claim 19 wherein said computer display of said final output comprises a function of an indication of a quality measure for each of a plurality of cut-off points.

63. The method according to claim 62 wherein said quality measure is selected from the following group: un-weighted F-measure; weighted F-measure; precision; recall; and accuracy.

64. The method according to claim 62 wherein said function of said indication of a quality measure for each of a plurality of cut-off points comprises a graph of said quality measure as a function of cut-off point.

65. The method according to claim 64 wherein said function of said indication comprises a culling percentage including an integral of said graph.

66. The method according to claim 19 wherein said set of issues comprises a plurality of issues and said computer display includes an indication of documents relevant to a logical combination of a plurality of issues.

67. The method according to claim 19 further comprising using said text classifier most recently built to generate, for at least one individual issue in said set of issues, a set of keywords differentiating documents relevant to said individual issue to documents irrelevant to said individual issue.

68. The method according to claim 19 wherein said input is a function of at least one of a precision value, a recall value and an F-measure currently characterizing said classifier.

* * * * *